United States Patent
Goddard et al.

(10) Patent No.: US 11,566,116 B2
(45) Date of Patent: Jan. 31, 2023

(54) BIOLOGICALLY ACTIVE POLYMERS PREPARED VIA REACTIVE EXTRUSION

(71) Applicant: Cornell University, Ithaca, NY (US)

(72) Inventors: Julie M. Goddard, Ithaca, NY (US); Joshua Herskovitz, Philadelphia, PA (US)

(73) Assignee: CORNELL UNIVERSITY, Ithaca, NY (US)

( * ) Notice: Subject to any disclaimer, the term of this patent is extended or adjusted under 35 U.S.C. 154(b) by 267 days.

(21) Appl. No.: 16/997,419

(22) Filed: Aug. 19, 2020

(65) Prior Publication Data

US 2021/0054157 A1 Feb. 25, 2021

Related U.S. Application Data

(60) Provisional application No. 62/888,812, filed on Aug. 19, 2019.

(51) Int. Cl.
*C08J 5/18* (2006.01)
*B29C 49/00* (2006.01)
(Continued)

(52) U.S. Cl.
CPC ............. *C08J 5/18* (2013.01); *B29C 49/0005* (2013.01); *B29C 49/04* (2013.01); *C08K 5/0025* (2013.01);
(Continued)

(58) Field of Classification Search
CPC ...... C08J 5/18; C08J 2367/04; C08J 2323/12; B29C 49/0005; B29C 49/04;
(Continued)

(56) References Cited

U.S. PATENT DOCUMENTS 6,123,901 A  9/2000 Albert et al.
6,821,482 B1 11/2004 Albert et al.
(Continued)

FOREIGN PATENT DOCUMENTS

WO    2013/090794 A1   6/2013

OTHER PUBLICATIONS

Arrieta et al., "On the Use of PLA-PHB Blends for Sustainable Food Packaging Applications," Materials 10(9):1008 doi:10.3390/ma10091008 (2017).
(Continued)

*Primary Examiner* — Michael M. Bernshteyn
(74) *Attorney, Agent, or Firm* — Troutman Pepper Hamilton Sanders LLP (Rochester)

(57) ABSTRACT

Disclosed herein are methods of making active, food-grade packaging resins using a reactive extrusion step that involves reacting a polymeric material with a ligand and one of a cross-linking agent and a radical initiator in an extruder, under temperature and pressure conditions effective to cause covalent binding of the ligand to the polymeric material by a linker that is the reaction product of the cross-linking agent or by direct bond formation between the ligand and the polymeric material, and then extruding the active, food-grade packaging resin. Also disclosed are the active packaging resins obtained from such methods, methods of forming food packaging materials from the active packaging resins, the food packaging materials that contain the active packaging resins, and methods of packaging perishable food in those food packaging materials.

24 Claims, 17 Drawing Sheets

Specification includes a Sequence Listing.

(51) Int. Cl.
  C08K 5/00    (2006.01)
  C08L 67/04   (2006.01)
  C08L 23/12   (2006.01)
  C08K 5/20    (2006.01)
  C08K 5/46    (2006.01)
  B29C 49/04   (2006.01)
  C08K 5/17    (2006.01)

(52) U.S. Cl.
  CPC ............... *C08K 5/175* (2013.01); *C08K 5/20* (2013.01); *C08K 5/46* (2013.01); *C08L 23/12* (2013.01); *C08L 67/04* (2013.01); *C08J 2323/12* (2013.01); *C08J 2367/04* (2013.01)

(58) Field of Classification Search
  CPC .......... C08K 5/0025; C08K 5/20; C08K 5/46; C08K 5/175; C08L 67/04; C08L 23/12
  USPC ....................................................... 523/122
  See application file for complete search history.

(56) References Cited

U.S. PATENT DOCUMENTS

| | | | |
|---|---|---|---|
| 8,124,169 B2* | 2/2012 | Ylitalo | A01N 25/34 427/8 |
| 9,156,606 B2* | 10/2015 | Goddard | A61J 1/00 |
| 9,332,751 B2* | 5/2016 | Unai | B65D 65/38 |
| 10,434,751 B2 | 10/2019 | Uchida et al. | |
| 10,723,536 B2* | 7/2020 | Withers | A23L 3/3472 |
| 2009/0317615 A1* | 12/2009 | Itakura | C08F 297/08 525/240 |
| 2012/0276357 A1* | 11/2012 | Soto-Valdez | C08K 5/1545 428/220 |

OTHER PUBLICATIONS

Asghar et al., "Modified 2,2'—Azinobis(3-Ethylbenzo Thiazoline)-6-Sulphonic Acid Radical Cation Decolorization Assay for Antioxidant Activity of Human Plasma and Extracts of Traditional Medicinal Plants," Acta Chim Slov 55(2):408-418 (2008).
Bastarrachea et al., "Active Packaging Coatings," Coatings 5(4):771-791 (2015).
Bruster et al., "Plasticization of Polylactide with Myrcene and Limonene as Bio-Based Plasticizers: Conventional vs. Reactive Extrusion," Polymers-Basel 11(8):1363, doi:10.3390/polym11081363 (2019).
Formela et al., "Reactive Extrusion of Bio Based Polymer Blends and Composites—Current Trends and Future Developments," Express Polym Lett 12(1):24-57 (2018).
Goddard et al., "Polymer Surface Modification for the Attachment of Bioactive Compounds," Progress in Polymer Sci. 32(7):698-725 (2007).
Lin et al., "Synthesis of Iminodiacetate Functionalized Polypropylene Films and Their Efficacy as Antioxidant Active-Packaging Materials," J Agr Food Chern 64(22):4606-4617 (2016).
Lin et al., "Photo-Curable Metal-Chelating Coatings Offer a Scalable Approach to Production of Antioxidant Active Packaging," J Food Sci 83(2):367-376 (2018).
Lin et al., "Preparation of Metal Chelating Active Packaging Materials by Laminated Photografting," J Coat Technol Res 13(2):395-404 (2016).
Moad, "The Synthesis of Polyolefin Graft Copolymers by Reactive Extrusion," Prog Polym Sci 24(1):81-142 (1999).
Re et al., "Antioxidant Activity Applying an Improved ABTS Radical Cation Decolorization Assay," Free Radical Bio Med 26(9-10):1231-1237 (1999).
Roman et al., "Retaining Oxidative Stability of Emulsified Foods by Novel Nonmigratory Polyphenol Coated Active Packaging," J Agr Food Chem 64(27):5574-5582 (2016).
Roman et al., "Metal-Chelating Active Packaging Film Enhances Lysozyme Inhibition of Listeria monocytogenes," J Food Protect 77(7):1153-1160 (2014).
Romani et al., "Radical Scavenging Polyethylene Films as Antioxidant Active Packaging Materials," Food Control 109:106946 (2020).
Tang et al., "Recent Advances in Biopolymers and Biopolymer-Based Nanocomposites for Food Packaging Materials," Crit Rev Food Sci 52(5):426-442 (2012).
Tian et al., "Development of an Iron Chelating Polyethylene Film for Active Packaging Applications," J Agr Food Chem 60(8):2046-2052 (2012).
Wei et al., "Non-leaching Antimicrobial Biodegradable PBAT Films through a Facile and Novel Approach," Materials Science and Engineering: C 58:986-991 (2016).
Wei et al., "Peroxide Induced Cross-Linking by Reactive Melt Processing of Two Biopolyesters: Poly(3-hydroxybutyrate) and poly(L-lactic acid) to Improve Their Melting Processability," J Appl Polym Sci 132(13):41724 (2015).
Zhu et al., "Performance of Photo-curable Metal-chelating Active Packaging Coating in Complex Food Matrices," Food Chem 286:154-159 (2019).
Mar./Apr. 2019 ACS Meeting abstract (412. Synthesis of biodegradable nonmigratory active packaging via reactive extrusion).

* cited by examiner

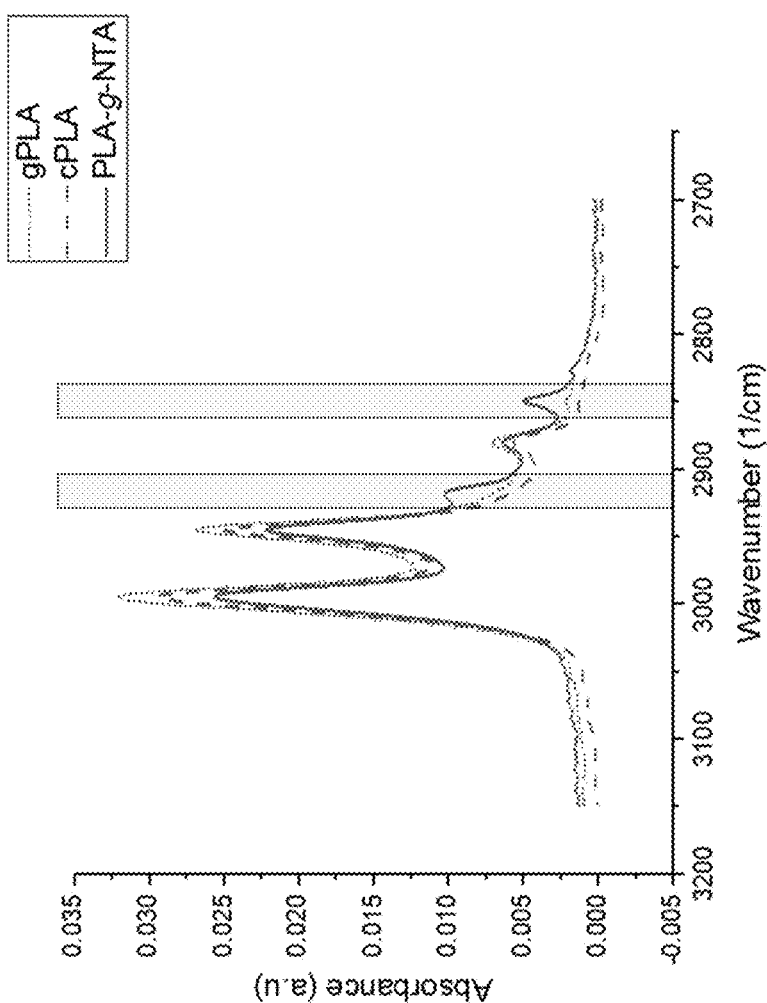
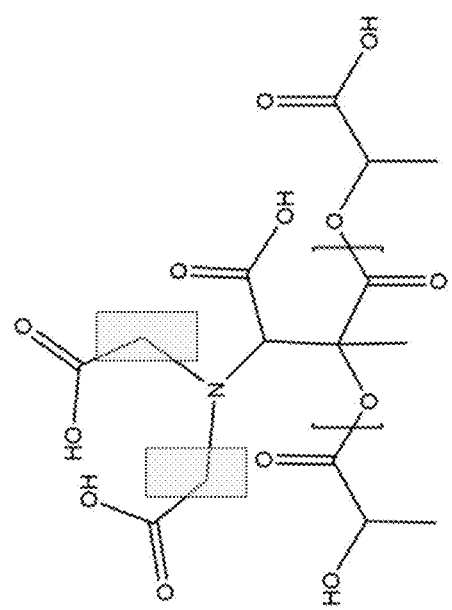
FIG. 4

FIGS. 14A-E

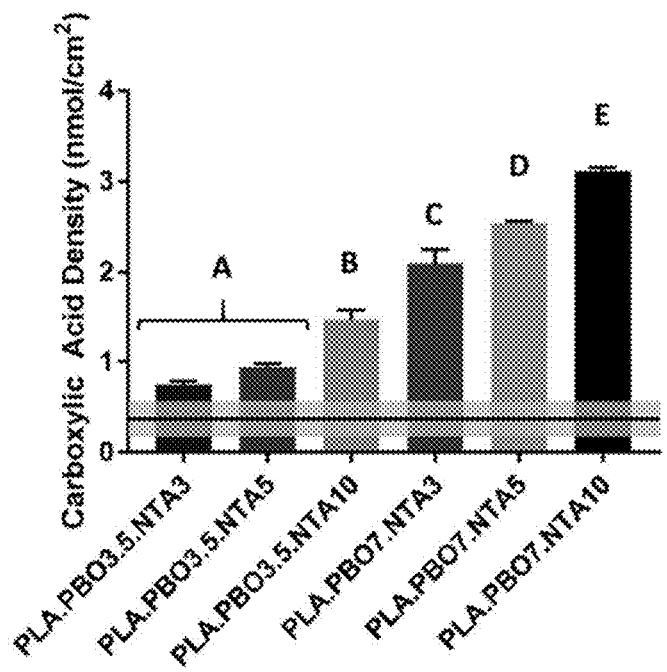
*FIG. 15*
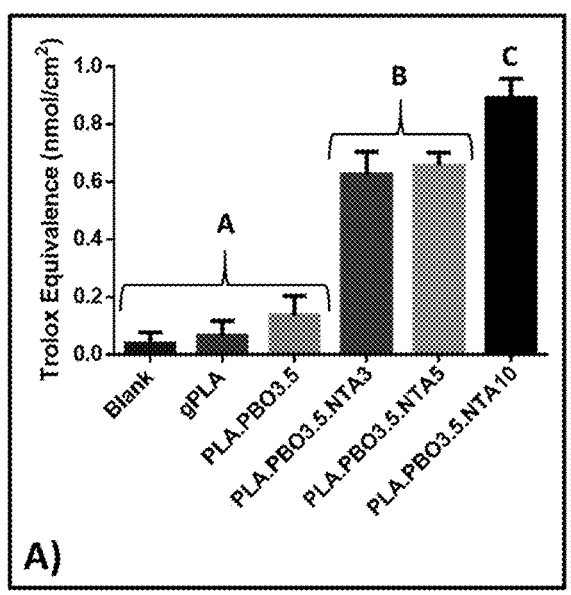 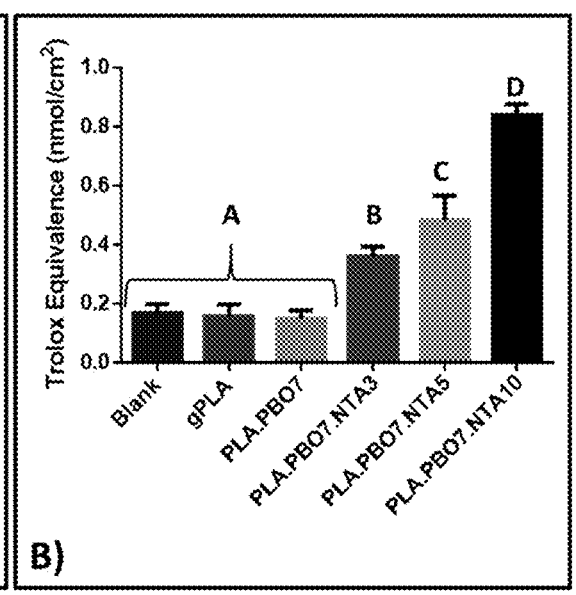
*FIG. 16A*  *FIG. 16B*

BIOLOGICALLY ACTIVE POLYMERS PREPARED VIA REACTIVE EXTRUSION

This application claims priority benefit of U.S. Provisional Patent Application Ser. No. 62/888,812 filed Aug. 19, 2019, which is hereby incorporated by reference in its entirety.

This invention was made with government support under Grant Nos. 2019-67011-29559 and 2019-68015-29230 awarded by the U.S. Department of Agriculture. The government has certain rights in the invention.

FIELD

The present invention is directed to methods for preparing biologically active polymers via reactive extrusion, as well as the resulting active resin and active packaging materials formed using such resin, which possess a covalently attached active ligand that is therefore non-migratory with respect to food stuffs stored while in contact with these packaging materials.

BACKGROUND

According to the Food and Agriculture Organization of the United Nations, about 1.3 billion tons of food is wasted annually, with 40% of food losses in industrialized countries occurring at the retail and consumer levels (*Global Food Losses and Food Waste—Extent, Causes, and Prevention*, Food and Agriculture Organization, United Nations (2011). Packaging and additives (preservatives) offer complementary strategies to reduce food waste and loss. Indeed, a key role of packaging is to reduce food spoilage by protecting food quality from degradative processes and outside contaminants (Roberston, *Food Packaging: Principles and Practice*, 3rd Ed., Taylor & Francis, CRC Press (2012), p 733; Marsh et al., "Food Packaging—Roles, Materials, and Environmental Issues," *J Food Sci.* 72(3):R39-R55 (2007)). Food manufacturers directly add preservatives (e.g., antioxidants, antimicrobials) to many foods and beverages to inhibit food spoilage mechanisms such as microbial growth, intrinsic enzymatic degradation, and oxidation (Huis in't Veld et al., "Microbial and Biochemical Spoilage of Foods: An Overview," *Int J Food Microbiol* 33(1):1-18 (1996), Russell et al., "Major Preservation Technologies," In: *Food Preservatives,"* 2nd ed., Russell & Gould, Kluwer Academic/Plenum Publishers: New York (2003), p 380). Of these, oxidation is caused by the formation of reactive radicals which promote degradation of colorants, nutrients, and vitamins in foods (Frankel. "Antioxidants in Lipid Foods and their Impact on Food Quality," *Food Chem* 57(1):51-55 (1996)). These radicals are formed by reactive oxidative species such as transition metals intrinsically found in food, water, and the environment (Kanner, "Metals and Food Oxidation," In: *Oxidation in Foods and Beverages and Antioxidant Applications, Vol 1: Understanding Mechanisms of Oxidation and Antioxidant Activity*, Woodhead Publishing (2011), pp 36-56). Mechanisms for inhibiting oxidation include quenching radicals with appropriate antioxidants and binding transition metals with metal chelators among others (Decker, "Strategies for Manipulating the Prooxidative/Antioxidative Balance of Foods to Maximize Oxidative Stability," *Trends Food Sci Tech* 9(6):241-248 (1998); Decker et al., "Understanding Antioxidant Mechanisms in Preventing Oxidation in Foods," In: *Oxidation in Foods and Beverages and Antioxidant Applications, Vol 1: Understanding Mechanisms of Oxidation and Antioxidant Activity*, Woodhead Publishing (2011), pp 225-248). Yet, the converging challenges of growing concern over synthetic additive use (Bearth et al., "The Consumer's Perception of Artificial Food Additives: Influences on Acceptance, Risk and Benefit Perceptions," *Food Qual Prefer* 38:14-23 (2014); Zhong et al., "Effects of Food-Additive-Information on Consumers' Willingness to Accept Food with Additives," *Int J Env Res Pub He* 15(11):2394, doi: 10.3390/ijerph15112394 (2018)), and significant post-production food waste and loss demand innovation of new food manufacturing technologies to combat food waste while retaining consumer acceptance of processed foods products (Williams et al., "Environmental Impact of Packaging and Food Losses in a Life Cycle Perspective: A Comparative Analysis of Five Food Items," *J Clean Prod* 19(1):43-48 (2011)).

Active packaging technology represents an alternative to use of traditional packaging (offering only passive protection) and direct additives, in which active agents are incorporated in/on the material permitting reduced reliance on direct additives while meeting demands for long shelf lives (Yildirim et al., "Active Packaging Applications for Food," *Compr Rev Food Sci F* 17(1):165-199 (2018)). Numerous active packaging technologies have been reported, including antioxidant (Decker et al., "Understanding Antioxidant Mechanisms in Preventing Oxidation in Foods," In: *Oxidation in Foods and Beverages and Antioxidant Applications, Vol 1: Understanding Mechanisms of Oxidation and Antioxidant Activity*, Woodhead Publishing, (2011), pp. 225-248; Dey et al., "Oxygen Scavengers for Food Packaging Applications: A review," *Trends Food Sci Tech* 90:26-34 (2019); Carrizo et al., "Development of an Active Food Packaging System with Antioxidant Properties Based on Green Tea Extract," *Food Addit Contam A* 31(3):364-373 (2014), Vera et al., "New Antioxidant Multilayer Packaging with Nanoselenium to Enhance the Shelf-Life of Market Food Products," *Nanomaterials-Basel* 8(10):837, doi: 10.3390/nano8100837 (2018)), antimicrobial (Azeredo et al., "Nanostructured Antimicrobials in Food Packaging-Recent Advances," *Biotechnol J* 14(12):68, doi: 10.1002/biot.201900068 (2019)), water absorbing (Gaikwad et al., "Moisture Absorbers for Food Packaging Applications," *Environ Chem Lett* 17(2): 609-628 (2019)), and gas scavenging (Alvarez-Hernandez et al., "Current Scenario of Adsorbent Materials Used in Ethylene Scavenging Systems to Extend Fruit and Vegetable Postharvest Life," *Food Bioprocess Tech* 11(3):511-525 (2018)). In one class of antioxidant active packaging technologies, metal chelating groups were introduced on the surface of polymer films to limit oxidation by binding prooxidant transition metals naturally found in foods and beverages (Tian et al., "Biomimetic Design of Chelating Interfaces," *J Appl Polym Sci* 132(1): doi: 10.1002/app.41231 (2015); Bastarrachea et al., "Active Packaging Coatings," *Coatings* 5(4):771-791 (2015)). Among metal chelating groups, hydroxyamic acid (Tian et al., "Controlling Lipid Oxidation via a Biomimetic Iron Chelating Active Packaging Material," *J Agr Food Chem* 61(50):12397-12404 (2013); Roman et al., "Performance of Non-migratory Iron Chelating Active Packaging Materials in Viscous Model Food Systems," *J Food Sci* 80(9):E1965-E1973 (2015); Lin et al., "Preparation of Metal Chelating Active Packaging Materials by Laminated Photografting," *J Coat Technol Res* 13(2):395-404 (2016)), and iminodiacetic acid (Lin et al., "Synthesis of Iminodiacetate Functionalized Polypropylene Films and Their Efficacy as Antioxidant Active-Packaging Materials," *J Agr Food Chem* 64(22): 4606-4617 (2016); Lin et al., "Facile Preparation of Epoxide-Functionalized Surfaces via Photocurable Copolymer Coatings and Subsequent Immobilization of Iminodiacetic Acids," *Acs Appl Mater Inter* 10(47):40871-40879 (2018)) showed great promise due to their efficacy at preventing oxidation in food matrices, structural similarity to industrially relevant metal chelators (desferroxamine and ethylenediaminetetraacetic acid (EDTA)), and high stability constants with prooxidant metals such as iron and copper (Martell et al., *Critical Stability Constants*, Vol. 6, Plenum Press, New York (1989). Non-migratory (or immobilized) active packaging present a potential regulatory advantage over migratory active packaging as they are regulated as new food contact material rather than as a direct additive (Bastarrachea et al., "Active Packaging Coatings," *Coatings* 5(4):771-791 (2015)).

In prior work, non-migratory antioxidant active packaging materials were prepared utilizing wet chemical grafting methods on previously prepared films. Those grafting methods include photoinitiated crosslinking (Lin et al., "Synthesis of Iminodiacetate Functionalized Polypropylene Films and Their Efficacy as Antioxidant Active-Packaging Materials," *J Agr Food Chem* 64(22):4606-4617 (2016)), and the use of a carbodiimide crosslinker (Tian et al., "Development of an Iron Chelating Polyethylene Film for Active Packaging Applications," *J Agr Food Chem* 60(8):2046-2052 (2012)). While successful in demonstrating proof-of-principle that solid support bound chelators can effectively inhibit oxidative degradation in foods and beverages, the lengthy and complex functionalization processes of these techniques limit industrial translation.

Further, most research in non-migratory active packaging has focused on petroleum-derived packaging materials. With increasing concern over environmental contamination and landfill accumulation of petroleum-derived polymers there is a need to translate this technology to biodegradable bio-based polymers. Among the biodegradable, bio-based polymers, poly(lactic acid) (PLA) has seen greatest commercial success due to its superior clarity, biodegradability, and processability (Tang et al., "Recent Advances in Biopolymers and Biopolymer-Based Nanocomposites for Food Packaging Materials," *Crit Rev Food Sci* 52(5):426-442 (2012)).

Based on the foregoing, it would be desirable to develop a commercially viable approach for the preparation of food-grade, active packaging resins that is applicable to both biodegradable and non-biodegradable polymeric resins, where the active agent(s) are non-migratory and, hence, afford "clean label" products. In this manner, it is possible to address the issue of food system sustainability as well as the environmental issues surrounding non-biodegradable petroleum-derived polymers.

The described invention is directed to overcoming these and other deficiencies in the art.

SUMMARY

A first aspect relates to a method of making an active, food-grade packaging resin. This method includes providing a polymeric material; and reacting the polymeric material with a ligand and one of a cross-linking agent and a radical initiator in an extruder, under temperature and pressure conditions effective to cause covalent binding of the ligand to the polymeric material by a linker that is the reaction product of the cross-linking agent or by direct bond formation between the ligand and the polymeric material, and extruding the active, food-grade packaging resin.

A second aspect relates to a method of forming a food packaging material that includes melting the active, food-grade packaging resin prepared according to the first aspect; and forming the melted active, food-grade packaging resin into a shaped, food packaging material.

A third aspect relates to an active, food-grade packaging resin prepared according to the process the first aspect. In preferred embodiments, the ligand is a food-grade ligand.

A fourth aspect relates to an active, food-grade packaging resin that includes a polymeric material having covalently attached thereto a ligand. In preferred embodiments, the ligand is a food-grade ligand.

A fifth aspect relates to an active, food-grade packaging material that includes a body having a food contact surface and an external surface, the body comprising a polymeric material having covalently attached thereto a ligand, wherein the ligand is present on both the food contact surface and on the external surface. The active, food-grade packaging material may take the form of a film (single- and multi-layer), bag, or container, which can be prepared according to any well-known techniques.

A sixth aspect of the invention relates to a method of packaging perishable food that includes sealing a perishable food item in a package including an active, food-grade packaging material according the fifth aspect, whereby the food contact surface of the active packaging material, and the ligand thereon, contacts the perishable food item to reduce food spoilage while remaining covalently bound to the polymeric material.

As demonstrated in the accompanying examples, using different polymeric materials suitable for food packaging, i.e., recognized by the U.S. Food and Drug Administration as Generally Regarded As Safe ("GRAS"), and various ligands (including chelating ligand nitrilotriacetic acid ("NTA") and antimicrobial ε-poly-l-lysine) grafted directly to the polymeric material using a radical initiator or a cross-linking agent that covalently binds to each of the polymeric material and ligand, active, food-grade packaging resins that are functional and effective can be obtained used reactive extrusion. When prepared as films, the films demonstrated activity of the ligands (i.e., chelating activity of NTA and antimicrobial activity of ε-poly-l-lysine). With regard to the antimicrobial activity of ε-poly-l-lysine, in particular, these results confirm that the ε-poly-l-lysine survived the heating cycles associated with reactive extrusion and, later, film formation to maintain its antimicrobial activity. In addition, the examples demonstrate two feasible approaches for covalent attachment—the first using a radical initiator to cause direct bond formation between NTA and the polymeric material, and the second using a cross-linking agent that reacts with each of the ligand and the polymeric material to form covalent bonds. Covalent bond formation should inhibit or fully preclude migration of the ligand from the packaging material to the food that contacts the packaging material. The demonstrated use of polylactic acid as the polymer during reactive extrusion affords an active packaging material that overcomes the problems of the prior art and meets all objectives by: (i) affording a "clean label" product that is (ii) biodegradable, and (iii) can be prepared in a commercially viable manner.

BRIEF DESCRIPTION OF THE DRAWINGS

FIG. 4 illustrates the representative structure of PLA-g-NTA along with the overlaid ATR-FTIR spectra of gPLA, cPLA, and PLA-g-NTA, which indicates the alkyl stretch region and the emergence of new secondary carbon characteristic bands (boxed in the representative structure and boxed region of the spectra). Spectra are representative of three separate scans on four replicate films.

FIG. 15 Carboxylic acid density measured by the Toluidine Blue O Assay 3%, 5%, and 10% NTA grafted PLA using 3.5 wt % and 7 wt % crosslinker. Values are means of at least four measurements on independent films (n=4). Significant differences between means are indicated by capital letters (Tukey's HSD, P≤0.05). Grey bar indicates the 95% confidence interval of control films (native PLA, 3.5 wt % cross-linked PLA, and 7 wt % cross-linked PLA).

FIGS. 16A-B are graphs illustrating ABTS radical scavenging capacity of granulated PLA (gPLA), 3.5% cross-linker with PLA (PLA.PBO3.5), 3%, 5%, and 10% NTA grafted PLA in Trolox scavenging equivalence (FIG. 16A), granulated PLA (gPLA), 7% crosslinker with PLA (PLA.PBO7), 3%, 5%, and 10% NTA grafted PLA in Trolox scavenging equivalence (FIG. 16B). Values represent means and standard errors from four replicate films. Significant differences between means are indicated by different capital letters (Tukey's HSD, p≤0.05).

In FIG. 18A, only the C-terminal Lys residue of Nisin is illustrated. The complete primary structure (SEQ ID NO: 1) and secondary structure of Nisin is shown in FIG. 18B.

DETAILED DESCRIPTION

Figure 1:
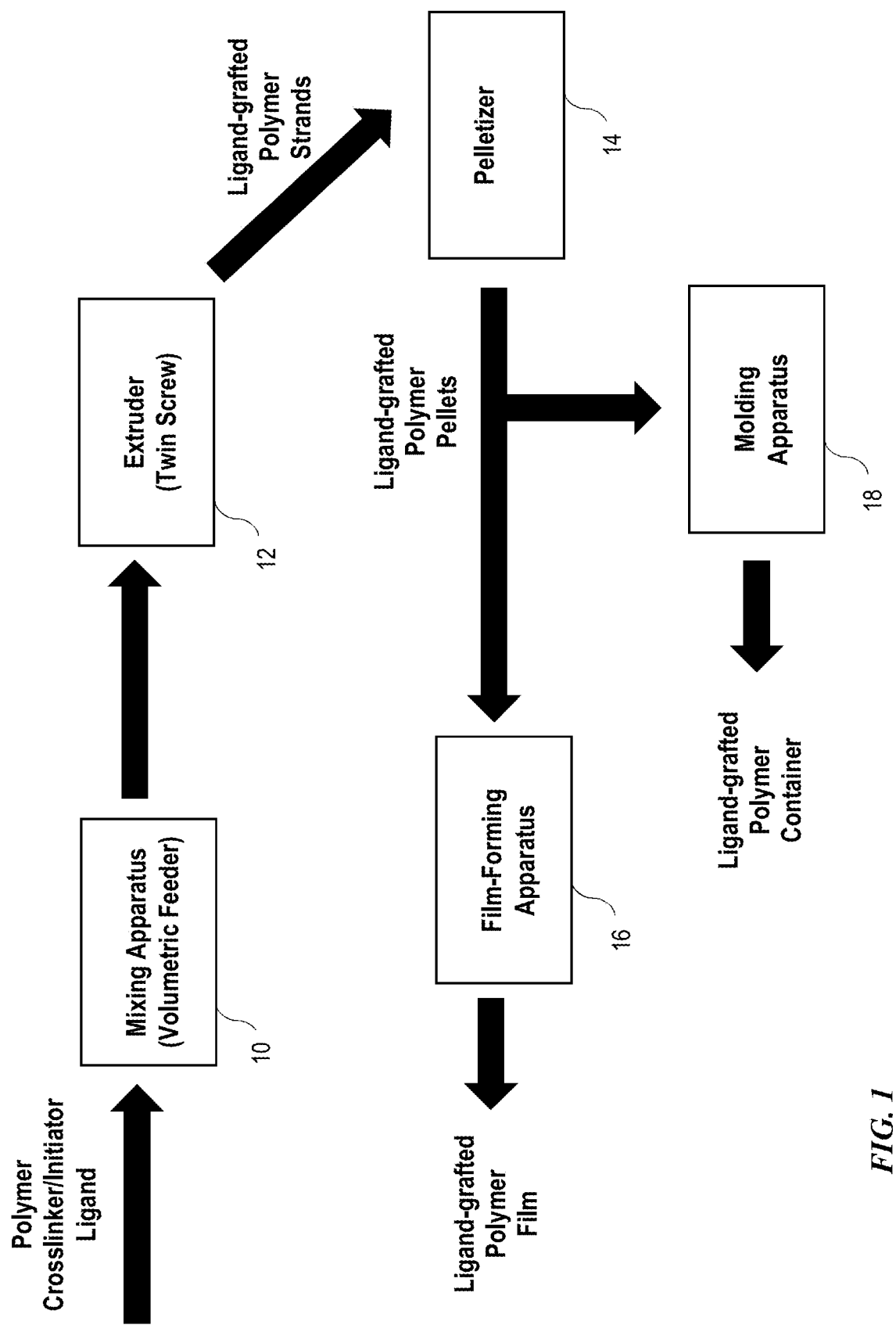
FIG. 1 illustrates an exemplary process for preparing an active, food-grade packaging resin using reactive extrusion of a polymer, a ligand, and a cross-linker or initiator. The active, food-grade packaging resin can be used directly or converted to a pellet formation, which is the industrial product that can be converted by various bolding or film-forming processes to product finished products, e.g., single-layer films, multi-layer films, or containers that are suitable for packaging foods.

Disclosed herein are methods of making active, food-grade packaging resins, the resins obtained from such methods, methods of forming food packaging materials from those resins, the food packaging materials that contain those resins, and methods of packaging perishable food in those food packaging materials.

A first aspect relates to a method of making an active, food-grade packaging resin. This method includes providing a polymeric material; and reacting the polymeric material with a ligand and one of a cross-linking agent and a radical initiator in an extruder, under temperature and pressure conditions effective to cause covalent binding of the ligand to the polymeric material by a linker that is the reaction product of the cross-linking agent or by direct bond formation between the ligand and the polymeric material, and extruding the active, food-grade packaging resin. To ensure relatively uniform distribution of the ligand throughout the active, food-grade packaging resin, it is desirable to adequately mix the polymeric material with the ligand and one of the cross-linking agent and the radical initiator to form a mixture before the reacting step.

In certain embodiments, the mixture comprises the polymeric material, the ligand, and the radical initiator. The mixture may optionally include a second polymeric material or monomers or low molecular weight oligomers of the (initial) polymeric material.

In another embodiment, the mixture consists essentially of, or consists of, the polymeric material, the ligand, and the radical initiator.

In certain embodiments, the mixture comprises the polymeric material, the ligand, and the cross-linking agent. The mixture may optionally include a second polymeric material or monomers or low molecular weight oligomers of the (initial) polymeric material.

In another embodiment, the mixture consists essentially of, or consists of, the polymeric material, the ligand, and the cross-linking agent.

Any suitable polymeric materials suitable for reactive extrusion can be used in the manufacture of the active, food-grade packaging resins. Exemplary polymeric materials include, without limitation, polylactic acid, polyethylene, polypropylene, polyethylene terephthalate, polystyrene, polyamide, polycaprolactone, polyurethane, polyhydroxy butyrate, cellulose, and copolymers thereof. Suitable polyethylenes include, without limitation, high density polyethylene, low density polyethylene, linear low density polyethylene, and combinations thereof. Suitable polypropylenes include, without limitation, atactic as well as isotactic polypropylenes, and combinations thereof. Of these, polyethylene and polypropylene are well suited for use with a radical initiator, and polylactic acid and polyethylene terephthalate are well suited for use with an oxazoline cross-linker, as demonstrated hereinafter.

The molecular weight of a packaging polymer, a measure of its molecular chain length, can significantly affect the physical properties of the polymer. As molecular weight increases. tensile and impact strengths increase sharply before leveling off, whereas melt viscosity increases slowly and then sharply. Typically. the practical molecular weight range for packaging polymers is between 50-200 KDa. See Yam, "Packaging Material Molecular Weight," In: *Encyclopedia of Polymer Science and Technology*, John Wiley & Sons. Inc., doi: 10.1002/0471440264.pst569 (2010).

In certain embodiments, the polymeric material is not poly(butylene adipate-co-terephthalate), alone or in admixture with thermoplastic starch; the thermoplastic starch is formed by reaction of granular starch with glycerol and water, and is used as a solubilization aid for dispersing a guanidine-based cationic polymer in the poly(butylene adipate-co-terephthalate). See Wei et al., "Non-leaching Antimicrobial Biodegradable PBAT Films through a Facile and Novel Approach," *Materials Science and Engineering: C* 58:986-991 (2016), which is hereby incorporated by reference in its entirety.

The polymeric materials typically make up from about 80 to about 99 weight percent, preferably about 82 to about 97 weight percent or about 85 to about 95 weight percent, of the total weight of the material charged into the extruder.

Any suitable ligands that are resistant to heat (as used during reactive extrusion) and can contribute to reduced food spoilage while non-migratory, i.e., remaining covalently linked to the polymeric material, can be used in making the active, food-grade packaging resins. Exemplary classes of ligands include, without limitation, chelating ligands, radical scavengers, oxygen scavengers, antimicrobial ligand, intelligent packaging indicators, and combinations thereof. In certain embodiments, these are limited to designated food-grade chelating ligands, food-grade radical scavengers, food-grade oxygen scavengers, food-grade antimicrobial ligands, food-grade intelligent packaging indicators, and combinations thereof.

Exemplary chelating ligands include, without limitation, nitrolotriacetic acid, ethylenediaminetetraacetic acid, iminodiacetic acid, diethylenetriaminepentaacetic acid, cysteine sulfoxide, and deferoxamine (also known as desferrioxamine).

Exemplary oxygen scavengers include, without limitation, polybutadiene, ferrous ascorbate, sulfites, sugar alcohols, and glucose oxidase.

Exemplary antimicrobials include, without limitation, polylysine (e.g., ε-poly-L-lysine), nisin, quaternary ammonium-containing compounds (e.g., hexadecyltrimethylammonium bromide, chlorhexidine, benzalkonium chloride), sulfites, and parabens.

Biosynthesized ε-poly-L-lysine is a hydrophilic cationic linear homo-poly-amino acid typically composed of 25 to 35 identical L-lysine residues, and having a peptide bond between carboxyl groups and ε-amino groups of L-lysine residues rather than the conventional peptide bonds linking α-poly-L-lysine (Yoshida et al., "ε-Poly-L-lysine: Microbial Production, Biodegradation and Application Potential," *Appl. Microbiol. Biotechnol.* 62:21-26, doi:10.1007/s00253-003-1312-9 (2003), which is hereby incorporated by reference in its entirety).

Nisin A is a 34 amino acid, polycyclic antibacterial peptide produced by the bacterium *Lactococcus lactis* that is used as a food preservative. As illustrated in FIG. 18B (SEQ ID NO: 1), nisin A contains uncommon amino acids lanthionine (Lan), methyllanthionine (MeLan), didehydroalanine (Dha), and didehydroaminobutyric acid (Dhb). Other nisin variants can also be used, including nisins Z, F, and Q, which have been isolated from lactococci, nisins U and U2, from *Streptococcus uberis*, and nisin P, which is expressed in *Streptococcus* gallolyticus subsp. pasteurianus and *Streptococcus suis*. Nisin Z producers are very common, and the amino acid sequence differs from that of nisin A at a single position (His27Asn), a change that improves the solubility of the peptide at a neutral pH. Nisin F differs from nisin A at 2 amino acid positions: His27Asn, as seen in nisin Z, and Ile30Val. Nisin Q is produced by *L. lactis* 61-14, and differs from nisin A at 4 amino acid positions, i.e., those observed in nisin F as well as Ala15Val and Met21Leu. The *Streptococcus*-associated variants, U and U2, differ more considerably from nisin A. Nisin U differs from nisin A at 9 positions—Ile4Lys, Ala15Ile, Gly18Thr, Asn20Pro, Met21Leu, His27Gly, Ser29His, Ile30Phe, and His31Gly— and also lacks the three C-terminal amino acids of nisin A. In addition to these changes, nisin U2 contains a further Ile1Val change. Nisin P is closely related to nisin U2, differing with respect to just 2 amino acids: Phe20 and Leu21 in nisin U2 are changed to Ala20 and Ile21 in nisin P. The more distantly related nisin-like lantibiotic salivaricin D, isolated from *Streptococcus salivarius* 5M6c, differs from nisin A at 17 positions, with most differences seen at the C-terminal end of the molecule. These variants are described by O'Connor et al., "Nisin H Is a New Nisin Variant Produced by the Gut-Derived Strain *Streptococcus hyointestinalis* DPC6484," *Appl Environ Microbiol.* 81(12): 3953-3960 (2015), which is hereby incorporated by reference in its entirety. More recently, nisin J from *Staphylococcus capitis* APC 2923 was identified; nisin J has 9 amino acid changes compared to prototypical nisin A, with 8 amino acid substitutions (Ile4Lys, Met17Gln, Gly18Thr, Asn20Phe, Met21Ala, Ile30Gly, Val33His, and Lys34Thr), and an extra amino acid close to the C terminus, rendering nisin J the only nisin variant to contain 35 amino acids (see O'Sullivan et al., "Nisin J. a Novel Natural Nisin Variant, Is Produced by *Staphylococcus capitis* Sourced from the Human Skin Microbiota," *J Bacteriol.* 202(3):e00639-19 (2020), doi:10.1128/JB.00639-19, which is hereby incorporated by reference in its entirety). Bioengineered variants of these nisin homologs can also be utilized.

In certain embodiments, the antimicrobial agent is not a guanidine-based cationic polymer (Wei et al., "Non-leaching Antimicrobial Biodegradable PBAT Films through a Facile and Novel Approach," *Materials Science and Engineering: C* 58:986-991 (2016), which is hereby incorporated by reference in its entirety)

Exemplary intelligent packaging indicators include, without limitation, anthocyanin pH indicators (e.g., extracted from *Brassica oleracea* var. capitate, or red cabbage), leucodyes, methyl red, methylene blue, 2,6-dichlorindophenol, N,N-tetramethyl-p-phenylenediamine, and myoglobin.

The ligand(s) typically make up from about 1 to about 15 weight percent, preferably about 3 to about 12 weight percent (including about 3 to about 5 weight percent, about 5 to about 8 weight percent, about 8 to about 10 weight percent, or about 10 to about 12 weight percent) of the total weight of the material charged into the extruder. The amount required will depend, in part, on the food or beverage intended for use with the packaging material formed from the active packaging resin, as some foods and beverages are more oxidatively stable, in which case less ligand may be required to maintain food freshness.

Any suitable radical initiators can be used in forming the active packaging resins by causing direct linkage between the polymer material and the ligand(s) present in the mixture exposed to reactive extrusion. Exemplary radical initiators include, without limitation, peroxide initiators such as ketone peroxides, hydroperoxides, diacylperoxides, dialkylperoxides, peroxyketals, alkyl peresters (peroxy esters), peroxycarbonates, and combinations. Of these, diacylperoxides (e.g., dibenzoyl, dilauroyl, didecanoyl, bis(p-chlorobenzoyl), and bis(2,4-dichlorobenzoyl) peroxides) and dialkylperoxides (e.g., di-t-butyl and dicumyl peroxides) are preferred. In the accompanying examples, dicumyl peroxide is shown to be quite effective. Other suitable peroxide initiators are described in Denisov et al., *Handbook of Free Radical Initiators*, Wiley (2005), which is hereby incorporated by reference in its entirety.

When used, the initiator(s) typically make up from about 0.1 to about 2 weight percent, preferably about 0.1 to about 1 weight percent or about 0.1 to about 0.5 weight percent, of the total weight of the material charged into the extruder.

Any suitable cross-linking agents can be used in forming the active packaging resins by forming a residual linker that is covalently bonded to both the polymer material and the ligand(s) present in the mixture exposed to reactive extrusion. Exemplary cross-linking agents include, without limitation, oxazolines, epoxides, and carbodiimides.

Suitable oxazolines include, without limitation, 1,3-bis(4,5-dihydro-2-oxazolyl)benzene, 1,4-bis(4,5-dihydro-2-oxazolyl)benzene, and 2,2'-bis(2-oxazoline).

Suitable epoxides include, without limitation, 1,2-epoxy-5-hexene, 1,2-epoxy-9-decene, propylene oxide, trimethylene oxide, 1,2-epoxyeicosane, 1,2-epoxyhexane, 2-hydroxymethyloxetane, 3,4-epoxycyclohexylmethyl, 3,4-epoxycyclohexanecarboxylate, 7-oxabicyclo[4.1.0]hept-3-ylmethyl 7-oxabicyclo[4.1.0]heptane-3-carboxylate), and tris(4-hydroxyphenyl)methane triglycidyl ether.

Suitable carbodiimides include, without limitation, dicyclohexyl carbodiimide, 1-ethyl-3-(3-dimethylaminopropyl) carbodiimide, bis(trimethylsilyl)carbodiimide, and N,N'-diisopropylcarbodiimide, N,N'-di-tert-butylcarbodiimide.

When used, the cross-linking agent(s) typically make up from about 0.1 to about 10 weight percent, preferably about 2 to about 8 weight percent or about 3.5 to about 7 weight percent, of the total weight of the material charged into the extruder.

In addition to the foregoing, the mixture used to form the active, food-grade packaging resins may optionally include one or more of light stabilizers, ultraviolet absorbers, plasticizers, inorganic fillers, colorants, antistatic agents, lubricants, mold release agents, flame retardants, leveling agent, de-foaming agents, or the like within a range that does not inhibit advantageous effects of the invention.

Exemplary active, food-grade packaging resins are identified in the examples using polylactic acid or polypropylene as the polymeric material, and nitrolotriacetic acid, polylysine, or nisin as the ligand. These include, more specifically, resins containing, as a linker, the reaction product of 1,3-bis(4,5-dihydro-2-oxazolyl)benzene with polylysine or nisin as the ligand. These also include, more specifically, nitrolotriacetic acid directly bonded to the polymeric material due to the activity of a radical initiator.

Figure 3:
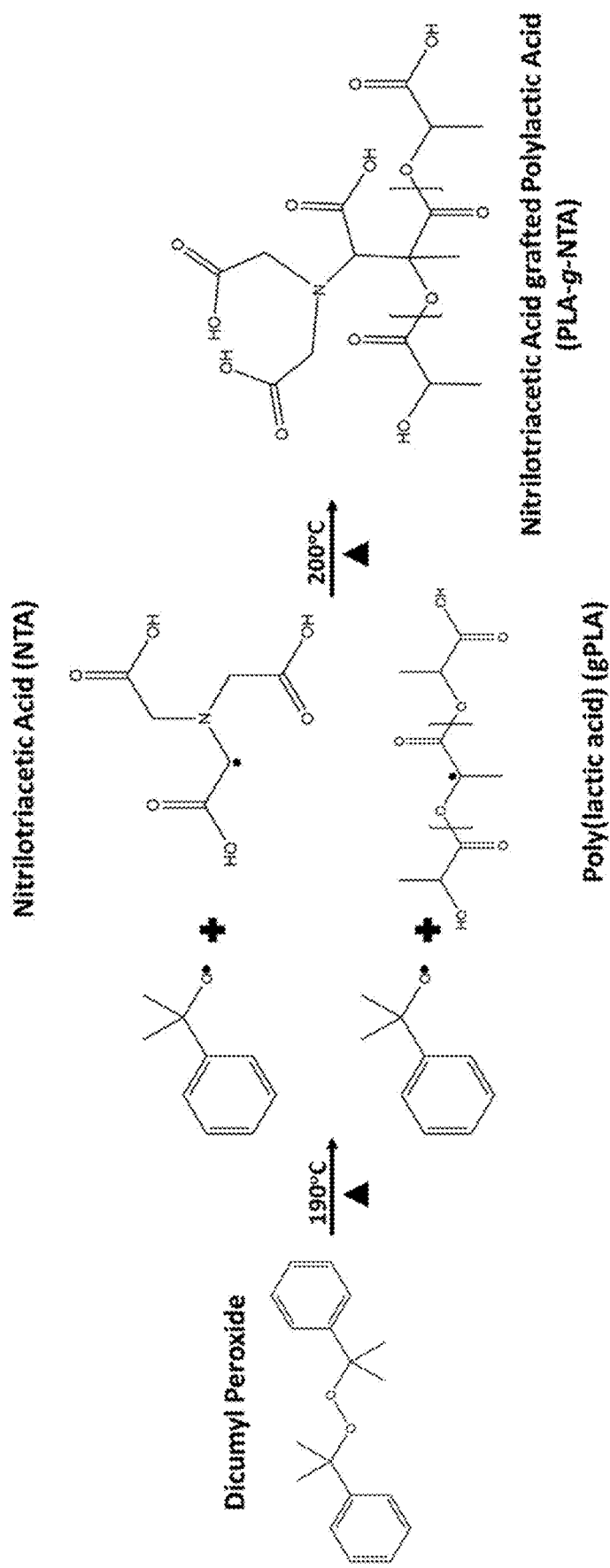
FIG. 3 illustrates a simplified reaction scheme for the radical grafting of nitrilotriacetic acid ("NTA") with gPLA to form NTA-functionalized gPLA with metal chelating activity (designated "PLA-g-NTA").

An exemplary structure of one active, food-grade packaging resin, polylactic acid directly bonded to nitrolotriacetic acid as ligand, is shown in FIG. 3.

Figure 9:
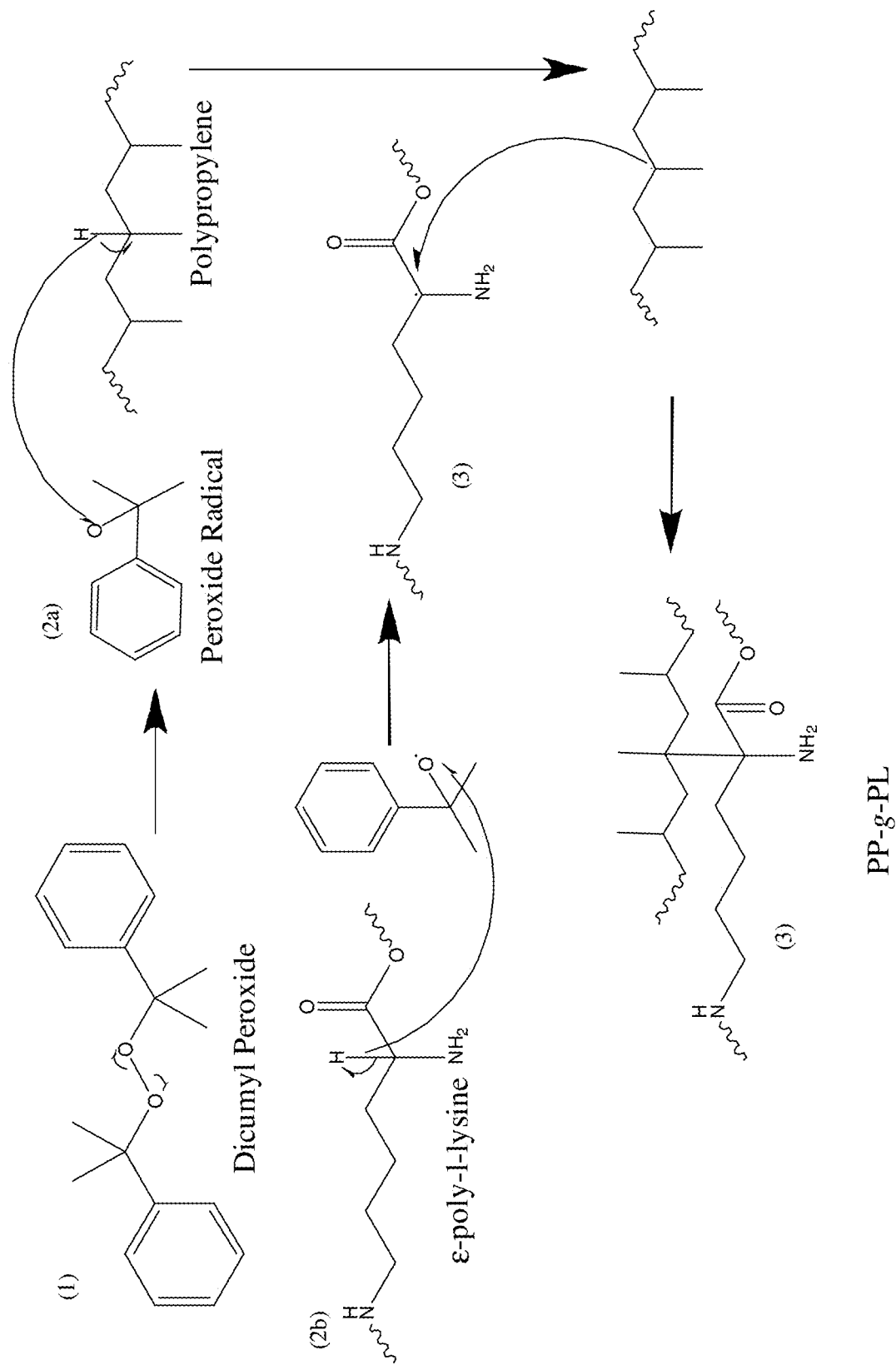
FIG. 9 illustrates a simplified reaction scheme for radical grafting of ε-poly-l-lysine on polypropylene to form polypropylene-g-ε-poly-l-lysine (designated "PP-g-PL"). Dicumyl peroxide is used as radical initiator in reactive extrusion of polypropylene with ε-poly-l-lysine.

An exemplary structure of another active, food-grade packaging resin, polypropylene acid directly bonded to ε-poly-L-lysine as ligand, is shown in FIG. 9.

Figure 13:
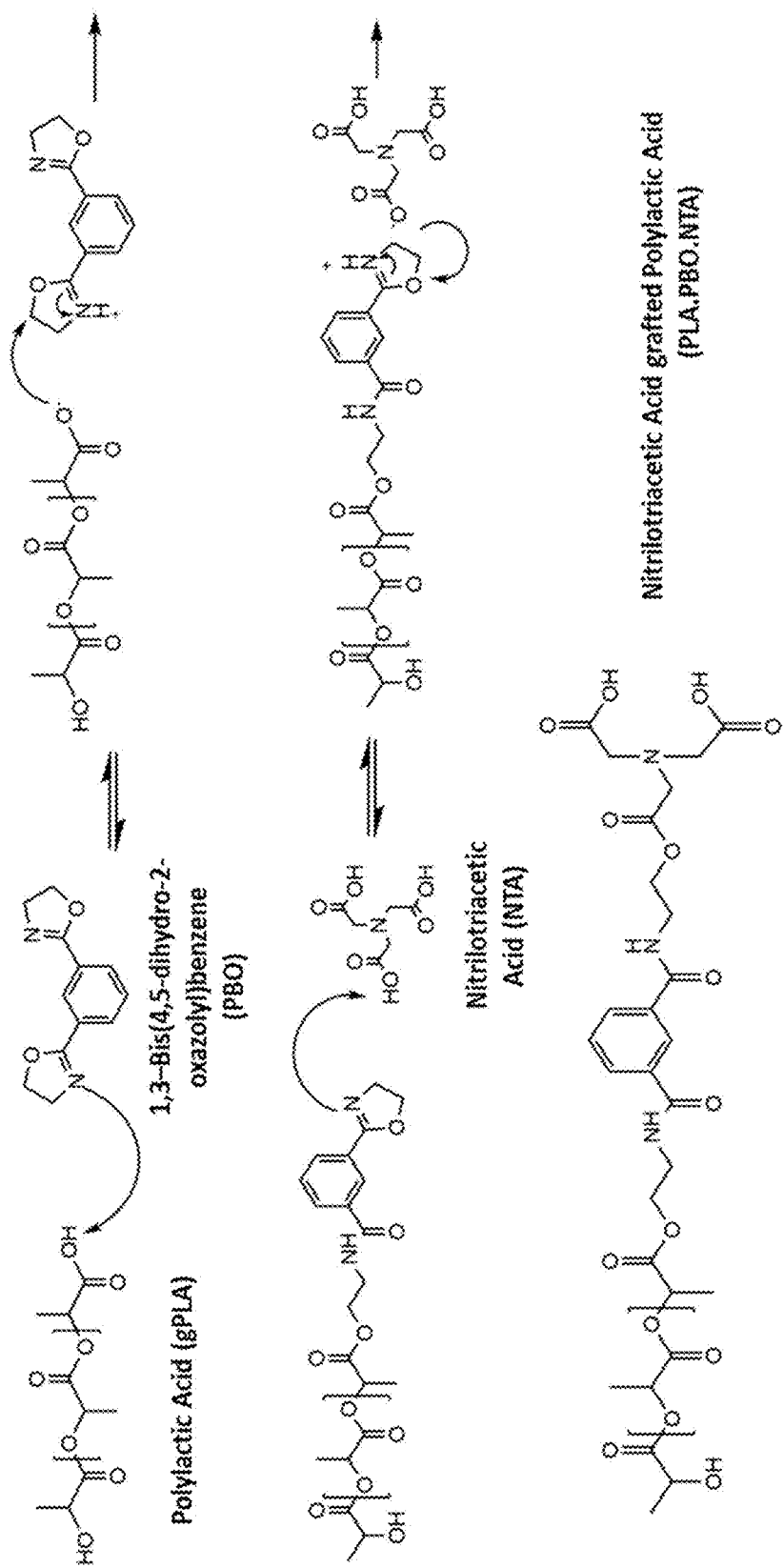
FIG. 13 illustrates a simplified reaction scheme for cross-linking of nitrilotriacetic acid ("NTA") to gPLA (shown) or cross-linked polylactic acid (see FIG. 2) using 1,3-bis(4,5-dihydro-2-oxazolyl)benzene (PBO) as a cross-linker, thereby forming NTA-linked PLA (designated "PLA.PBO.NTA"). PBO acts a cationic cross-linker during reactive extrusion of PLA with NTA.

An exemplary structure of yet another active, food-grade packaging resin, polylactic acid cross-linked to nitrolotriacetic with the linker —CH$_2$CH$_2$—N(H)—C(O)-phenyl-C(O)—N(H)—CH$_2$CH$_2$—, is shown in FIG. 13.

Figure 18A:
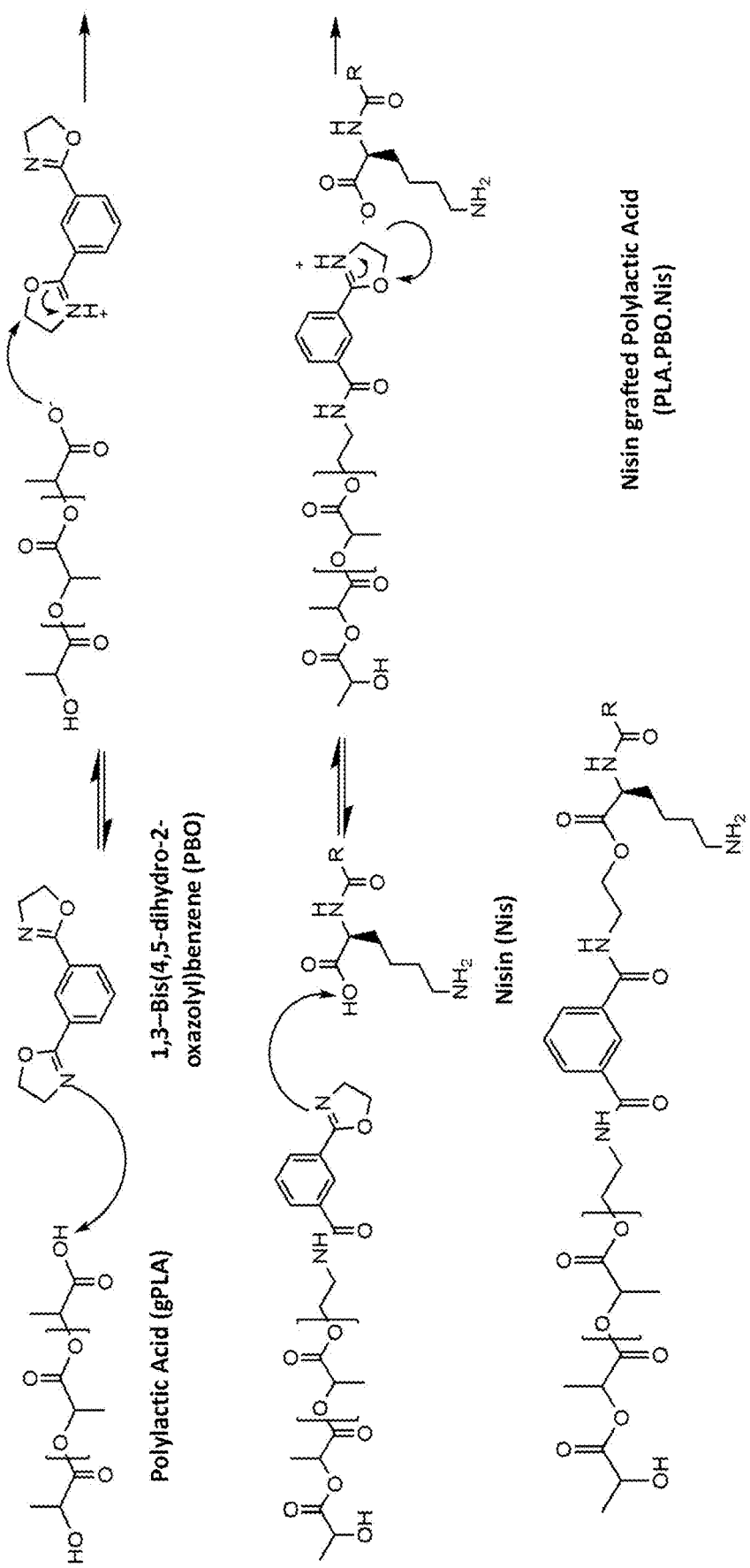
FIG. 18A-B illustrate a simplified reaction scheme for cross-linking of Nisin ("Nis") to gPLA (shown) or cross-linked polylactic acid (see FIG. 2) using 1,3-bis(4,5-dihydro-2-oxazolyl)benzene (PBO) as a cross-linker, thereby forming Nisin-linked PLA (designated "PLA.PBO.Nis"). PBO acts a cationic cross-linker during reactive extrusion of PLA with Nisin.
Figure 18B:
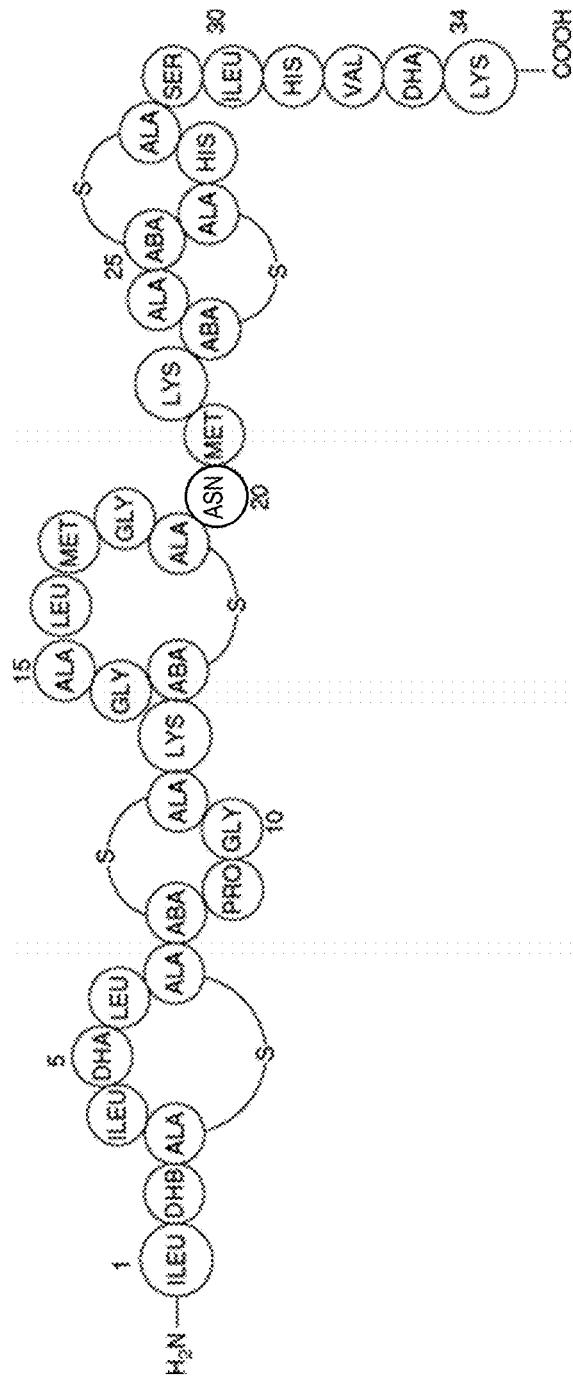

An exemplary structure of a further active, food-grade packaging resin, polylactic acid cross-linked to Nisin with the linker —CH$_2$CH$_2$—N(H)—C(O)-phenyl-C(O)—N(H)—CH$_2$CH$_2$—, is shown in FIGS. 18A-B.

In each of these embodiments, the ligand is covalently bound to the polymer backbone throughout the polymeric resin (i.e., on the surface of the resin as well as internally thereof). As a consequence, when the resin is later used to form an active, food-grade packaging material, the ligand is covalently bound to the polymer backbone on all surfaces thereof (both food contact surfaces and non-food contact surfaces).

One exemplary method for making the active, food-grade packaging resin is illustrated in FIG. 1. In step 10, the polymeric material(s), ligand(s), and initiator/cross-linking agent are introduced into a suitable mixing device and mixed for a sufficient period of time to create a relatively homogenous mixture of the ingredients. It will be apparent that the amount of time for such mixing will depend on the total mass and volume to be mixed. The relatively homogenous mixture obtained at step 10 is then charged into a suitable extruder (e.g., twin-screw extruder) at step 12. In the extruder, the mixture is exposed to elevated temperature and pressure conditions to facilitate reaction of the initiator/cross-linking agent with the polymeric material and ligands to facilitate direct bond formation with the radical initiator or cross-linking of the ligand(s) to the polymeric material(s) via the residual linker. See FIGS. 3 and 9 (showing direct bond formation by peroxide radical); FIGS. 13, 18A (showing linker formation by 1,3-bis(4,5-dihydro-2-oxazolyl)benzene). The conditions in the extruder raise the reactant temperature to about 100° C. to about 300° C., preferably about 145° C. to about 210° C.; and the pressure to about 30 psi to about 1400 psi, preferably about 450 psi to about 1000 psi. As will be appreciated by persons of skill in the art, the specific conditions (temperature, pressure, residence time, and extruder speed) will be selected for optimization of the reaction between the specific polymeric materials, ligands, and initiator/cross-linking agents. The product obtained following the extrusion step 12 is the active, food-grade packaging resin.

In reactive extrusion, grafted polymers or copolymers are produced by controlled blending of polymer resin(s), active precursor(s), and initiator(s)/cross-linker(s) in 'the melt' by application of heat and pressure. Compared to wet chemical grafting processes, reactive extrusion processes are typically short (several minutes), have reduced solvent and energy requirements, and can be continuous (Moad, "The Synthesis of Polyolefin Graft Copolymers by Reactive Extrusion," *Prog Polym Sci* 24(1):81-142 (1999)).

In certain embodiments, the reactive extrusion process is carried out using a mixture of the polymeric material(s), ligand(s), and initiator(s)/cross-linker(s), where the mixture is free of any starch materials such as thermoplastic starch (see Wei et al., "Non-leaching Antimicrobial Biodegradable PBAT Films through a Facile and Novel Approach," *Materials Science and Engineering: C* 58:986-991 (2016), which is hereby incorporated by reference in its entirety).

The active, food-grade packaging resin produced at extrusion step 12 is typically in the form of extruded strands, which are then cooled and introduced at step 14 to a pelletizer where the strands are then reduced in size to pellets (or nurdles) on the order of about 0.5 mm to about 2 mm (e.g., ~1 mm). The pelletized form of the active, food-grade packaging resin represents the industrial product, which end-product manufacturers will use in forming food packaging materials that contain the active, food-grade packaging resin, as discussed below.

Subsequent processing of the pelletized active, food-grade packaging resin allows this raw material to be converted into a final commercial product, such as a food packaging material. Briefly, the active, food-grade packaging resin is first melted and then the melted active, food-grade packaging resin is formed into a shaped, food packaging material. The conditions during subsequent melting of the resin pellets involves heating to temperature to about 100° C. to about 230° C., preferably about 140° C. to about 200° C. or about 150° C. to about 190° C. As will be appreciated by persons of skill in the art, the specific conditions (temperature, residence time, and extruder speed) will be dependent on the particular properties of the resin and the type of apparatus used for forming the packaging material. As shown in FIG. 1, depending on the type of shaped, food packaging material being produced, the pelletized active, food-grade packaging resin is processed on a film-forming apparatus 16 suitable to produce a single-layer film or multi-layer film by co-extrusion, extrusion coating, lamination, calendaring, etc.; or processed on a molding apparatus 18 suitable to produce a container or mating container components, such as a body and a lid, by injection molding, blow molding, extrusion molding, thermoforming, expanded bead blowing, etc.

For the film-forming apparatus 16, the pelletized active, food-grade packaging resin is again introduced into an extruder which passes the melt through an appropriate slotted or annular die. Film-forming apparatus 16 can be a casting-type apparatus in which the cast film is cooled or quenched. and then wound up on a roll. Alternatively, the film-forming apparatus 16 can be a blown or tubular processing apparatus that forces air into an extruded ring to expand the film prior to annealing, and then the film can be wound on a roll.

Orientation in the direction of extrusion is known as machine direction orientation (MD), orientation perpendicular to direction of extrusion is known as transverse direction (TD). Orientation may be accomplished by stretching or pulling a blown film in the MD, using a blow-up ratio to accomplish TD orientation. Blown films or cast films may also be oriented by a tenter-frame orientation subsequent to the film extrusion process, again in one or both directions. Orientation may be sequential or simultaneous, depending upon the desired film features. Orientation ratios may generally be in the range of 1:3 to 1:6 in the machine direction (MD) or 1:4 to 1:10 in the transverse direction (TD). Preferred orientation ratios are commonly from between three to six times in the machine direction and between four to ten times the extruded width in the transverse direction.

For multi-laminar films, the layer containing the ligand is intended to be the side exposed to the food product. The outer layer may one or more coatings applied thereto, such as for barrier, printing, and/or processing. Such coatings commonly include acrylic polymers, such as ethylene acrylic acid (EAA), ethylene methyl acrylate copolymers (EMA), polyvinylidene chloride (PVDC), poly(vinyl)alcohol (PVOH), and ethylene (vinyl)alcohol EVOH. The coatings are preferably applied by an emulsion coating technique, but may also be applied by co-extrusion and/or lamination.

In one type of molding apparatus 18, the pelletized active, food-grade packaging resin is again introduced into an extruder which passes the suitable melt into a mold body to produce a container or mating container components. After completion of the molding process, the mold itself is separated and the molded container (or component thereof) is removed from the mold and allowed to cool.

In another type of molding apparatus 18, the pelletized active, food-grade packaging resin is stored with a foaming agent suitable to allow for swelling of the resin, and thereafter the swollen resin pellets are blown into a mold and sintered to form the container component(s). After completion of the molding process, the mold is separated and the molded container (or component thereof) is removed from the mold and allowed to cool. Expanded bead blowing is typically used with polystyrene or polyethylene materials and a hydrocarbon (e.g., butane or pentane) as the foaming agent, although other materials can also be prepared in this manner, including polyamide resins foamed with carbon dioxide (Yeh et al., "Carbon Dioxide-Blown Expanded Polyamide Bead Foams with Bimodal Cell Structure," *Ind. Eng. Chem. Res.* 58(8):2958-2969 (2019), which is hereby incorporated by reference in its entirety).

In alternative embodiments, the extrusion apparatus used at step 12 (producing the ligand-grafted polymer) could be integrated directly with a film-forming apparatus 16 or molding apparatus 18, thereby avoiding the step of preparing the intermediate pelletized form of the active, food-grade packaging resin.

As noted above, a further aspect relates to an active, food-grade packaging material that is prepared from one of the active, food-grade packaging resins disclosed herein. In its basic form, the active, food-grade packaging material includes a body having a food contact surface and an external surface. Because of the reactive extrusion process employed, the body includes a polymeric material having covalently attached thereto a ligand (as described above) where the ligand is present on both the food contact surface and on the external surface (or surface facing away from the food contact surface). The ligand is also covalently bound to the polymer backbone between these surfaces, although that fraction is not surface exposed.

Figure 19A:
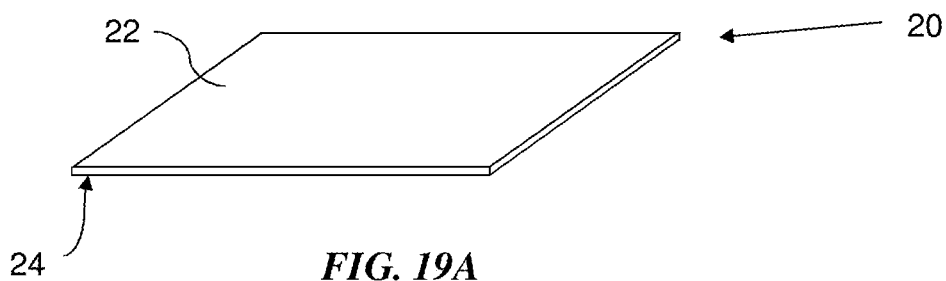
FIGS. 19A-C illustrate exemplary active, food-grade packaging materials including a single-layer film (FIG. 19A), a multi-layer film (FIG. 19B), and a container (FIG. 19C) that includes a body and a mating lid (see U.S. Design Patent D681451, which is hereby incorporated by reference in its entirety).

In one embodiment, illustrated in FIG. 19A, the active, food-grade packaging material is a single-layer sheet of film 20. The film 20 has ligand exposed on both its food contact surface 22 (upper side in FIG. 19A) and on the external surface 24 (lower side in FIG. 19A).

Figure 19B:
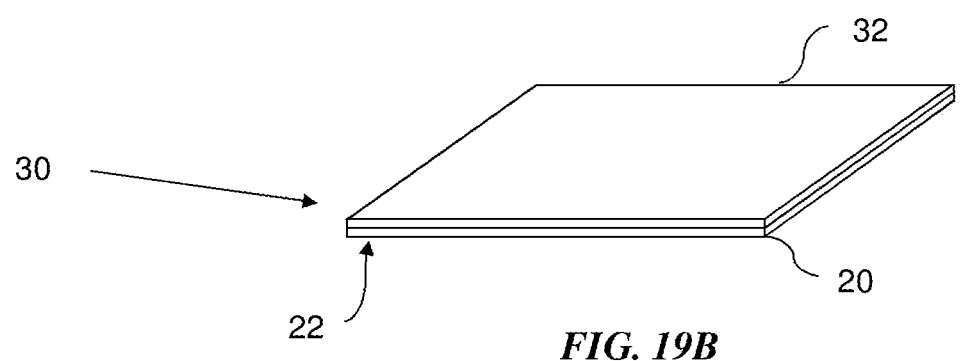

In another embodiment, illustrated in FIG. 19B, the active, food-grade packaging material is a multi-layer sheet of film 30 (dual layer as shown), which is formed with a first layer of film 20 prepared using one of the active, food-grade packaging resins disclosed herein and including a food contact surface 22 (lower side in FIG. 19B). The sheet of film 30 also contains a second layer of film 32 which is present on the side of film 20 facing away from the food contact surface 22.

It will be appreciated by persons of skill in the art that film 20 and film 30 are illustrative, and that the film can be in the form of a roll of film, an individual plastic bag, or a tube. In these embodiments, the film or bag may include the active, food-grade packaging material as one of several components. Alternatively, the film or bag may be formed entirely, or substantially entirely, from the active, food-grade packaging material as disclosed herein. One form of a bag that is substantially entirely formed of the active, food-grade packaging material is a bag having a resealable closure mechanism where the body of the bag is formed of the active, food-grade packaging material but the resealable closure mechanism is not.

Figure 19C:
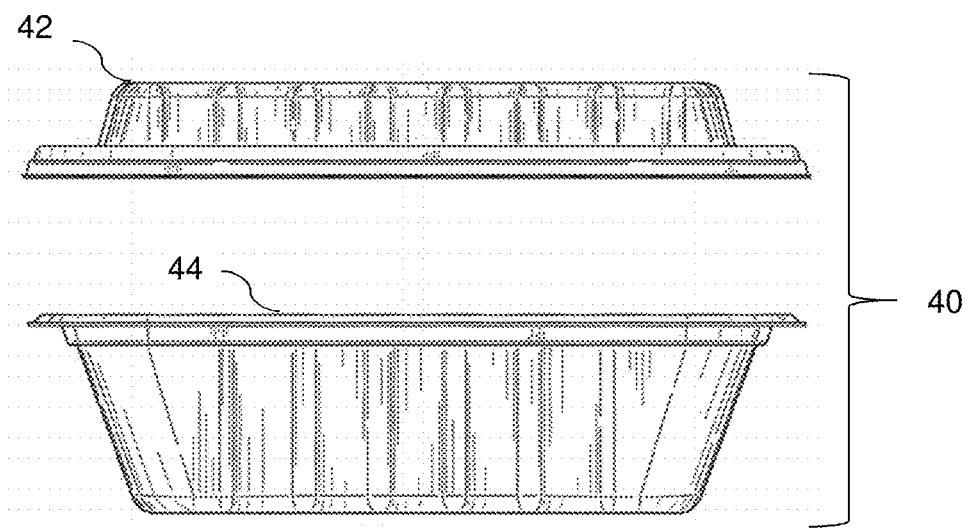

In a further embodiment, illustrated in FIG. 19C, the active, food-grade packaging material is a food storage container 40 that includes two component parts, lid 42 and container body 44. The lid 42 and container body 44 are formed to have a sealed snap-fit arrangement allowing the container 40 to have an air-tight seal. In one configuration, the container body 44 is the only component prepared using one of the active, food-grade packaging resins disclosed herein. In another configuration, both the lid 42 and container body 44 are prepared using one of the active, food-grade packaging resins disclosed herein. The resin used for the lid 42 and body 44 can be the same or different; if different, the ligand used in the active, food-grade packaging resin that forms the lid can be different from the ligand used in the active, food-grade packaging resin that forms the container body.

Regardless of the specific configuration, the lid 42 and container body 44 have their respective food contact surfaces facing the interior of the container 40, although the ligand is present on both the food contact surface and on the external surfaces of the container 40 when those components are formed of a single polymeric material, i.e., an active, food-grade packaging resin as disclosed herein.

Alternatively, the lid 42 and container body 44 may optionally have a multi-laminar construction such that a first polymeric material forms the bulk of the shaped component and a second polymeric material—an active, food-grade packaging resin disclosed herein—forms an interior surface or lining on that component, whereby the entirety of the food contact surfaces are formed of the active, food-grade packaging resin.

Although the container 40 is shown as a two component container, it should be appreciated by persons of skill in the art that the container could be a clam-shell type container, a container body 44 alone which is adapted for being sealed with a film of the invention or otherwise, or a beverage container or jug.

In the above embodiments, it is contemplated that both the film 20 of FIG. 19A, the multi-layer film 30 of FIG. 19B, and the container 40 of FIG. 19C (i.e., either one or both of its components) can be formed of one of the active, food-grade packaging resins as described herein, including (i) polylactic acid directly bonded to nitrolotriacetic acid as ligand as shown in FIG. 3; polypropylene acid directly bonded to ε-poly-L-lysine as ligand as shown in FIG. 9; polylactic acid cross-linked to nitrolotriacetic with the linker —CH$_2$CH$_2$—N(H)—C(O)-phenyl-C(O)—N(H)—CH$_2$CH$_2$— as shown in FIG. 13; and polylactic acid cross-linked to Nisin with the linker —CH$_2$CH$_2$—N(H)—C(O)-phenyl-C(O)—N(H)—CH$_2$CH$_2$— as shown in FIGS. 18A-B. As discussed above, in each of these embodiments, the specific ligand (nitrolotriacetic acid, ε-poly-L-lysine, or Nisin) is exposed on both the intended food contact surfaces and non-food contact surfaces, as well as covalently bound to the polymer backbone within the interior (or bulk) of the film and container components.

In use, the disclosed active, food-grade packaging materials are intended to be used to package perishable food items by sealing a perishable food item in a package that includes an active, food-grade packaging material as described herein, whereby the food contact surface of the active packaging material, and the ligand thereon, contacts the perishable food item to reduce food spoilage while remaining covalently bound to the polymeric material. The package may include any known forms, shapes, or configurations, several of which are illustrated in FIGS. 19A-C. Liquid storage containers or jugs are also contemplated.

As used herein, "reduce food spoilage" is intended to mean that the process of spoilage is inhibited and, thus, delayed relative to the same food stored in a comparable food-grade packaging material lacking the active ligand. Inhibition and delay of food spoilage can be measured in any of a variety of ways, which are well known in the art, including sensory evaluation (measurement of degradation products), gas production and packaging bloating, or microbial count.

It is contemplated that the active packaging material as disclosed herein can be used with a wide range of food products, i.e. breads, meats, fish, fruits and vegetables as well as juices prepared therefrom, and cheese, milk, and other dairy products.

In storing perishable food items in contact with the active packaging material, it is preferable that the ligand exhibits little or no migration from the packaging material into the food product. Based on the covalent attachment of the ligand to the polymeric resin, it is fully expected that the ligand is non-migratory in this respect.

In carrying out the storage of perishable food items in accordance with the present invention, it is also contemplated that the use of the active packaging material can be combined with other food preservation packaging techniques and materials, including the use of a sachet inside the package which contains any of one or more known types of oxygen scavengers, the use of vapor phase packaging environments that inhibit growth of spoilage organisms, etc.

Wherever the word 'about' is employed herein in the context of amounts, for example absolute amounts, or relative amounts such as concentrations and ratios, time frames, and parameters, such as such as temperature, pressure, weight percentage, dimension, etc., it will be appreciated that such values are approximate and as such may vary by ±10%, for example ±5% and preferably 2% (e.g. ±1%) from the actual numbers specified herein. This is the case even if such numbers are presented as percentages in the first place (for example 'about 10%' may mean ±10% about the number 10, which is anything between 9% and 11% inclusive thereof).

As used herein, "consisting essentially of" means that a composition includes the recited components as well as any additional components that are present in inconsequential amounts (e.g., less than about 0.5 wt %, 0.4 wt %, 0.3 wt %, 0.2 wt %, or 0.1 wt %) or additional components that may be present in larger amounts but despite their presence do not materially alter the behavior of the polymeric material, ligand, and/or cross linker/initiator in forming the active, food-grade packaging resin or active, food-grade packaging material made therefrom.

EXAMPLES

The examples below are intended to exemplify the practice of embodiments of the disclosure but are by no means intended to limit the scope thereof.

Materials and Methods for Examples 1-3

Materials: L-Ascorbic acid, 2,2'-azinobis-(3-ethylbenzothiazoline-6-sulfonic acid) (>98%), 2,6-dichloroindophenol sodium salt hydrate, dicumyl peroxide (98%), ethylenediaminetetraacetic acid disodium salt dihydrate (EDTA), imidazole (99%), hydrochloric acid (trace metal grade), 6-hydroxy-2,5,7,8-tetramethylchromane-2-carboxylic acid (97%), potassium persulfate (≥99%), nitrilotriacetic acid (≥99%), and tetrahydrofuran (THF) (≥99.9%, inhibitor free) were purchased from Millipore Sigma (Burlington, Mass.). Sodium acetate trihydrate, sodium hydroxide, oxalic acid dihydrate, sodium phosphate monobasic monohydrate, were purchased from Fisher Scientific (Fair Lawn, N.J.). NatureWorks Ingeo® reactive extrusion grade poly(lactic acid) 4044D (≤0.3% residual lactide, density 1.24 g/cc) was purchased from Jamplast, Inc. (Ellisville, Mo.). All materials and reagents were used as received without further purification unless otherwise noted.

Preparation of gPLA: Reactive extrusion grade poly(lactic acid) 4044D was processed in accordance with manufacturer recommendations. Briefly, PLA 4044D was first dried at 80° C. for four hours in a gravimetric oven prior to storage over calcium sulphate desiccant. Dried PLA 4044D was then extruded at 50 RPM through a Process 11 Parallel Twin Extruder (Thermo Fisher Scientific, Waltham, Mass.) equipped with a 1 mm die and eight heating zones set to 145° C., 190° C., 200° C., 200° C., 200° C., 200° C., 200° C., and 210° C. at the die. Extruded PLA was then pelletized using a Varicut Pelletizer (Thermo Fisher Scientific, Waltham, Mass.) to form 0.5 mm granular PLA 4044D. Granular PLA 4044D was stored in amber bottles with calcium sulfate desiccant until use. Granular PLA 4044D is identified below as either native, granular PLA or gPLA, and this was used as the starting material for preparation of both cross-linked PLA ("cPLA") and nitrilotriacetic acid ("NTA") chelator-functionalized PLA ("PLA-g-NTA").

Gel Permeation Chromatography (GPC) Analysis: To determine molecular weight of gPLA, cPLA, and PLA-g-NTA, pelletized samples were dissolved in tetrahydrofuran (1 mg/mL) and analyzed on a Waters Ambient Temperature Aqueous GPC system (Waters, Milford, Mass.) equipped with Suprema column with a tetrahydrofuran aqueous mobile phase. Samples were detected using a Waters 486 UV-Vis detector and analyzed using polystyrene standards. Molecular weight was analyzed using the Breeze 2 GPC Software (Waters, Milford, Mass.).

Attenuated Total Reflection Fourier Transform Infrared Spectroscopy (ATR-FTIR): Changes in polymer chemistry due to reactive extrusion were confirmed using attenuated total reflectance Fourier transform infrared spectroscopy (ATR-FTIR) on an IRPrestige FTIR spectrometer (Shimadzu Scientific Instruments, Inc., Kyoto, Japan) equipped with a diamond ATR crystal. Spectra (32 scans) were taken using Happ-Genzel apodization and a resolution of 4 $cm^{-1}$ with air as a background spectrum. Spectra of PLA-g-NTA were compared to cPLA and gPLA to characterize introduction of chelating groups.

X-ray Photoelectron Spectroscopy (XPS) Surface Analysis: Surface chemistry (top 10 nm) of gPLA, cPLA, and PLA-g-NTA films were analyzed using a Scienta Omicron ESCA-2SR X-Ray photoelectron spectroscope (Scienta Omicron, Taunusstein, Germany) with operating pressure of $4 \times 10^{-9}$ torr. Monochromated X-ray beams were produced by an Al Kα (1486.7 eV) target directed at a 3 mm×3 mm spot. Photoelectrons were collected at a 0° emission angle with source to analyzer angle of 54.7°. Binding energy was determined with a hemispherical analyzer using a pass energy of 200 V, W. F. of 4.5, and energy step of 1 eV. A flood gun was utilized to inhibit charging effect on non-conductive samples. Atomic composition was determined by analyzing XPS data on CasaXPS software (Casa Software Ltd, Teignmouth, UK).

Surface Wettability Measurements: Surface wettability of gPLA, cPLA, and PLA-g-NTA films were characterized using dynamic contact angles with an Attention Theta Optical Tensiometer (Biolin Scientific, Stockholm, Sweden). Advancing and receding water contact angles were measured in accordance with Korhonen et. al. (Korhonen et al., "Reliable Measurement of the Receding Contact Angle," Langmuir 29(12):3858-3863 (2013), which is hereby incorporated by reference in its entirety). Briefly, advancing water contact angle was measured by depositing a droplet of deionized water at a rate of 0.5 μL/second. Advancing contact angle was defined as the maximum contact angle prior to the advance of the contact baseline. Similarly, receding contact angle was measured by depositing a 4 μL droplet of deionized water on the surface of a film and removing the water at a rate of 0.5 μL/second. The receding contact angle was defined as the minimum contact angle prior to the recession of the contact baseline. Dynamic contact angle measurements were performed on distinct regions of quadruplicate films totaling 12 measurements per treatment (i.e., three spots on each of four independent films).

Modulated Differential Scanning Calorimetry Analysis: Crystallization and thermal properties of gPLA, cPLA, and PLA-g-NTA samples were analyzed using modulated differential scanning calorimetry. All experiments were conducted in sealed aluminum pans on a TA Instruments Q1000 Modulated Differential Scanning Calorimeter equipped with a 50 chamber autosampling platform in a nitrogen atmosphere. An empty sealed aluminum pan was used as reference. All samples were run using a heat, cool, heat regime to eliminate any thermal artifacts at a heating rate of 10° C./min and cooling rate of 5° C./min from 50° C. to 250° C. Glass transition, cold crystallization temperature, and melting temperatures were quantified using TA Universal Analysis (TA Instruments (New Castle, Del.) software.

Film Thickness Analysis: Film thickness of gPLA, cPLA, and PLA-g-NTA was measured using a Snapthick (iGaging®, San Clemente, Calif.) 3-Way Digital Electronic Thickness Gauge.

Radical Scavenging Activity Analysis: The ability of the chelating poly(lactic acid) films to scavenge free radicals was characterized using a modified Trolox Equivalent Antioxidant Capacity (TEAC) method (Re et al., "Antioxidant Activity Applying an Improved ABTS Radical Cation Decolorization Assay," *Free Radical Bio Med* 26(9-10): 1231-1237 (1999), which is hereby incorporated by reference in its entirety) as previously described (Roman et al., "Retaining Oxidative Stability of Emulsified Foods by Novel Nonmigratory Polyphenol Coated Active Packaging," *J Agr Food Chem* 64(27):5574-5582 (2016); Asghar et al., "Modified 2,2'-Azinobis(3-Ethylbenzo Thiazoline)-6-Sulphonic Acid Radical Cation Decolorization Assay for Antioxidant Activity of Human Plasma and Extracts of Traditional Medicinal Plants," *Acta Chim Slov* 55(2):408-418 (2008), each of which is hereby incorporated by reference in its entirety). In brief, 7 mM 2,2'-azinobis-(3-ethylbenzothiazoline-6-sulfonic acid) (ABTS) in 18MΩ·cm at 25° C. Milli-Q water was mixed with 2.45 mM potassium persulfate in 18MΩ·cm at 25° C. Milli-Q water in a 1:1 mixture to form an ABTS stock solution and incubated for 16 hours in the dark. Working ABTS solution was prepared by diluting stock ABTS solution to an absorbance at 734 nm of 0.700±0.002 using 4 mM phosphate buffer pH 7.4. Coupons of gPLA, cPLA, or PLA-g-NTA films (1×1 cm$^2$) were covered in 300 µL of working ABTS solution in a 24 well plate and incubated at 30° C. in the dark with shaking at 125 rpm for 10 minutes. Radical scavenging capacity was quantified as Trolox$_{(eq)}$/cm$^2$, calculated by percent absorbance at 734 nm with comparison to a Trolox standard curve (30 µM to 0 µM Trolox) with 4 mM phosphate buffer, pH 7.4 as blank.

Metal Chelating Analysis: Iron chelating capacity of chelating poly(lactic acid) was analyzed using inductively coupled mass spectroscopy (ICP-MS) utilizing a modified procedure of the U.S Consumer Product Safety Commission ("Standard Operating Procedure for Determining Total Lead (Pb) in Nonmetal Children's Products," United States Consumer Product Safety Commission: Rockville, Md. (2012); and Lin et al., "Photocurable Coatings Prepared by Emulsion Polymerization Present Chelating Properties," *Colloid Surface B* 172:143-151 (2018), each of which is hereby incorporated by reference in its entirety). Film samples were incubated in the dark in a solution of 0.06 mM ferric chloride in 0.05M sodium acetate/imidazole buffer at pH 4 for 72 hours, followed by rinsing three times under 18MΩ·cm at 25° C. Milli-Q water and drying and storage over calcium sulfate desiccant. Coupons of film (1×2 cm$^2$, ~70 mg) were digested in 5 mL of trace metal grade nitric acid and 2 mL of hydrogen peroxide in a microwave oven (Milestone Srl, Milan, Italy) with a ramp to 210° C. for 20 minutes, hold at 210° C. for 20 minutes, and cool for 10 minutes. Digested samples were diluted with 18MΩ·cm at 25° C. Milli-Q water and ICP-MS analysis was performed on a high resolution Element2 ICP-MS (ThermoFisher Scientific, Waltham, Mass.) equipped with a quartz spray chamber and ESI SC-FAST-enabled autosampler (PerkinElmer Inc, Waltham, Mass.). Iron concentration in digested samples was determined using internal standard iron solutions (1000 ppm ICP-MS Standard, Millipore Sigma, St. Louis, Mo.) with comparison to nitric acid/hydrogen peroxide blank as well as gPLA and cPLA controls.

Protection of Ascorbic Acid from Iron Catalyzed Degradation: gPLA, cPLA, and PLA-g-NTA films were analyzed for their ability to delay oxidative degradation of bioactive components with ascorbic acid solutions serving as a model bioactive. Ascorbic acid degradation was analyzed using a modified dichlorindophenol assay based on Association of Official Analytical Chemists Method No. 967.21 as previously described (Lin et al., "Photo-Curable Metal-Chelating Coatings Offer a Scalable Approach to Production of Antioxidant Active Packaging," *J Food Sci* 83(2):367-376 (2018), which is hereby incorporated by reference in its entirety). Briefly, 1 cm$^2$ films were placed in 10 mL glass vials with 1 mL of ascorbic acid solution (20 mM ascorbic acid in 10 mM sodium acetate/imidazole buffer at pH 4) and stored at 37° C. for time periods up to 9 days. Aliquots of 200 µL of ascorbic acid solution were mixed with 4.8 mL of 0.04 wt % oxalic acid in water, after which 0.3 mL of this mixture was added to 4.7 mL of 0.2 mM dichloroindophenol in water. Absorbances at 520 nm were immediately recorded and ascorbic acid concentration was determined by comparison to an ascorbic acid standard curve. Blank (no film), gPLA, cPLA, and 0.8 mM EDTA (corresponding to 233 ppm) served as controls. Data were fit to a one phase decay model to determine half-life of ascorbic acid.

Statistical Analysis: Reactive extrusion synthesis of cross-linked and chelating poly(lactic acid) was performed in duplicate batches on independent days. Film thickness of extruded films was measured in triplicate on three separate films. Surface wettability analysis of gPLA, cPLA, and PLA-g-NTA were performed on quadruplicate films and performed with triplicate measurements. ATR-FTIR data are representative spectra of four films evaluated in triplicate with characteristic band analysis performed in OriginPro 9.0 (OriginLab Corporation, Northampton, Mass.) and KnowItAll Software (BioRad Laboratories, Hercules, Calif.). Metal chelating capacity analysis was performed on at least triplicate films on a single representative batch. Ascorbic acid degradation studies and radical scavenging assays were performed with quadruplicate films and repeated on independent days. GPC, XPS, and DSC were performed on a single representative batch. Nonlinear single decay fitting of ascorbic acid degradation was performed in GraphPad Prism 6.0 (La Jolla, Calif.). Statistical differences between samples were analyzed using one-way ANOVA with Tukey HSD multiple comparisons ($p<0.05$) performed on GraphPad Prism 6.0 (La Jolla, Calif.).

Example 1—Synthesis and Characterization of Cross-Linked PLA

Optimization of PLA cross-linking was carried out by reactive extrusion of gPLA and the peroxide initiator dicumyl peroxide (DCP).

Figure 2:
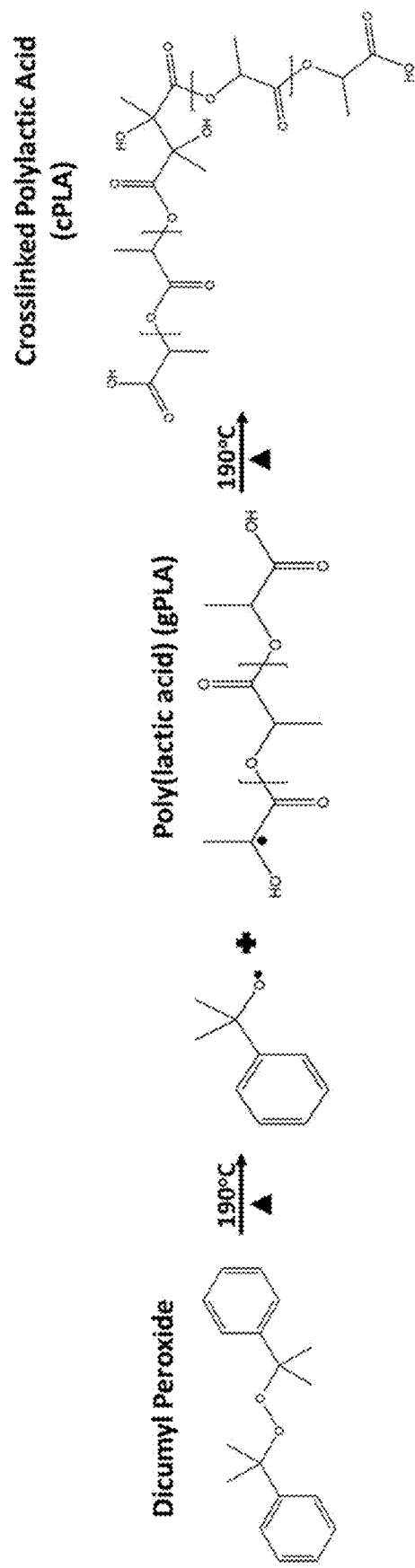
FIG. 2 illustrates an exemplary reaction scheme for radical crosslinking of native, granular polylactic acid ("gPLA") to form cross-linked polylactic acid ("cPLA") using thermal initiator dicumyl peroxide ("DCP"). Other bifunctional peroxides should behave similarly.

Use of radical peroxide initiated reactive extrusion for graft polymerization and crosslinking of petroleum-derived (Moad, "The Synthesis of Polyolefin Graft Copolymers by Reactive Extrusion," *Prog Polym Sci* 24(1):81-142 (1999), which is hereby incorporated by reference in its entirety) and bio-based (Bruster et al., "Plasticization of Polylactide with Myrcene and Limonene as Bio-Based Plasticizers: Conventional vs. Reactive Extrusion," *Polymers-Basel* 11(8):1363, doi:10.3390/polym11081363 (2019); Formela et al., "Reactive Extrusion of Bio-Based Polymer Blends and Composites—Current Trends and Future Developments," *Express Polym Lett* 12(1):24-57 (2018); Arrieta et al., "On the Use of PLA-PHB Blends for Sustainable Food Packaging Applications," *Materials* 10(9):1008 doi:10.3390/ma10091008 (2017), each of which is hereby incorporated by reference in its entirety) polymers has been reported for biomedical application (Davachi et al., "Preparation and Characterization of Poly L-Lactide/Triclosan Nanoparticles for Specific Antibacterial and Medical Applications," *Internat. J. Polym. Mater. and Polym. Biomater.* 64(10):497-508 (2015), which is hereby incorporated by reference in its entirety), drug delivery (Farhat et al., "Polysaccharides and Lignin Based Hydrogels with Potential Pharmaceutical Use as a Drug Delivery System Produced by a Reactive Extrusion Process," *Abstr Pap Am Chem Soc.* #257 (2019), which is hereby incorporated by reference in its entirety), and polymer synthesis (Moad, "The Synthesis of Polyolefin Graft Copolymers by Reactive Extrusion," *Prog Polym Sci* 24(1): 81-142 (1999), which is hereby incorporated by reference in its entirety) applications, and presents an opportunity for active packaging technology translation. Successful grafting of functional ligands to base polymers using reactive extrusion involved optimization of the concentration of peroxide initiator to prevent high barrel pressure and instrument failure due to excess intramolecular crosslinking and subsequent high melt viscosity (Wei et al., "Peroxide Induced Cross-Linking by Reactive Melt Processing of Two Biopolyesters: Poly(3-hydroxybutyrate) and poly(L-lactic acid) to Improve Their Melting Processability," *J Appl Polym Sci* 132(13):41724 (2015), which is hereby incorporated by reference in its entirety). The performance of thermally active radical initiators such as peroxides depends on their rate of decomposition, following first order kinetics to produce peroxide radicals. PLA extrusion temperature profile ranges from 145° C. to 210° C. at the die with a residence time of about 2.5 minutes based on PLA manufacturer recommendations to allow for adequate reaction time and proper shearing rates. With a half-life of less than 42 seconds at 200° C., dicumyl peroxide (DCP) was thus selected as a suitable radical initiator for grafting and crosslinking of gPLA (Wei et al., "Peroxide Induced Cross-Linking by Reactive Melt Processing of Two Biopolyesters: Poly(3-hydroxybutyrate) and poly(L-lactic acid) to Improve Their Melting Processability," *J Appl Polym Sci* 132(13):41724 (2015), which is hereby incorporated by reference in its entirety) by the simplified reaction scheme in FIG. 2.

To determine the percentage of DCP in reactive extrusion that yielded highest grafting potential without instrument failure, crosslinked PLA 4044D was formed using gPLA (prepared as described above) mechanically mixed with 0.1%, 0.3%, 0.5%, 0.7%, and 1% w/w dicumyl peroxide and extruded at 50 RPM through a Process 11 Parallel Twin Extruder (Thermo Fisher Scientific, Waltham, Mass.) equipped with a 1.5 mm die and eight heating zones set to 145° C., 190° C., 200° C., 200° C., 200° C., 200° C., 200° C., and 210° C. at the die. Crosslinked PLA (cPLA) was then pelletized using a Varicut Pelletizer (Thermo Fisher Scientific, Waltham, Mass.) to form 1 mm pellets. Pellets were stored with calcium sulphate desiccant prior to analysis by gel permeation chromatography.

Dicumyl peroxide concentration was optimized by varying its weight percent in gPLA resin between 0.1 and 1% w/w and analyzing the molecular weight of the resulting cPLA extrudate by gel permeation chromatography (GPC). At concentrations greater than 1% over-torqueing and instrument failure was observed and thus not further investigated. As observed in Table 1 below, 0.5% dicumyl peroxide produced the greatest increase of weight average molecular weight ($M_w$) with no observed effect on the number average molecular weight ($M_n$).

TABLE 1

Optimization of wt. % Dicumyl Peroxide with gPLA to form cPLA

| DCP % wt. | Mn (Da) | Mw (Da) |
|---|---|---|
| 0.0 | 97156 | 196713 |
| 0.1 | 97202 | 202988 |
| 0.3 | 93503 | 241938 |
| 0.5 | 103145 | 291252 |
| 0.7 | 100074 | 217654 |
| 1.0 | 84806 | 244149 |

Increases in $M_w$ in the synthesis of cPLA represent formation of higher molecular weight compounds due to intramolecular crosslinking of gPLA, and should afford high graft efficiency for preparation of PLA-g-NTA under those conditions. At dicumyl peroxide concentrations greater than 0.5%, cPLA was not completely soluble in tetrahydrofuran and thus weight average molecular weights higher than ~291 kDa were not observed. To limit issues caused by high instrumental pressure while retaining grafting efficiency, 0.5 wt % dicumyl peroxide was used for synthesis of metal chelating PLA by reactive extrusion in the example below.

Example 2—Synthesis and Characterization of Nitrilotriacetic Acid-Functionalized PLA Nitrilotriacetic acid (NTA) functionalized PLA 4044D (PLA-g-NTA) was synthesized by radical graft polymerization of a chelating active precursor (NTA) onto PLA resin during extrusion with gPLA and DCP. This mechanism is illustrated in FIG. 3. NTA is a biodegradable aminotricarboxylic acid (Pinto et al., "Biodegradable Chelating Agents for Industrial, Domestic, and Agricultural Applications—a Review," *Environ Sci Pollut R* 21(20):11893-11906 (2014), which is hereby incorporated by reference in its entirety) analogous to EDTA in its affinity toward transition metals such as iron, Fe(III), with stability constants of 15.87 (Anderegg, "Critical Survey of Stability-Constants of Nta Complexes," *Pure Appl Chem* 54(12):2693-2758 (1982), which is hereby incorporated by reference in its entirety) and 25.10 (Roman et al., "Metal-Chelating Active Packaging Film Enhances Lysozyme Inhibition of *Listeria monocytogenes*," *J Food Protect* 77(7):1153-1160 (2014), which is hereby incorporated by reference in its entirety) for NTA and EDTA, respectively, making it a prime candidate in preparation of metal-chelating bio-based polymers. NTA has three equivalent secondary carbons with reduced carbon-hydrogen bond energies due to its position adjacent to a lone pair containing nitrogen, making them prime candidates for radical abstraction and suitable for radical grafting polymerization.

Briefly, gPLA (prepared as described in Materials and Methods) was mechanically mixed with 0.5% w/w dicumyl peroxide and 3% w/w NTA and extruded at 50 RPM through a Process 11 Parallel Twin Extruder (Thermo Fisher Scientific, Waltham, Mass.) equipped with a 1.5 mm die and eight heating zones set to 145° C., 190° C., 200° C., 200° C., 200° C., 200° C., 200° C., and 210° C. at the die. PLA-g-NTA was then pelletized using a Varicut Pelletizer (Thermo Fisher Scientific, Waltham, Mass.) to form 1 mm pellets. Samples of PLA-g-NTA pellets (2 g) were placed between two 5 mil Kapton Films and allowed to melt in a Carver hot press (Wabash, Ind.) at 190° C. for one minute prior to pressing at 10,000 lbs to form films. Films were then cut to 1 cm×2 cm for further characterization. cPLA films were prepared in this same manner using cPLA prepared as described in Example 1; the cPLA films serves as a process control to determine if any changes in chelating or antioxidant capacity were a result of the peroxide initiator.

Film thickness of gPLA, cPLA, and PLA-g-NTA was not significantly different with an average thickness of 0.25±0.01 mm, 0.25±0.04 mm, and 0.27±0.02 mm, respectively.

Attenuated total reflection Fourier Transform Infrared (ATR-FTIR) spectra were acquired to confirm covalent grafting of NTA to PLA, with native, granular PLA (gPLA) and cPLA films serving as controls (FIG. 4). Despite the presence of absorbance bands in native poly(lactic acid) (e.g., alkyl, carboxylate, ester, hydroxyl) that overlap with bands indicative of grafted NTA (e.g., alkyl, carboxylate, ester, hydroxyl), and the lack of strong characteristic absorbances for tertiary amines, a unique functional group in PLA-g-NTA, FTIR analysis supported successful synthesis of PLA-g-NTA.

Native, granular PLA (gPLA), cPLA, and PLA-g-NTA all presented absorbance bands at 2990 cm$^{-1}$ and 2945 cm$^{-1}$, indicative of alkyl stretching, as well as 1747 cm$^{-1}$ and 1180 cm$^{-1}$ for C=O stretching and C—O stretching, respectively. These parallel absorbance bands were expected as the base polymer contains each of these functional groups and shifts due to the incorporation of 3 wt % NTA were not anticipated. Two new bands at wavenumbers 2919 cm$^{-1}$ and 2870 cm$^{-1}$ in the alkyl stretch region, highlighted in FIG. 4 and not found with cPLA or native PLA (gPLA), emerged in the PLA-g-NTA spectrum. These bands were attributed to the creation of new secondary carbon hydrogen bonds found in the bio-based chelating polymer after grafting of the chelating ligand. Furthermore, the lack of other appearances, disappearances, or shifts of characteristic absorbance bands between native, granular PLA (gPLA), cPLA, and PLA-g-NTA indicated no beta scission or degradation of the polymer as a result of radical grafting by reactive extrusion.

To confirm chemistry and surface organization of bound chelating ligands, bonding state and atomic percentage of gPLA, cPLA, and PLA-g-NTA were determined by X-ray photon spectroscopy ("XPS") as shown in Table 2 below.

XPS indicated an atomic percentage of 62.64% and 63.25% carbon, 34.75% and 36.35% oxygen, and 0.23% and 0.36% nitrogen present for gPLA and cPLA, respectively. The similarity in atomic percentages between gPLA and cPLA films were anticipated as there was no introduction of new compounds between samples and no change in atomic composition of starting materials (see FIG. 2). The atomic percentages of carbon and oxygen are in agreement with those found in the literature (Kiss et al., "XPS and Wettability Characterization of Modified Poly(Lactic Acid) and Poly(lactic/glycolic acid) Films," *J Colloid Interf Sci* 245 (1):91-98 (2002), which is hereby incorporated by reference in its entirety) and molecular structures for commercial poly(lactic acid). The presence of trace nitrogen (near the limit of detection of the instrument) may be attributed to atmospheric nitrogen. Following graft polymerization of NTA to PLA, the atomic percentages shifted slightly to 63.33% carbon, 33.96% oxygen (decrease), and 0.45% nitrogen (increase) showing indications of successful grafting. When accounting for atmospheric nitrogen utilizing gPLA as a reference, the atomic percentage of nitrogen contributed by the NTA moiety in the sample was 0.22%, which is similar to the calculated value of 0.17%. PLA-g-NTA also presented a change in chemical bonding states with a decrease in C=O/CC ratio of 0.479 compared to gPLA and cPLA of 0.516 and 0.570, respectively. Grafting NTA to PLA increased the proportion of alkyl groups in the polymer by introducing seven new CC bonds compared to only three C=O and CO bonds. An increase in the C=O/CC ratio was observed for cPLA compared to gPLA, which may have been caused by increases in adventitious carbon on the polymer surface. These results further support successful grafting and surface orientation of NTA on PLA-g-NTA as adventitious carbon would increase rather than decrease the ratio of C=O/CC. These data are in agreement with the formation of the new alkyl bonds observed in ATR-FTIR and indicate suitable surface activity of the metal chelating groups on the polymer.

To further characterize the surface orientation of NTA ligands in PLA-g-NTA, surface wettability was studied using dynamic water contact angle measurements (advancing: $\theta_a$, receding: $\theta_r$). Contact angle measurements using sessile water drop experiments were employed to quantify the relationship at the interface of the solid surface and liquid solvent in air, with higher contact angles indicating less affinity between the solvent and the solid (Korhonen et al., "Reliable Measurement of the Receding Contact Angle," *Langmuir* 29(12):3858-3863 (2013), which is hereby incorporated by reference in its entirety). Advancing and receding water contact angles measure the angle of the water droplet at the interface as the droplet is increased and decreased, respectively, and is more meaningful than static contact angle (Korhonen et al., "Reliable Measurement of the

TABLE 2

Summary of XPS Spectral Data Indicating Atomic Composition, Chemical Bonding States of Carbon, and Bonding State Ratios of gPLA, cPLA, and PLA-g-NTA Films

| Sample | Carbon (At. %) | Oxygen (At. %) | Expected Nitrogen (At. %) | Nitrogen (At. %) | CC (At. %) | CO (At. %) | C=O (At. %) | C=O/CC |
|---|---|---|---|---|---|---|---|---|
| gPLA | 62.64 | 34.75 | 0.00 | 0.23 | 48.70 | 26.17 | 25.13 | 0.52 |
| cPLA | 63.25 | 36.35 | 0.00 | 0.36 | 48.15 | 24.42 | 27.43 | 0.57 |
| PLA-g-NTA | 63.33 | 33.96 | 0.17 | 0.45 | 50.70 | 25.00 | 24.29 | 0.48 |

Values represent single representative films

Receding Contact Angle," *Langmuir* 29(12):3858-3863 (2013), which is hereby incorporated by reference in its entirety). The difference between these two measurements equate to the contact angle hysteresis, which is characterized as the "activation energy" of the solvent at the interface (Gao et al., "Contact Angle Hysteresis Explained," *Langmuir* 22(14):6234-6237 (2006), which is hereby incorporated by reference in its entirety). As shown in Table 3 below, films prepared from gPLA and cPLA presented similar advancing contact angles (P>0.05) of 86.35°±2.49 and 85.15°±2.61, respectively, exhibiting near hydrophobic characteristics ($\theta_a$~90°) (Forch et al., *Surface Design: Applications in Bioscience and Nanotechnology*, Wiley VHC verlag GmbH & Co (2009), which is hereby incorporated by reference in its entirety). After grafting of NTA onto PLA, the advancing contact angle decreased significantly from the gPLA and cPLA controls (P<0.001) demonstrating increased hydrophilicity from the introduction of the polar carboxylic acids in NTA. Further, compared to the contact angle hysteresis of native PLA (gPLA) films of 31.89±2.27° and cPLA of 37.77°±2.32, the hysteresis of PLA-g-NTA of 21.79° ±1.72 is significantly smaller (P<0.001) indicating a smaller activation energy for the adsorption of hydrophilic solvents on the surface and greater interfacial interaction. Interestingly, the receding contact angle of PLA-g-NTA increased compared to gPLA and cPLA. As receding contact angle is known to be related to contact angle hysteresis, which is known to be largely influenced by structure (Neumann et al., "Thermodynamics of Contact Angles: 1. Heterogeneous Solid Surfaces," *J Colloid Interf Sci* 38(2):341-358 (1972); Lam et al., "Study of the Advancing and Receding Contact Angles: Liquid Sorption as a Cause of Contact Angle Hysteresis," *Adv Colloid Interfac* 96(1-3):169-191 (2002), Dettre et al., "Contact Angle Measurements on Heterogeneous Surfaces," *J Phys Chem-Us* 69(5):1507-1515 (1965), each of which is hereby incorporated by reference in its entirety), this increase may be attributed to a change in morphology with the formation of grafted NTA groups. The improved interfacial interactions of PLA-g-NTA with hydrophilic solvents has particular benefits in water-based food systems, where elevated immobilized chelator-transition metal interactions between packaging materials and food components lead to higher chelator efficacy.

TABLE 3

Dynamic Water Contact Angles of gPLA, cPLA, and PLA-g-NTA Films

| Sample | Advancing Contact Angle ($\theta_a$) | Receding Contact Angle ($\theta_r$) | Hysteresis |
|---|---|---|---|
| gPLA | 86.35° ± 2.49 | 54.46° ± 2.67 | 31.89° ± 2.27 |
| cPLA | 85.15° ± 2.61 | 47.38° ± 2.76 | 37.77° ± 2.32 |
| PLA-g-NTA | 79.91° ± 1.58 | 58.13° ± 1.38 | 21.79° ± 1.72 |

Values represent average and standard error of at least eight measurements on at least three separate films.

Figure 5A:
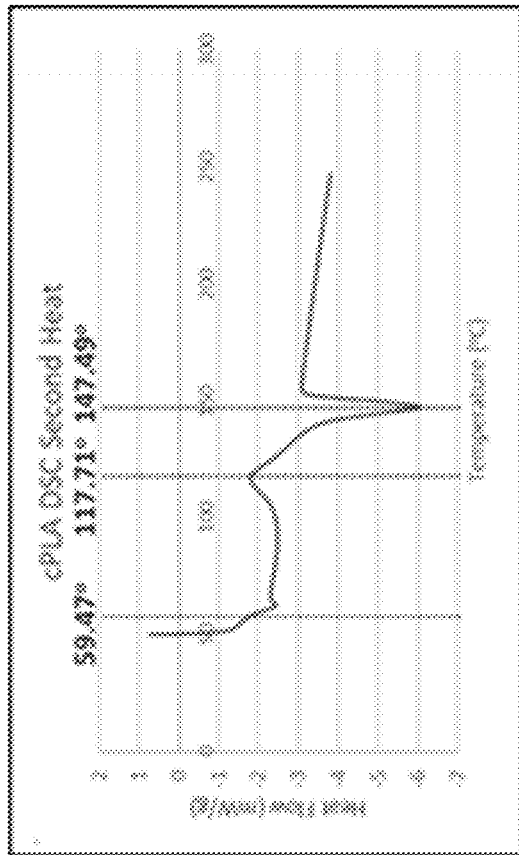
FIGS. 5A-C are representative examples of second heating modulated differential scanning calorimetry thermograms of heat, cool, heat cycles on gPLA (FIG. 5A), cPLA (FIG. 5B), and PLA-g-NTA (FIG. 5C) granules from 50° C. to 250° C. indicating $T_g$, $T_{cc}$, and $T_m$ of extruded polymers. Values represent a single representative run of each sample.
Figure 5B:
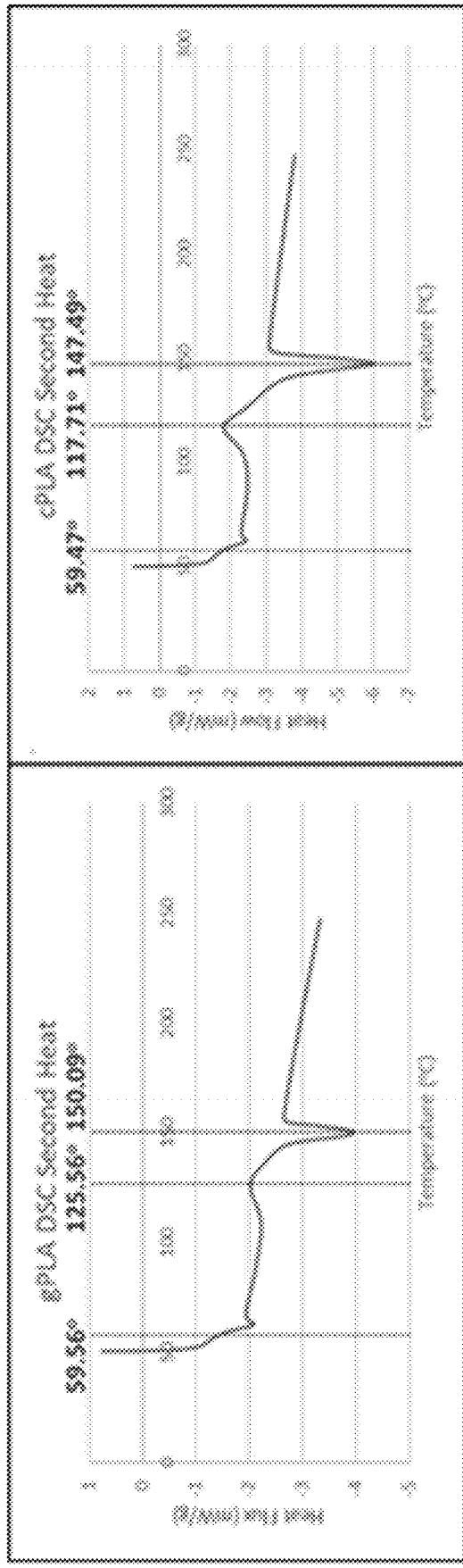
Figure 5C:
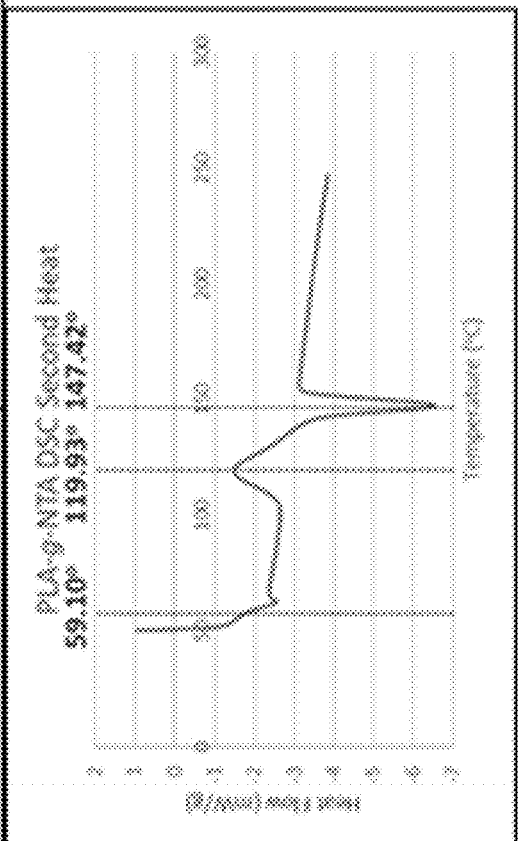

Common issues with the incorporation of functional materials into thermoplastics is their immiscibility upon extrusion as well as the degradation of desirable thermal properties of the base polymer (Arrieta et al., "On the Use of PLA-PHB Blends for Sustainable Food Packaging Applications," *Materials* 10(9):1008, doi:10.3390/ma10091008 (2017), which is hereby incorporated by reference in its entirety). Therefore, the thermal properties of PLA-g-NTA were compared to gPLA and cPLA utilizing modulated Differential Scanning Calorimetry under a heat, cool, heat profile from 50 to 250° C. (see FIGS. 5A-C generally). PLA is a semi-crystalline polymer exhibiting three main thermal phases upon heating: glass transition ($T_g$), cold crystallization ($T_{cc}$), and melting ($T_m$). The thermogram of gPLA (FIG. 5A) generally agrees with literature values of 61° C., 127° C., 157° C. for $T_g$, $T_{cc}$, and $T_m$, respectively (Cao et al., "DSC Study of Biodegradable Poly(lactic acid) and Poly (hydroxy ester ether) Blends," *Thermochim Acta* 406(1-2): 115-127 (2003), which is hereby incorporated by reference in its entirety), although the values of gPLA samples are somewhat lower. Following radical grafting polymerization, decreases in crystallization and melting temperature were observed, shifting from 125.56° C. and 150.09° C. in gPLA to 117.71° C. and 147.49° C. in cPLA and 119.93° C. and 147.42° C. in PLA-g-NTA.

These decreases in the crystallization and melting temperatures of cPLA and PLA-g-NTA can be associated to intramolecular crosslinking between PLA chains in agreement with the observations of Yang et al. (Yang et al., "Thermal and Mechanical Properties of Chemical Cross-linked Polylactide (PLA)," *Polym Test* 27(8):957-963 (2008), which is hereby incorporated by reference in its entirety). There also is no indication of immiscibility between NTA and PLA, as only a single phase is apparent on the thermogram for PLA-g-NTA (see FIG. 5C). Had there been incompatibility between two phases, thermal transitions for both reactants would present separately in the thermogram. Further, while use of a peroxide initiator can theoretically induce oxidation of the base polymer and production of low molecular weight, soluble, oxidized oligomers, the similarity in DSC thermograms and contact angle values between gPLA and cPLA indicate that at the levels used, the peroxide initiator did not sufficiently oxidize PLA during extrusion. In summary, the DSC thermograms point toward suitable compatibility between NTA and PLA in the formation of PLA-g-NTA while retaining its desirable thermal properties compared to native, granular PLA (gPLA).

Example 3—Antioxidant Performance of Chelating PLA-g-NTA Film

Figure 6:
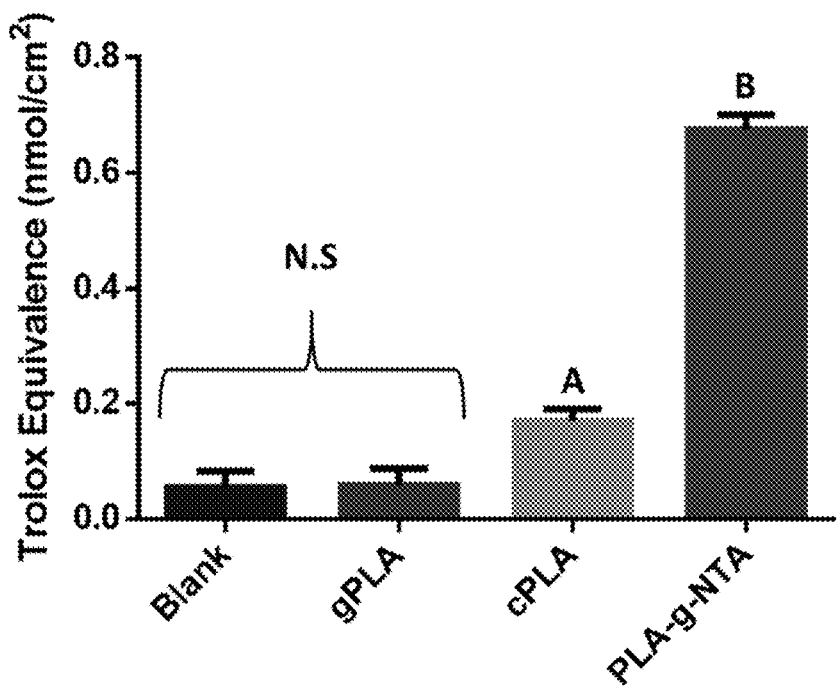
FIG. 6 is a graph illustrating the ABTS radical scavenging capacity of gPLA, cPLA, and PLA-g-NTA indicated in trolox scavenging equivalence/cm$^2$. Significant differences between means are indicated by capital letters (Tukey HSD, P≤0.05). Values represent means and standard error from four replicate films.

Oxidation is one of the main mechanisms for food spoilage and consumer rejection leading to food waste and loss (Cichello, "Oxygen Absorbers in Food Preservation: A Review," *J Food Sci Tech Mys* 52(4):1889-1895 (2015), which is hereby incorporated by reference in its entirety). To determine the antioxidant capacity of chelating bio-based films, radical scavenging and metal chelating capacities were determined. The non-migratory, bio-based chelating PLA-g-NTA films were analyzed for their ability to scavenge radicals utilizing the TEAC assay. Sample films were incubated in 67 µM ABTS$^+$ solution and analyzed for their capacity to stabilize preformed radicals as well as prevent further radical formation (see FIG. 6).

Native, granular PLA (gPLA) films presented no significant difference (P>0.05) compared to buffer (no film) blank with calculated antioxidant capacities of 0.056±0.029 nmol Trolox$_{(eq)}$/cm$^2$ and 0.059±0.027 nmol Trolox$_{(eq)}$/cm$^2$, respectively. cPLA exhibited a slight, but significant, increase in radical stability (P<0.05) with an antioxidant capacity of 0.170±0.021 nmol Trolox$_{(eq)}$/cm$^2$. The stability of radicals relies heavily on the electron density of a molecule; radicals on tertiary carbons are more stable than secondary and primary carbons which may contribute towards the higher radical stability of cPLA compared to native PLA (gPLA) (Hornby et al., *Foundations of Organic Chemistry*, Oxford University Press: Oxford (1994) at p. 92, which is hereby incorporated by reference in its entirety). Furthermore, cPLA contains a greater density of carboxylic acid groups than native PLA (gPLA), lowering the further production of radicals in solution through a potential chelation activity. Importantly, PLA-g-NTA showed a markedly higher antioxidant capacity (P<0.001) with a mean Trolox$_{(eq)}$/cm$^2$ of 0.675±0.026 nmol compared to no film (blank), gPLA, and cPLA. This increased TEAC antioxidant capacity for PLA-g-NTA is comparable to other immobilized antioxidants such as poly(ethylene) with fish peptide (Romani et al., "Radical Scavenging Polyethylene Films as Antioxidant Active Packaging Materials," *Food Control* 109:106946 (2020), which is hereby incorporated by reference in its entirety), which showed less than 0.5 Trolox$_{(eq)}$/cm$^2$ with longer incubation times, but lower than immobilized polyphenol on poly(propylene) (Roman et al., "Retaining Oxidative Stability of Emulsified Foods by Novel Nonmigratory Polyphenol Coated Active Packaging," *J Agr Food Chem* 64(27):5574-5582 (2016), which is hereby incorporated by reference in its entirety), with an antioxidant capacity of 10.8±1.7 nmol Trolox$_{(eq)}$/cm$^2$. The lesser efficacy of PLA-g-NTA compared to immobilized polyphenol may be due to the longer incubation time of polyphenol with the radical solution, which has shown to be time dependent. The basis of radical scavenging in the TEAC assay is both the stability of radicals as well as radical prevention; thus, the improvement in antioxidant capacity by PLA-g-NTA when compared to controls confirms improvements in both mechanisms. PLA-g-NTA contains additional tertiary carbons compared to(gPLA due to the radical grafting of NTA groups at the secondary carbon position, which can assist in radical stability and antioxidant capacity. Additionally, PLA-g-NTA prevents the formation of new radicals through the chelation of trace metals found in the ABTS$^+$ radical solution, which may explain its enhanced antioxidant qualities.

Figure 7:
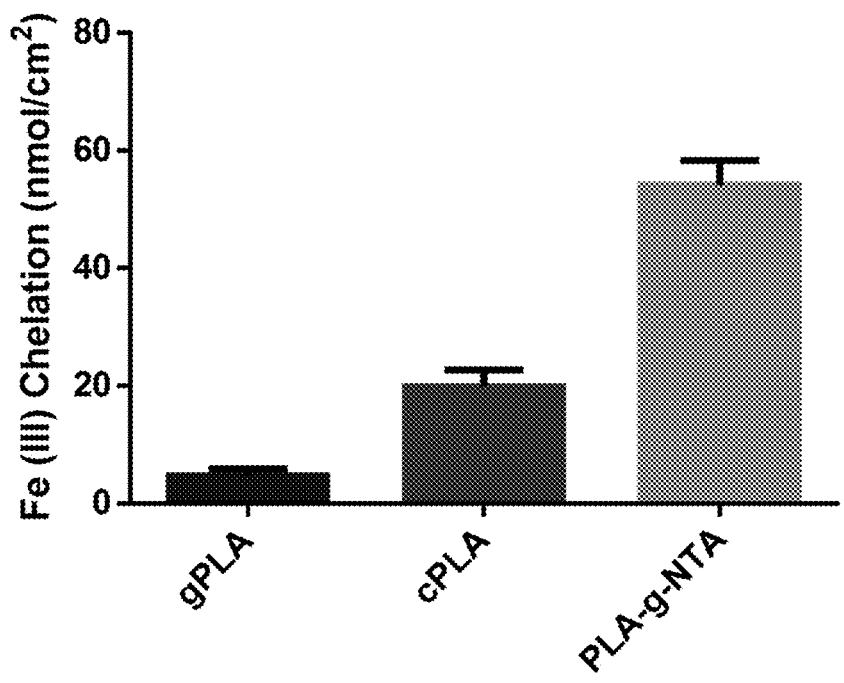
FIG. 7 is a graph illustrating the ICP-MS quantification of iron chelation capacity by gPLA, cPLA, and PLA-g-NTA films in buffered 0.06 mM ferric chloride solution at pH 4. Values represent means and standard errors of at least four separate films.

Quantification of the chelation capacity of PLA-g-NTA in comparison to cPLA and gPLA controls supports this understanding the mechanism of any observed antioxidant activity. The chelation capacity of prepared films was analyzed by incubating sample films in 0.06 mM ferric chloride in water, pH 4, water rinsing to remove unbound iron, and performing ICP-MS in comparison to standardized iron solutions to quantify chelated iron. As anticipated, the mean chelation capacity of gPLA was lower than cPLA with 4.29±2.68 nmol/cm$^2$ and 19.81±6.54 nmol/cm$^2$ bound, respectively (see FIG. 7). The observed minimal metal chelation capacity of gPLA and cPLA films is likely a result of the negatively charged terminal carboxylic acid groups, which permit binding to positively charged transition metal ions. Greater iron chelation for cPLA compared to gPLA may be a result of higher carboxylic acid group density created through intramolecular radical grafting. Notably, a significantly higher chelation capacity of 54.09±9.36 nmol/cm$^2$ for PLA-g-NTA (P<0.001) was observed compared to both gPLA and cPLA control films. The chelation capacity of PLA-g-NTA is comparable to other works where polyphenols (<50 nmol/cm$^2$) (Roman et al., "Retaining Oxidative Stability of Emulsified Foods by Novel Nonmigratory Polyphenol Coated Active Packaging," *J Agr Food Chem* 64(27):5574-5582 (2016), which is hereby incorporated by reference in its entirety), poly(acrylic acid) (53.7±9.8 nmol/cm$^2$) (Roman et al., "Metal-Chelating Active Packaging Film Enhances Lysozyme Inhibition of *Listeria monocytogenes*," *J Food Protect* 77(7):1153-1160 (2014), which is hereby incorporated by reference in its entirety), and poly (hydroxamic acid) (89±10 nmol/cm$^2$) (Lin et al., "Preparation of Metal Chelating Active Packaging Materials by Laminated Photografting," *J Coat Technol Res* 13(2):395-404 (2016), which is hereby incorporated by reference in its entirety) were immobilized on poly(propylene). The observed higher metal chelating capacity for PLA-g-NTA compared to control films is in agreement with the TEAC assay, confirming its performance as a metal chelator alternative and its potential as an antioxidant. The retention of significant chelating capacity despite incubation in a highly acidic environment and multiple washes during the iron chelating assay protocol confirms the successful grafting of metal chelating groups onto PLA.

Figure 8:
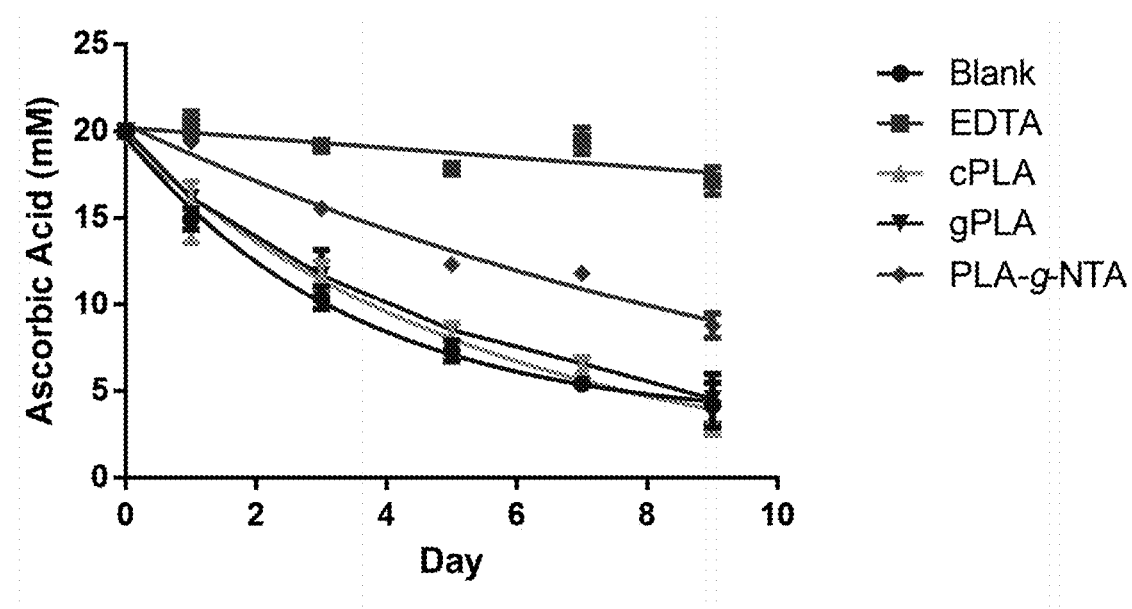
FIG. 8 is a graph illustrating an accelerated ascorbic acid degradation study of no film (blank), extruded gPLA, cPLA, and PLA-g-NTA films, and industrial standard (0.8 mM EDTA) in buffered 20 mM ascorbic acid solutions at pH 4.0 stored at 37° C. Values represent means and standard errors of three separate films.

To assess the antioxidant activity of the bio-based chelating films, an accelerated ascorbic acid degradation study was performed (see FIG. 8). Native, granular PLA (gPLA), cPLA, and PLA-g-NTA films along with controls containing no film and 0.8 mM EDTA were incubated in buffered 20 mM ascorbic acid solutions at 37° C. and pH 4 for 9 days. Measurements were taken daily and fit to a single-phase decay equation to describe degradation behavior kinetics in accordance to prior reports (Lin et al., "Synthesis of Iminodiacetate Functionalized Polypropylene Films and Their Efficacy as Antioxidant Active-Packaging Materials," *J Agr Food Chem* 64(22):4606-4617 (2016), which is hereby incorporated by reference in its entirety). It is important to note that in this system, ascorbic acid degradation contributions from transition metals are exclusively due to those found naturally in the reagent water, analogous to real food systems. EDTA exhibited the greatest protective effect of ascorbic acid, retaining greater than 85% of the original ascorbic acid concentration by the end of the study. The EDTA positive control did not follow a single-phase decay, never reaching the experimental half-life, and demonstrated poor fit with the regression ($R^2$=0.527). However, all other treatment conditions reached the experimental half-life and fit well with single-phase decay regression ($R^2$>0.97). Control films of gPLA and cPLA showed no significant difference (P<0.001) compared to the no film blank by the end of the study and exhibited almost complete degradation of ascorbic acid with only 4.55±0.72 and 3.416±0.47 mM ascorbic acid remaining, respectively. Likewise, the no film blank retained a comparable amount (P>0.05) to gPLA and cPLA with 4.19±0.647 mM ascorbic acid remaining by the end of the study. gPLA, cPLA, and blank controls all exhibited a steep initial decline in ascorbic acid concentration, losing about 25% of the ascorbic acid on the first day. The no film blank exhibited a half-life of only 2.4 days according to single-phase decay kinetics while gPLA and cPLA fared slightly better with half-lives of 3.5 and 3.9 days, respectively, which is in agreement with the lesser radical stability and smaller chelation capacity of gPLA compared to cPLA. In sharp contrast, PLA-g-NTA films delayed degradation of ascorbic acid throughout the study, retaining 8.77±0.362 mM ascorbic acid on the final day while extending the half-life of ascorbic acid to 8.7 days and only falling below 10 mM on the final day of the study. PLA-g-NTA performed considerably better than the control films and no film blank, but not as well as the commercial standard of EDTA.

Several factors contribute to the superior protection of the EDTA treatment when compared to PLA-g-NTA. EDTA has a greater affinity to $Fe^{3+}$ with a stability constant of 25.10 (Martell et al., *Critical Stability Constants*, Vol. 6, Plenum Press: New York (1989), which is hereby incorporated by reference in its entirety) compared to the NTA groups on PLA-g-NTA with a stability constant of 15.87 (Anderegg, "Critical Survey of Stability-Constants of NTA Complexes,"

Pure Appl Chem 54(12):2693-2758 (1982), which is hereby incorporated by reference in its entirety). Higher stability constants indicate a higher binding efficiency and thus a greater capacity to limit the oxidation of ascorbic acid. Furthermore, studies have shown that considerable ascorbic acid degradation in the presence of concentrations of EDTA is observed at concentrations lower than those used in this study (Lin et al., "Photo-Curable Metal-Chelating Coatings Offer a Scalable Approach to Production of Antioxidant Active Packaging," *J Food Sci* 83(2):367-376 (2018), which is hereby incorporated by reference in its entirety). Nonetheless, PLA-g-NTA presented significant potential in inhibiting oxidative degradation of ascorbic acid, in support of the antioxidant capacity quantified by the TEAC and metal chelating assays.

Example 4—Synthesis and Characterization of ε-Poly-l-lysine-Functionalized Polypropylene ("PP-g-PL")

Reactive extrusion was utilized to synthesize a polypropylene polymer through radical grafting of ε-poly-l-lysine polypeptides with granulated commercial PP resin by the mechanism illustrated in FIG. 9. ε-poly-l-lysine is a known antimicrobial agent (Hiraki, "Basic and Applied Studies on ε-polylysine," *J. Antibacterial Antifungal Agents* 23:349-354 (1995), which is hereby incorporated by reference in its entirety), and it has been safely used as a preservative in food (Hiraki et al., "Use of ADME Studies to Confirm the Safety of E-polylysine as a Preservative in Food," *Regulatory Toxicol. Pharmacol.* 37(2):328-340 (2003). which is hereby incorporated by reference in its entirety).

Briefly, polypropylene (isotactic polypropylene from Scientific Polymer Cat #130) was mechanically mixed with 0.5% w/w dicumyl peroxide and either 5% or 10% w/w ε-poly-L-lysine (Wilshire Technologies CAS No. 28211-04-3), and the mixture was extruded at 50 RPM through a Process 11 Parallel Twin Extruder (Thermo Fisher Scientific, Waltham, Mass.) equipped with a 1.5 mm die and eight heating zones set to 145° C., 190° C., 200° C., 200° C., 200° C., 200° C., 200° C., and 210° C. at the die. PP-g-PL was then pelletized using a Varicut Pelletizer (Thermo Fisher Scientific, Waltham, Mass.) to form 1 mm pellets. Samples of PP-g-PL pellets (2 g) were placed between two 5 mil Kapton Films and allowed to melt in a Carver hot press (Wabash, Ind.) at 190° C. for one minute prior to pressing at 10,000 lbs to form films. Films were then cut to 1 cm×2 cm for further characterization. Control polypropylene ("PP") and DCP-cross-linked PP ("PP.DCP") films were prepared in this same manner; the PP.DCP film serves as a process control to determine if any changes in activity were a result of the peroxide initiator.

Figure 10:
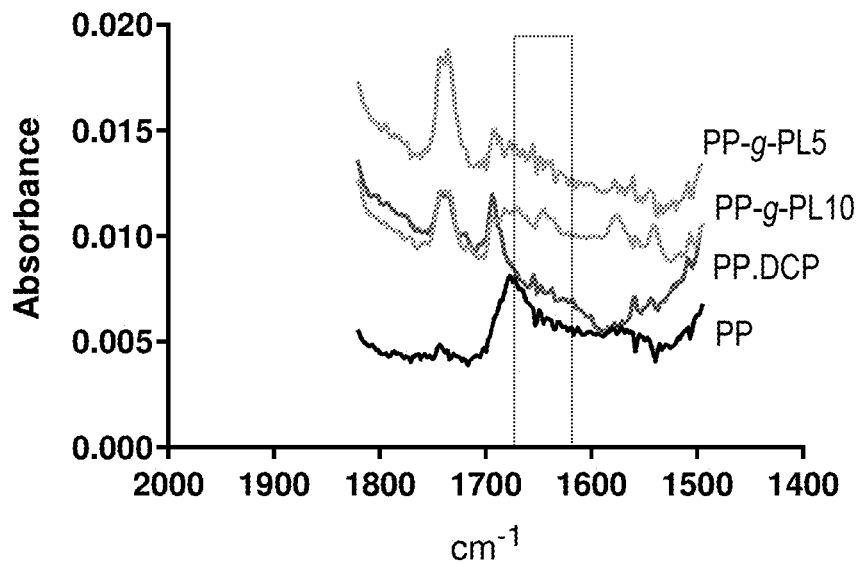
FIG. 10 is a graph illustrating ATR-FTIR spectra of two control films ("PP" and "PP.DCP") and two modified films ("PP-g-PL5" and "PP-g-PL10"), which indicate successful grafting of the ε-poly-l-lysine antimicrobial. Highlighted band is the region of the spectra corresponding to carbon oxygen double bond (C=O), characteristic of the antimicrobial.

ATR-FTIR spectra were acquired to confirm covalent grafting of ε-poly-l-lysine to PP, with PP and PP.DCP films serving as controls (FIG. 10). Compared to PP and PP.DCP control films, the spectra confirm successful grafting of the ε-poly-l-lysine antimicrobial in the modified PP-g-PL5 and PP-g-PL10 films. The highlighted band in FIG. 10 is the region of the spectra corresponding to carbon oxygen double bond (C=O), which is characteristic of the antimicrobial but not the PP and PP.DCP films.

Figure 11A:
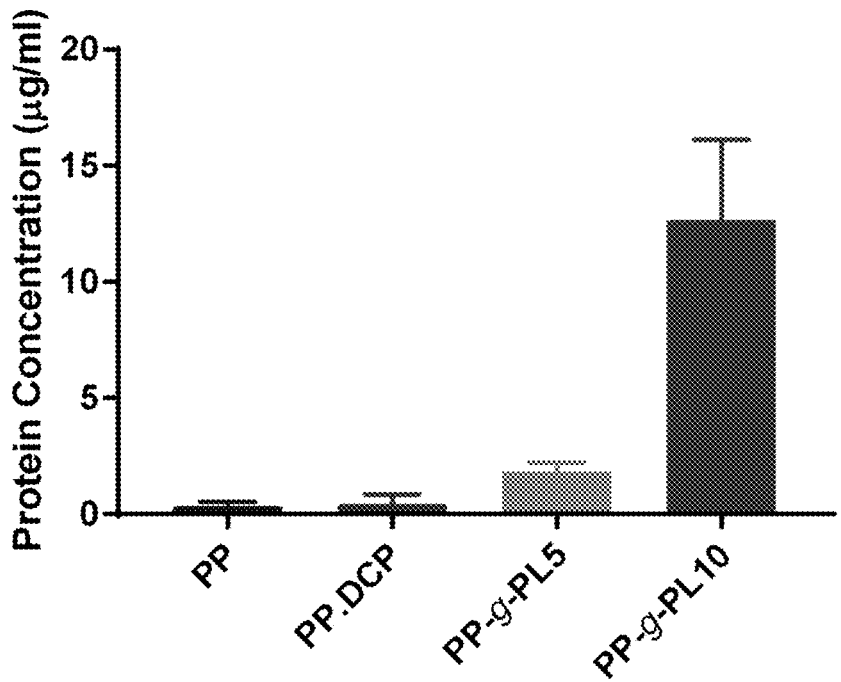
FIGS. 11A-B are graphs illustrating the surface concentration of protein (FIG. 11A) and primary amines (FIG. 11B) of control and modified films as determined by bicinchoninic acid (BCA) protein assay and Acid Orange 7 assay, respectively. ε-poly-l-lysine is a poly-amino acid presenting numerous primary amines. Presence of the poly-amino acid and its amines, responsible for antimicrobial activity mechanism in the materials prepared via reactive extrusion with inclusion of ε-poly-l-lysine, indicates successful grafting of ε-poly-l-lysine. The absence of the poly-amino acid and its amines in the PP and PP-DCP controls is also evident.
Figure 11B:
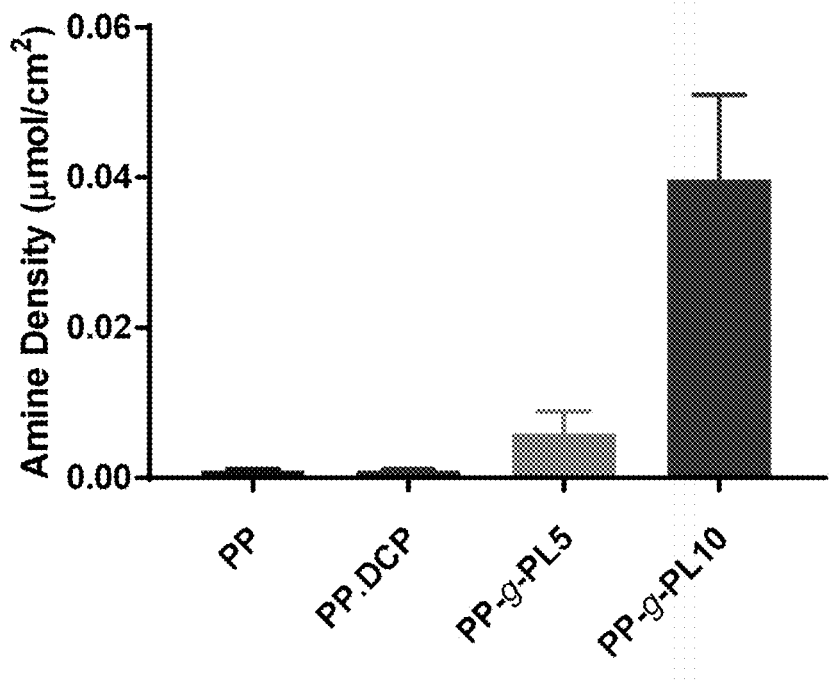

Two assays were carried out to assess properties of the grafted ε-poly-l-lysine on PP-g-PL5 and PP-g-PL10 films. A bicinchoninic acid (BCA) protein assay was used to measure surface concentration of the ε-poly-l-lysine. Sample and control films were washed in triplicate with 18.2 MΩ·cm (at 25° C.) MilliQ water and then incubated for 30 minutes with shaking at 37° C. in 2 mL of BCA working solution prior to absorbance measurements at 562 nm on a Synergy Neo2 Hybrid Multi-Mode Reader (BioTek Instruments, Winooski, Vt.). Absorbance of sample and control films were compared to a standard curve of bovine serum albumen (BSA) and calculated as total amount of peptide per film area. Whereas control PP and PP.DCP films show no surface presence of grafted ε-poly-l-lysine, both PP-g-PL5 and PP-g-PL10 films do (FIG. 11A). Next, an Acid Orange 7 assay was used to measure accessibility/activity of primary amines from the grafted the ε-poly-l-lysine. Film samples (1×2 cm$^2$) were washed in triplicate with 18.2 MΩ·cm (at 25° C.) MilliQ water then incubated in 5 mL of 1 mM AO7 dye solution at pH 3 for 2 hours with shaking. Incubated film samples were washed three times with pH 3 water adjusted with HCl and dried with pressurized air. Dried film samples were desorbed with 3 mL of pH 12 water adjust with NaOH for 2 hours with shaking prior to reading at 633 nm on a Synergy Neo2 Hybrid Multi-Mode Reader (BioTek Instruments, Winooski, Vt.). Absorbance of sample and control films were compared to a standard curve of AO7 and calculated as total amount of carboxylic acid per film area. Whereas control PP and PP.DCP films show no primary amines (due to absence of grafted ε-poly-l-lysine), both PP-g-PL5 and PP-g-PL10 films do (FIG. 11B). Presence of the polypeptide and amines, responsible for antimicrobial activity mechanism in the materials prepared via reactive extrusion with inclusion of ε-poly-l-lysine, indicates successful grafting of ε-poly-l-lysine.

Example 5—Antimicrobial Activity of PP-g-PL5 and PP-g-PL10 Films

Figure 12:
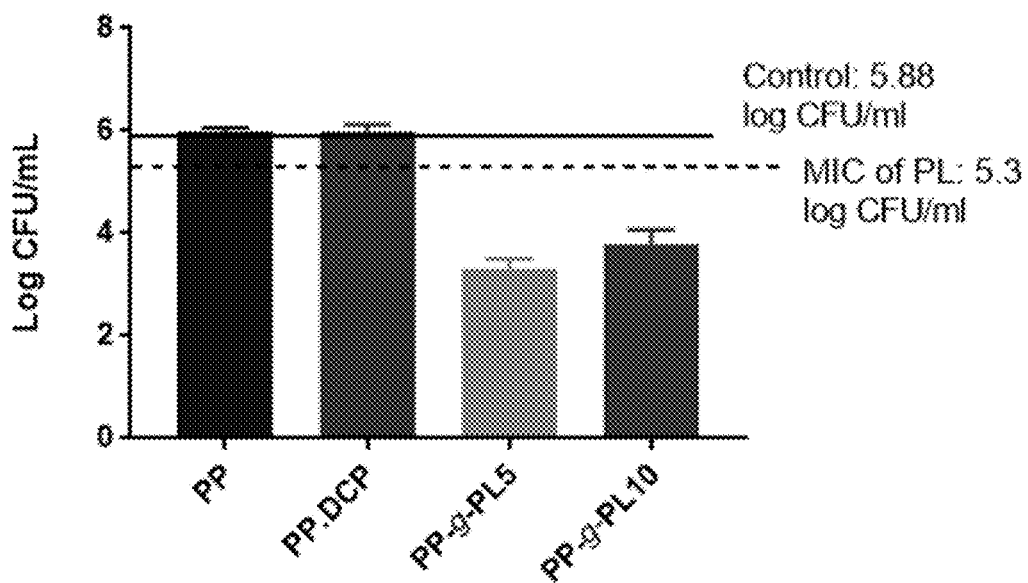
FIG. 12 is a graph illustrating the efficacy of ε-poly-l-lysine grafted polypropylene films, PP-g-PL5 and PP-g-PL10, in presenting antimicrobial activity against a model spoilage microorganism, *Lactobacillus plantarum*. Control films, PP and PP-DCP, show no antimicrobial activity.

Due to the known use of ε-poly-l-lysine as an antimicrobial agent (Hiraki, "Basic and Applied Studies on ε-polylysine," *J. Antibacterial Antifungal Agents* 23:349-354 (1995), which is hereby incorporated by reference in its entirety), the antimicrobial activity of PP-g-PL5 and PP-g-PL10 films was assessed against *Lactobacillus plantarum*. *Lactobacillus plantarum* was selected as a model spoilage organism for this study, because it is a known spoilage organism in a wide array of food products (ketchup, sliced meat, mayonnaise). After one hour exposure to 10$^6$ CFU/ml (colony forming units) *L. plantarum*, native and DCP cross-linked control polypropylene exhibited no difference in microbial population compared to the no-film control (FIG. 12). Both 5 wt % and 10 wt % ε-poly-l-lysine exhibited 2 log reduction (~99% reduction) in microbial populations, confirming antimicrobial activity of these films (FIG. 12). These results are particularly important as a concern about reactive extrusion of active agents could be that the added heat and shear impacts activity of active ligands. These results, demonstrating retained activity of the antimicrobial agent after exposure to reactive extrusion, represent a key metric of success for this method of preparing active packaging.

Materials and Methods for Examples 6-7:

Materials: L-Ascorbic acid, 2,2'-azinobis-(3-ethylbenzothiazoline-6-sulfonic acid) (ABTS) (>98%), 2,6-dichloroindophenol sodium salt hydrate, dicumyl peroxide (98%), ethylenediaminetetraacetic acid disodium salt dihydrate (EDTA), glacial acetic acid, hydrochloric acid (trace metal grade), (±)-6-hydroxy-2,5,7,8-tetramethylchromane-2-carboxylic acid (97%), imidazole (99%), potassium persulfate (≥99%), nitrilotriacetic acid (NTA) (≥99%), and toluidine blue O (TBO), tetrahydrofuran (THF) (≥99.9%, inhibitor free) were purchased from Millipore Sigma (Burlington, Mass.). Hydrogen peroxide (30%), sodium acetate trihydrate, sodium hydroxide, oxalic acid dihydrate, sodium phosphate monobasic monohydrate, were purchased from Fisher Scientific (Fair Lawn, N.J.). NatureWorks Ingeo™ Reactive Extrusion Grade Poly(lactic acid) 4044D (≤0.3% residual lactide, density 1.24 g/cc) was purchased from Jamplast, Inc. (Ellisville, Mo.). 1,3-Bis(4,5-dihydro-2-oxazolyl)benzene (PBO) (>98%) was purchased from TCI America (Portland, Oreg.). Nitric acid (trace metal grade) (70%) was purchased from VWR Chemicals (Radnor, Pa.). All materials and reagents were used as received without further purification unless otherwise noted.

Preparation of Crosslinked Poly(lactic acid) (PLA.PBO3.5 & PLA.PBO7): As a control, granulated PLA was mechanically mixed with either 3.5 wt % (PLA.PBO3.5) or 7 wt % (PLA.PBO7) 1,3-Bis(4,5-dihydro-2-oxazolyl)benzene (PBO), fed into a Process 11 Parallel Twin Extruder (ThermoFisher Scientific, Waltham, Me.) with eight heating zones equipped with a 1.5 mm die, and extruded at 50 RPM and the following temperature profile: Zone 2-145° C., Zone 3-190° C., Zone 4-200° C., Zone 5-200° C., Zone 6-200° C., Zone 7-200° C., Zone 8-200° C., and 210° C. at the die. Cross-linked PLA was pelletized using a Vericut Pelletizer (ThermoFisher Scientific, Waltham, Me.) using the L1 setting to form 0.5 mm Cross-linked PLA. Cross-linked PLA nurdles were stored in a desiccator under calcium sulfate desiccant for greater than 24 hours prior to pressing into films. Samples of cross-linked poly(lactic acid) (~1.5 g) were pressed between two 5 mil Kapton films (Cole-Parmer, Vernon Hills, Ill.) and allowed to melt at 190° C. in a Carver heat press (Wabash, Ind.) for one minute before pressing with 10,000 lbs of pressure. Sheets were cooled under beakers of ice water and cut into 1 cm×2 cm films for further characterization. Cross-linked PLA films were stored in a desiccator under calcium sulfate desiccant for greater than 24 hours prior to characterization. Films were characterized without any further treatment or purification.

Attenuated Total Reflectance Fourier Transform Infrared Spectroscopy (ATR-FTIR): Functionalization of gPLA via bisoxazoline mediated grafting was characterized using ATR-FTIR on an IRPrestige FTIR spectrometer (Shimadzu Scientific Instruments, Inc., Kyoto, Japan) equipped with a diamond ATR crystal. Survey spectra (32 scans) from wavenumbers of 4000-600 cm$^{-1}$ were taken using Happ-Genzel apodization and a resolution of 4 cm$^{-1}$ with air as a background. Spectra of antioxidant functionalized PLA were compared to gPLA and PLA with 3.5 wt % and 7 wt % crosslinker (PLA.PBO3.5 and PLA.PBO7, respectively).

X-ray Photoelectron Spectroscopy (XPS) Surface Analysis: Atomic composition and chemical bonding of granulated PLA, cross-linked PLA, and antioxidant-functionalized PLA films were analyzed using a Scienta Omicron ESCA-2SR X-Ray photoelectron spectroscope (Scienta Omicron, Taunusstein, Germany) with operating pressure of 1×10$^{-9}$ mBar. Al Kα (1486.7 eV) target generated at 300 W (15 kV; 200 mA) produced monochromated X-ray beams which were directed at a 2 mm diameter spot on XPS samples. Photoelectrons were collected at a 0° emission angle with source to analyzer angle of 54.7°. Electron kinetic energy was collected with a hemispherical analyzer using a pass energy of 200 eV, W. F. of 4.5, and energy step of 1 eV for survey spectra and 50 eV for high resolution spectra. A flood gun was utilized to inhibit charging effect on non-conductive samples. Atomic composition and chemical bonding were analyzed on CasaXPS software (Casa Software Ltd, Teignmouth, UK).

Surface Dynamic Water Contact Angle Measurements: Dynamic water contact angle measurements of granulated PLA, cross-linked PLA, and antioxidant-functionalized PLA were performed on Attention Theta Optical Tensiometer (Biolin Scientific, Stockholm, Sweden) as described for Examples 1-3. Values of advancing contact angle, receding contact angle, and contact angle hysteresis were measured and analyzed in accordance with prior reports (Korhonen et al., "Reliable Measurement of the Receding Contact Angle," *Langmuir* 29(12):3858-3863 (2013); McCarthy et al., "Contact Angle Hysteresis Explained," *Langmuir* 22(14):6234-6237 (2006), each of which is hereby incorporated by reference in its entirety). Briefly, advancing contact angle ($\theta_A$) was measured by first depositing a 2 μL droplet of deionized water on the surface, inserting the needle in the droplet, and increasing the size of the droplet at a rate of 0.5 μL/s. Images were recorded at 14 Frames per Second (FPS) and contact angle analyzed using Young-Laplace method. Advancing contact angle was recorded as the maximum stabilized mean contact angle prior to contact baseline advancing. Similar to advancing contact angle, receding contact angle ($\theta_R$) was measured by depositing a 4 μL droplet of deionized water on the surface, inserting the needle in the droplet, and decreasing the size of the droplet at a rate of 0.5 μL/s. Images were recorded at 14 Frames per Second and contact angle analyzed using Young-Laplace method. Receding contact angle was recorded as the minimum stabilized mean contact angle prior to the contact baseline receding. Contact angle hysteresis was considered the difference between mean $\theta_A$ and mean $\theta_R$ for each treatment. Advancing contact angle and receding contact angle measurements were each performed at least three times on distinct regions on three separate films (totaling at least 9 measurements per treatment).

Carboxylic Acid Density Analysis: The density of carboxylic acids on the surface of granulated PLA, cross-linked PLA, and antioxidant-functionalized PLA films were analyzed using a modified toluidine blue O (TBO) assay as described previously (Lin et al., "Photo-Curable Metal-Chelating Coatings Offer a Scalable Approach to Production of Antioxidant Active Packaging," *J Food Sci* 83(2):367-376 (2018); Kang et al., "Surface Modification and Functionalization of Polytetrafluoroethylene Films," *Macromolecules* 29(21):6872-6879 (1996), each of which is hereby incorporated by reference in its entirety). Film samples (1×2 cm$^2$) were incubated with 5 mL of 0.5 mM TBO in pH 10 water for 2 hours with shaking at 180 RPM. Incubated samples were washed three times with water adjusted to pH 10 by sodium hydroxide, dried with an air gun, and desorbed with 3 mL of 50 v/v % glacial acetic acid in water for 15 minutes. Absorbance of the desorbed solution was read at 633 nm on a Synergy Neo2 Hybrid Multi-Mode Reader (BioTek Instruments, Winooski, Vt.) and concentration of carboxylic acid was determined by comparison to a TBO standard curve of TBO in 50 v/v % acetic acid with the assumption of 1:1 stoichiometric relationship between dye and carboxylic acid.

Modulated Differential Scanning Calorimetry (mDSC) Analysis: Glass transition temperature, cold crystallization temperature, and melting temperature of granulated PLA, 3.5 wt % cross-linked PLA (PLA.PBO3.5), 3 wt % NTA grafted PLA (PLA.PBO3.5.NTA3), and 5 wt % NTA grafted PLA (PLA.PBO3.5.NTA5) were determined in a TA Instruments Q1000 Modulated Differential Scanning Calorimeter performed under nitrogen atmosphere with an empty sealed aluminum pan for reference. Pelletized samples were run using a heat, cool, heat cycle from 50° C. to 250° C. at a heating rate of 10° C./min and a cooling rate of 5° C./min.

To ensure the elimination of thermal artifacts, only the second heat cycle was utilized for thermal and crystallization temperature analysis. Quantification was performed using the TA Universal Analysis software (TA Instruments, New Castle, Del.).

Trolox Equivalent Antioxidant Capacity (TEAC) Assay: Granulated PLA, crosslinked PLA, and antioxidant functionalized PLA films were assessed for their free radical scavenging capacity using a modified Trolox Equivalent Antioxidant Capacity (TEAC) method as described for Examples 1-3, above, and previously (Romani et al., "Radical Scavenging Polyethylene Films as Antioxidant Active Packaging Materials," *Food Control* 109:1-7 (2020); Roman et al., "Retaining Oxidative Stability of Emulsified Foods by Novel Nonmigratory Polyphenol Coated Active Packaging," *J Agr Food Chem* 64(27):5574-5582 (2016), each of which is hereby incorporated by reference in its entirety). Briefly, equivalent volumes of 7 mM 2,2'-azino-bis(3-ethylbenzothiazoline-6-sulfonic acid) diammonium salt (ABTS) in 18MΩ·cm at 25° C. Milli-Q water and 2.45 mM potassium persulfate in 18MΩ·cm at 25° C. Milli-Q water were reacted in the dark at room temperature for 16 hours forming ABTS radical stock solution. ABTS radical stock solution was adjusted to an absorbance of 0.700±0.03 at 734 nm with 4 mM sodium phosphate buffer, pH 7.4. Test coupons of 1×1 $cm^2$ were incubated at 30° C. for 10 minutes with 300 μL of adjusted ABTS radical stock solution in a 24 well plate shaking at 125 RPM. Radical scavenging capacity was calculated by comparison to a Trolox scavenging standard curve (30 μM to 0 μM) determined by percent absorbance at 734 nm with 4 mM sodium phosphate buffer, pH 7.4 as a blank and reported in Trolox eq/$cm^2$.

Accelerated Ascorbic Acid Degradation Study: The ability of granulated PLA, cross-linked PLA, and antioxidant-functionalized PLA films to prevent oxidative degradation of ascorbic acid was measured as performed in Examples 1-3, above, and previously (Lin et al., "Photo-Curable Metal-Chelating Coatings Offer a Scalable Approach to Production of Antioxidant Active Packaging," *J Food Sci* 83(2):367-376 (2018); Zhu et al., "Performance of Photo-curable Metal-chelating Active Packaging Coating in Complex Food Matrices," *Food Chem* 286:154-159 (2019), each of which is hereby incorporated by reference in its entirety). Briefly, 1×1 $cm^2$ film samples were incubated with 1 mL of 20 mM ascorbic acid solution in 10 mM sodium acetate-imidazole buffer, pH 4 within 10 mL glass GC vials and aluminum septum caps at 37° C. for 9 days. Samples were assessed for ascorbic acid concentration at specified time points (day 0, day 1, day 3, day 5, and day 9) using a modified version of the Association of Official Analytical Chemists method 967.21.38. Aliquots of 0.2 mL were taken from each sample and mixed with 4.8 mL of 0.04 wt % oxalic acid. Subsequently, 0.3 mL of the ascorbic acid/oxalic acid mixture was reacted with 4.7 mL of 0.2 mM dichloroindophenol solution and the absorbance measured immediately at 520 nm. The concentration of the samples was determined by comparison to ascorbic acid standard curves (prepared fresh daily) and results fit to a single-phase decay model.

Ferric Iron Chelation Capacity: Iron chelating capacity of granulated PLA, cross-linked PLA, and antioxidant-functionalized PLA films was analyzed by Inductively Coupled Plasma-Mass Spectrometry (ICP-MS) preceded by microwave digestion as performed in Examples 1-3, above, and described previously (Lin et al., "Synthesis of Iminodiacetate Functionalized Polypropylene Films and Their Efficacy as Antioxidant Active-Packaging Materials," *J Agr Food Chem* 64(22):4606-4617 (2016), which is hereby incorporated by reference in its entirety). Film samples (1×2 $cm^2$) were stored in 0.06 mM ferric chloride in 50 mM sodium acetate-imidazole buffer, pH 4 for 72 hours in the dark before washing three times in 18MΩ·cm at 25° C. Milli-Q water and stored in a desiccator under calcium sulphate desiccant for greater than 24 hours. Chelated samples (~100 mg) were digested with 5 mL of trace metal grade 70% nitric acid and 2 mL of 30% hydrogen peroxide in an Ethos Microwave Oven (Milestone Srl, Milan, Italy) with a program of ramp, hold, cool at 210° C. over 20 minutes, 210° C. for 20 minutes, and cool over 10 minutes respectively. Digested samples were diluted using 18MΩ·cm at 25° C. Milli-Q water to 50 mL and run on a Perkin Elmer NeXion 2000 ICP-MS in kinetic energy discrimination (KED) mode calibrated with DORM-4 fish protein, IAEA-085 hair, and Seronorm Trace Elements Urine as certified reference materials. Iron chelation concentration was determined using 10 and 20 part per billion iron standard curves.

Statistical Analysis: The following samples were synthesized on two independent days: gPLA, PLA.PBO3.5, PLA.PBO3.5.NTA3, PLA.PBO3.5.NTA5, PLA.PBO3.5.NTA10, and PLA.PBO7.NTA10; PLA.PBO7, PLA.PBO7.NTA3, and PLA.PBO7.NTA5 samples were synthesized in a single representative batch. Film thicknesses are from quadruplicate measurements on a single representative batch. ATR-FTIR spectra were taken on quadruplicate films in three separate spots on each film and analyzed using KnowItAll Software (BioRad Laboratories, Hercules, Calif.) and Origin Pro 2018b (OriginLab Corporation, Northampton, Mass.). A single representative film sample was used for XPS, mDSC, and SEM analysis with quadruplicate micrographs taken on random locations on the film for SEM analysis. Dynamic water contact measurements were performed in duplicate (duplicated synthesis) or with a representative batch (single synthesis) on at least three separate films in three independent spots on each film (n≥9). Carboxylic acid density, Trolox equivalent antioxidant capacity, accelerated ascorbic acid degradation, and ferric iron chelation capacity studies were performed in duplicate (duplicated synthesis) or with representative batch (single synthesis) on quadruplicate film samples. Results of film thickness, dynamic water contact angle, carboxylic acid density, and antioxidant studies were analyzed using analysis of variance (ANOVA) with Tukey HSD (p≤0.05) multiple comparison. Single-phase decay modeling of ascorbic acid degradation was performed in GraphPad Prism 7.0 (La Jolla, Calif.).

Example 6—Synthesis and Characterization of Nitrilotriacetic Acid-Functionalized PLA Using 1,3-Bis(4,5-Dihydro-2-Oxazolyl)Benzene as Cross-Linker Reactive extrusion was utilized to synthesize a functionalized PLA polymer through reactive cross-linking of NTA via 1,3-bis(4,5-dihydro-2-oxazolyl)benzene to the polymer using granulated commercial PLA resin by the mechanism illustrated in FIG. 13. NTA use, and its known activity, is described in Example 3 above in connection with the synthesis and testing of PLA-g-NTA. Unlike PLA-g-NTA where the NTA moiety was grafted onto the cross-linked PLA, in this example the NTA is linked by the cross linker 1,3-bis(4,5-dihydro-2-oxazolyl)benzene via ring opening polymerization, forming the functionalized "PLA.P-BO.NTA". The presence of carboxylic acids on both PLA and NTA and reactivity of bisoxazoline at high temperatures (Frump, "Oxazolines: Their Preparation, Reactions, and Applications," *Chemical Reviews* 71(5): 483-505 (1971), which is hereby incorporated by reference in its entirety) make it suitable for grafting via reactive extrusion. Oxazoline rings react preferentially with carboxylic acid groups found on both PLA and NTA through ring opening grafting antioxidant functionalized PLA.

Briefly, gPLA was mechanically mixed with 3.5% or 7% w/w 1,3-bis(4,5-dihydro-2-oxazolyl)benzene and either 3%, 5%, or 10% w/w NTA, and extruded at 50 RPM through a Process 11 Parallel Twin Extruder (Thermo Fisher Scientific, Waltham, Mass.) equipped with a 1.5 mm die and eight heating zones set to 145° C., 190° C., 200° C., 200° C., 200° C., 200° C., 200° C., and 210° C. at the die. PLA.PBO.NTA was then pelletized using a Varicut Pelletizer (Thermo Fisher Scientific, Waltham, Mass.) to form 1 mm pellets. Samples of PLA.PBO.NTA pellets (2 g) were placed between two 5 mil Kapton Films and allowed to melt in a Carver hot press (Wabash, Ind.) at 190° C. for one minute prior to pressing at 10,000 lbs to form films. Films were then cut to 1 cm×2 cm for further characterization. Control gPLA and PBO-cross-linked PLA ("PLA.PBO") films were prepared in this same manner; the PLA.PBO film serves as a process control to determine if any changes in activity were a result of the residual PBO linker (—$CH_2$—$CH_2$—N(H)—C(O)-Ph-C(O)—N(H)—$CH_2$—$CH_2$—). Nomenclature for resulting materials is as follows: PLA.PBOXX.NTAYY, in which XX refers to 3.5 or 7 weight percentage of PBO, and YY refers to the 3, 5, or 10 weight percentage of NTA (remainder gPLA) fed into the extruder. Thus, these samples included control films PLA.PBO3.5 and PLA.PBO7, and test films PLA.PBO3.5.NTA3, PLA.PBO3.5.NTA5, PLA.PBO3.5.NTA10, PLA.PBO7.NTA3, PLA.PBO7.NTA5, and PLA.PBO7.NTA10.

The film thickness of antioxidant functionalized films were compared to gPLA and both concentrations (3.5 wt % and 7 wt %) of crosslinked PLA (PLA.PBO3.5 and PLA.PBO7) with no significant ($p>0.05$) differences found for mean thickness, which ranged from 0.19 mm to 0.23 mm. Control films of gPLA, PLA.PBO3.5, and PLA.PBO7 retained characteristic poly(lactic acid) clarity; upon grafting, antioxidant functionalized PLA films displayed amber coloration and increased opacity indicative of oxazoline ring opening reactions (Po et al., "Synthesis and Characterization of Poly(ester-amide)s from Bis(2-oxazoline)s, Anhydrides, and Diols," *Macromolecules* 28(17):5699-5705 (1995), which is hereby incorporated by reference in its entirety) and successful functionalization. The amber coloration and change in the optical properties of antioxidant functionalized PLA films may benefit the materials' antioxidant qualities in real world packaging applications by inhibiting ultraviolet light penetration and thereby decreasing the formation of deleterious reactive free radicals in situ.

Homogeneous reaction of synthesized PLA-g-NTA films and compatibilization of PLA with PBO and NTA were confirmed by mDSC thermogram and SEM micrograph analysis. As a semi-crystalline thermoplastic material, PLA exhibits three distinct phases upon heating: amorphous transition from rigid to flexible—glass transition ($T_g$), exothermic breakdown of crystalline materials—cold crystallization ($T_{cc}$), and polymer melting ($T_m$). See generally Cao et al., "DSC Study of Biodegradable Poly(lactic acid) and Poly(hydroxy ester ether) Blends," *Thermochim Acta* 406(1-2):115-127 (2003), which is hereby incorporated by reference in its entirety. The mDSC thermogram of gPLA generally matches what was described in Examples 1-3, above, and agrees with literature values (Cao et al., "DSC Study of Biodegradable Poly(lactic acid) and Poly(hydroxy ester ether) Blends," *Thermochim Acta* 406(1-2):115-127 (2003), which is hereby incorporated by reference in its entirety) of 61° C., 127° C., 157° C. for $T_g$, $T_{cc}$, and $T_m$, respectively. With the inclusion of PBO and grafting of NTA, thermal properties shifted only slightly with $T_{cc}$ decreasing from 126° C. for gPLA to 124° C., 121° C., and 121° C. for PLA.PBO3.5, PLA.PBO3.5.NTA5, and PLA.PBO3.5.NTA3, respectively, as well as $T_m$ gradually decreasing from 150° C. to 148° C., 147° C., and 146° C., respectively. The lack of a separate second phase and only minor thermal property shifts indicate compatibility between reactants and PLA for antioxidant functionalized samples. Furthermore, SEM micrographs of sample surfaces all appear smooth, with no evidence of phase separation or variable morphology, regardless of sample type and magnification, supporting compatibility of reactants and a homogenous extrusion.

Figure 14:
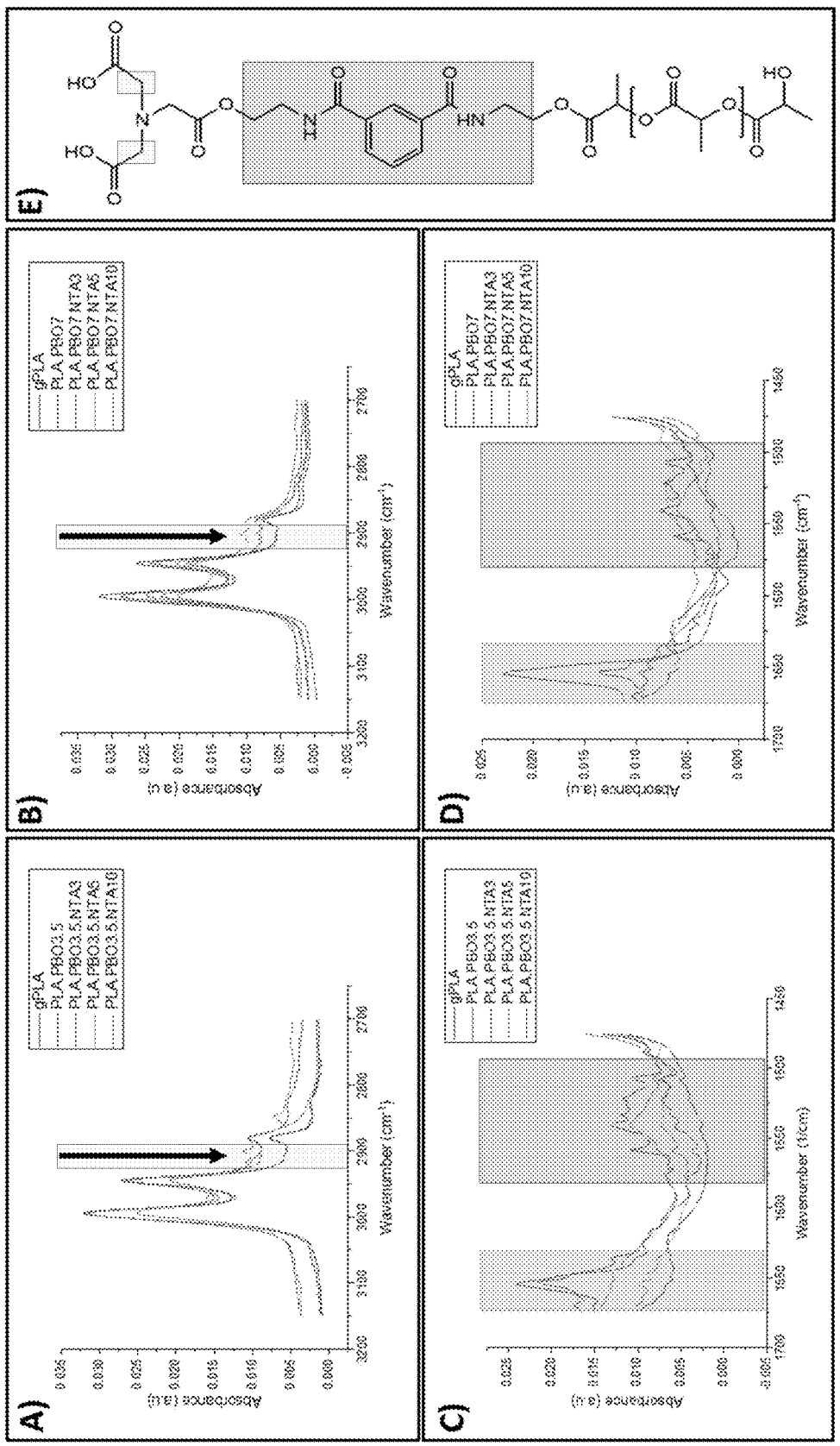
FIGS. 14A-E illustrates the ATR-FTIR spectrum of native PLA (gPLA), cross-linked PLA (PLA.PBO & PLA.PBO7), 3%, 5%, and 10% NTA grafted PLA indicating: the alkyl stretch region (FIGS. 14A-B); disappearance of characteristic bisoxazoline and emergence of new band at 1550 cm$^{-1}$ (FIGS. 14C-D); and the proposed final structure of functionalized antioxidant PLA (PLA.PBO.NTA) (FIG. 14E). Boxed portions in the representative structure and boxed region(s) of the spectra correspond.

Successful covalent grafting of NTA groups on PLA through PBO mediated reactive extrusion crosslinking was confirmed by ATR-FTIR spectral analysis of control films (gPLA, PLA.PBO3.5, PLA.PBO7), and antioxidant functionalized PLA films. Granulated PLA, cross-linked PLA (PLA.PBO3.5 and PLA.PBO7), and antioxidant functionalized PLA all exhibited characteristic absorbance bands at 2990 $cm^{-1}$ and 2945 $cm^{-1}$ attributed to stretching and bending of alkyl bonds, respectively (see Example 2), as well as at 1747 $cm^{-1}$ and 1180 $cm^{-1}$ for C=O and C—O stretching, respectively (FIGS. 14A, 14B, 14E). However, the appearance of a new alkyl stretching band centered around ~2920 $cm^{-1}$ for only antioxidant functionalized samples, associated with secondary carbons from the inclusion of NTA groups, points to successful antioxidant functionalization in agreement with what was seen with radical grafted samples in Example 2, FIG. 4. The appearance of the second secondary alkyl stretch, as described above, at 2870 $cm^{-1}$ did not develop for any antioxidant samples except for PLA.PBO3.5.NTA10. This divergence may be due to the difference in crosslinking mechanism; whereas radical polymerization may cause undesirable side products such as ketones and aldehydes and the appearance of a band at ~2850 $cm^{-1}$ on ATR-FTIR spectra, bisoxazoline ring opening has directed reactivity with the functional groups of PLA and NTA that prevents this from occurring. Furthermore, cross-linked samples' spectra reveal the characteristic C=N stretching band at wavenumber 1653 $cm^{-1}$ (Schafer et al., "FTIR Spectroscopic Studies on the Interfacial Reactions of Oxazoline-functionalized Polymers," *Acta Polymerica* 47(4):170-176 (1996), which is hereby incorporated by reference in its entirety), indicating the partial reaction of PBO with PLA and available free oxazoline for ring opening grafting of NTA groups (FIGS. 14C-14E).

Accordingly, antioxidant functionalized PLA samples show a decrease and disappearance of the C=N band at 1653 $cm^{-1}$ and the development of a new band at 1538 $cm^{-1}$. This new band is associated to creation of new secondary amine groups occurring after oxazoline ring opening, which further indicates successful NTA grafting (Schafer et al., "FTIR Spectroscopic Studies on the Interfacial Reactions of Oxazoline-functionalized Polymers," *Acta Polymerica* 47(4):170-176 (1996), which is hereby incorporated by reference in its entirety).

The surface orientation and atomic composition of antioxidant functionalized PLA, cross-linked PLA, and gPLA were determined by X-ray photoelectron spectroscopy (XPS) surface analysis. Survey scans taken from 0 to 1200 eV indicated successful ring opening grafting of NTA onto PLA by the apparent increase in nitrogen atomic percentage in accordance with the expected calculated atomic percentage values (Table 4). As trace amounts of nitrogen are expected for gPLA, due to the detection of atmospheric nitrogen, values are minimal and below the detection limit of the instrument. Following ring opening grafting, atomic percentage of nitrogen increases stepwise to 0.19%, 0.24%, 0.58%, 0.78%, and 1.09% for PLA.PBO3.5, PLA.PBO3.5.NTA3, PLA.PBO3.5.NTA5, PLA.PBO3.5.NTA10, and PLA.PBO7.NTA10, respectively, indicating successful inclusion and surface orientation of PBO and NTA. Carbon and oxygen atomic percentages for all samples are in agreement with literature (Kiss et al., "XPS and Wettability Characterization of Modified Poly (lactic acid) and Poly(lactic/glycolic acid) Films," *J Colloid Interf Sci* 245(1):91-98 (2002), which is hereby incorporated by reference in its entirety) and expected values for commercial poly(lactic acid) with atomic percentages ranging from 65.7% to 68.5% for carbon and 31.0% to 34.1% for oxygen.

TABLE 4

Summary of XPS spectral data indicating atomic percentage (At. %) and expected atomic percentage of nitrogen utilizing spectral scans of native PLA (gPLA), Crosslinked PLA (PLA.PBOr.5), 3%, 5%, and 10% NTA grafted PLA

| Sample | Carbon (At. %) | Oxygen (At. %) | Nitrogen (At. %) | Calculated Nitrogen (At. %) |
|---|---|---|---|---|
| gPLA | 68.1 | 31.9 | 0.03 | 0.00 |
| PLA.PBO3.5 | 66.5 | 33.3 | 0.19 | 0.28 |
| PLA.PBO3.5.NTA3 | 65.7 | 34.1 | 0.24 | 0.41 |
| PLA.PBO3.5.NTA5 | 68.5 | 31.0 | 0.54 | 0.49 |
| PLA.PBO3.5.NTA10 | 67.3 | 32.0 | 0.78 | 0.76 |
| PLA.PBO7.NTA10 | 67.3 | 31.6 | 1.09 | 0.98 |

A comparison and deconvolution of high-resolution bonding of carbon between antioxidant and control films further supports the ring opening of PBO, grafting of NTA groups onto PLA, and surface orientation of antioxidant functionality (Table 5). Increases in the ratio of C—C bonding compared to C—O and C=O bonds, from 56.8% for gPLA to ~61% for 3.5 wt % PO samples, can be attributed to the creation of 10 new C—C bonds formed from crosslinking reaction of PBO compared to only 2 C=O and 2 C—O bonds. PLA.PBO7.NTA10 unexpectedly showed an almost 30% decrease in C—C bonds, 6% increase in C—O bonds, and a 23% increase in C=O bonds compared to gPLA. As the higher percentage of PBO would afford a greater C—C bonding percentage, this shift in carbon bonding can be ascribed to the advantageous orientation of carbonyl groups from NTA on the surface of the polymer rather than deeply imbedded inside. These data, along with ATR-FTIR spectra, support the formation of new alkyl bonds from successful ring opening grafting and surface orientation of NTA groups, especially in PLA.PBO7.NTA10 samples.

TABLE 5

Summary of XPS high resolution carbon bonding indicating alkyl (C—C), ether (C—O), and carbonyl (C=O) linkages of native PLA (gPLA), Crosslinked PLA (PLA.PBO3.5), 3%, 5%, and 10% NTA grafted PLA

| Sample | gPLA | PLA PBO3.5 | PLA PBO3.5 NTA3 | PLA PBO3.5 NTA5 | PLA PBO3.5 NTA10 | PLA PBO7 NTA10 |
|---|---|---|---|---|---|---|
| C—C (%) | 56.8 | 60.7 | 59.0 | 61.6 | 61.2 | 27.9 |
| Estimated C—C (%) | 58.5 | 60.1 | 60.1 | 60.1 | 60.2 | 61.8 |
| C—O (%) | 20.6 | 18.7 | 20.1 | 18.7 | 19.2 | 26.7 |
| Estimated C—O (%) | 23.4 | 22.5 | 22.5 | 22.4 | 22.3 | 21.4 |
| C=O (%) | 22.5 | 20.6 | 20.8 | 19.7 | 20.6 | 45.4 |
| Estimated C=O (%) | 18.1 | 17.7 | 17.7 | 17.8 | 17.8 | 17.4 |
| C=O/C—C (%) | 0.4 | 0.34 | 0.35 | 0.3 | 0.37 | 1.63 |
| C—O/C—C (%) | 0.36 | 0.31 | 0.34 | 0.22 | 0.26 | 0.96 |
| C—O/C=O (%) | 0.92 | 0.91 | 0.97 | 0.75 | 0.79 | 0.59 |

The surface wettability of antioxidant functionalized PLA was determined using dynamic water contact angle (advancing: $\theta_A$ and receding: $\theta_R$) with gPLA, PLA.PBO3.5, and PLA.PBO7 serving as controls. Advancing contact angle was measured by depositing a 2 µL droplet on the sample surface, expanding it at a rate of 0.5 µL/sec, and measuring the maximum stabilized mean contact angle prior to contact baseline advancing. Receding contact angle was determined by withdrawing this same droplet at a rate of 0.5 µL/sec and measuring the minimum stabilized mean contact angle prior to the contact baseline receding (Table 6). Granulated (unmodified) PLA exhibited characteristic near hydrophobic character (hydrophobic≥90°) (Neumann et al., "Thermodynamics of Contact Angles. 1. Heterogeneous Solid Surfaces," *J Colloid Interf Sci* 38(2):341-358 (1972), which is hereby incorporated by reference in its entirety) with an advancing contact angle of 85.78±1.28 and receding contact angle of 54.5°±2.7 in agreement with previous determined values. Cross-linked samples of PLA (PLA.PBO) both saw significant (p≤0.05) decreases in the hydrophobic nature of the material with a significant (P≤0.05) drop in advancing contact angle to 80.8°±2.3 and 80.3°±2.3 compared to gPLA while retaining similar receding contact angles to gPLA of 53.5°±1.4 and 51.5°±2.5. The drop of advancing contact angle can be attributed to the inclusion of new polar amide bonds while the lack of change in receding contact angle indicated incomplete ring opening and cross-linker symmetry leading to a non-significant (p>0.05) change in receding contact angle measurements. With the crosslinking of 3 wt % and 5 wt % NTA, the advancing contact angle increased significantly (p≤0.05) to 86.7°±1.8, 86.1°±2.8, and 85.5±1.8 for PLA.PBO3.5.NTA3, PLA.PBO3.5.NTA5, and PLA.PBO5.NTA samples, respectively, with an insignificant (p>0.05) increase of ACA for PLA.PBO7.NTA3. The receding contact angle also decreased significantly (p≤0.05) from control samples, with PLA.PBO.NTA5 measuring the lowest of mean $\theta_R$ (38.8°±2.6 and 37.6°±2.6 for 3.5 wt % and 7 wt % PBO samples, respectively).

TABLE 6

Dynamic Water Contact Angle of granulated PLA (gPLA), Crosslinked PLA (PLA.PBO), 3%, 5%, and 10% NTA grafted PLA at 3.5 wt % and 7 wt % PBO indicating advancing contact angle ($\theta_A$), receding contact angle ($\theta_R$), and contact angle hysteresis.

| | 3.5% PBO | | | 7% PBO | | |
|---|---|---|---|---|---|---|
| Sample | Advancing CA ($\theta_A$) | Receding CA ($\theta_R$) | CA Hysteresis ($\theta$) | Advancing CA ($\theta_A$) | Receding CA ($\theta_R$) | CA Hysteresis ($\theta$) |
| gPLA | 85.8 ± 1.3[b] | 54.5 ± 2.7[c] | 31.9 ± 2.3 | 85.8 ± 1.3[b] | 54.5 ± 2.7[c] | 31.9 ± 2.3 |
| PLA.PBO | 80.8 ± 2.3[a] | 53.5 ± 1.4[c] | 27.4 ± 1.9 | 80.3 ± 2.6[a] | 51.5 ± 2.5[c] | 28.7 ± 2.2 |
| PLA.PBO.NTA3 | 86.7 ± 1.8[b] | 42.0 ± 3.0[b] | 44.2 ± 2.2 | 81.6 ± 2.1[a] | 43.2 ± 3.7[b] | 38.3 ± 2.4 |
| PLA.PBO.NTA5 | 86.1 ± 2.8[b] | 38.8 ± 2.6[a] | 47.1 ± 2.7 | 85.5 ± 1.8[b] | 37.6 ± 2.6[a] | 47.9 ± 2.1 |
| PLA.PBO.NTA10 | 82.9 ± 2.8[a] | 42.7 ± 3.4[b] | 38.8 ± 2.2 | 81.8 ± 2.5[a] | 50.7 ± 3.3[c] | 29.0 ± 4.1 |

Values are means of at least three measurements on three independent films (n ≥ 9). Significant differences between means in columns are indicated by lowercase letters (Tukey's HSD, p ≤ 0.05).

Significant (p≤0.05) changes to surface hydrophobicity are due to the grafting of metal chelating functional groups to the surface and the complete ring-opening of bisoxazoline leading to a semi symmetrical structure and increased hydrophobic nature unlike cross-linked PLA samples (FIG. 13). This conclusion is supported by XPS data which indicates only slight changes in the ratio of carbon bonding between PLA.PBO3.5 and 3 wt % and 5 wt % antioxidant samples, owing changes in contact angle to increases in molecular symmetry and electrical charge distribution rather than composition. PLA.PBO.NTA10 samples exhibited a significant (p≤0.05) decrease in advancing contact angle and corresponding increase in receding contact angle compared to PLA.PBO.NTA5, dropping from 86.1° to 82.9° and 85.5° to 81.8°, respectively. This shift in surface wettability towards decreased hydrophobicity is in agreement with XPS data indicating surface orientation of polar NTA carboxylate groups leading to greater hydrophilicity in advancing contact angle and contact angle hysteresis. In addition to confirming successful functionalization of PLA, hydrophilic shifts in interfacial chemistry are particularly beneficial for aqueous food systems, with increased surface-component interactions leading to enhanced antioxidant efficacy.

Native, cross-linked, and functionalized films' carboxylic acid densities were determined using Toluidine Blue O (TBO) dye assay assuming a 1:1 carboxylate dye molar ratio (Lin et al., "Photo-Curable Metal-Chelating Coatings Offer a Scalable Approach to Production of Antioxidant Active Packaging," *J Food Sci* 83(2):367-376 (2018), which is hereby incorporated by reference in its entirety). Control films showed no significant (p>0.05) difference between samples, presenting with trace carboxylic acids with only 0.35±0.04 nmol/cm$^2$, 0.37±0.06 nmol/cm$^2$, and 0.31±0.02 nmol/cm$^2$ for gPLA, PLA.PBO3.5, and PLA.PBO7, respectively.

Antioxidant functionalized films showed significant increases in carboxylic acid density compared to control films, confirming successful surface grafting of NTA groups to the base polymer. As expected (FIG. 15), PLA.PBO3.5.NTA3 displayed the lowest surface carboxylic acid density with 0.75±0.04 nmol/cm$^2$, which was not significantly (p>0.05) different than PLA.PBO3.5.NTA5 (0.94±0.04 nmol/cm$^2$). Samples with 7 wt % PBO contained higher concentrations of carboxylic acids than 3.5 wt % PBO samples and demonstrated a step-wise increase in carboxylic acid density with 2.092±0.15 nmol/cm$^2$, 2.54±0.02 nmol/cm$^2$, and 3.11±0.04 nmol/cm$^2$ for PLA.PBO7.NTA3, PLA.PBO7.NTA5, and PLA.PBO7.NTA10 samples, respectively. The carboxylic acid density of antioxidant functionalized PLA films is comparable to other antioxidant films, such as polyethylene immobilized with a bioactive fish peptide which showed 1.68±0.17 nmol/cm$^2$ following polypeptide immobilization. Significant (p≤0.05) increases in the number of carboxylic acid groups in antioxidant functionalized samples, along with ATR-FTIR, XPS, and dynamic water contact angle measurements, support the creation of antioxidant functionalized PLA according to the reaction mechanism found in FIG. 13.

Example 7—Antioxidant Performance of Chelating PLA-g-NTA Film

The ability of NTA functionalized PLA to scavenge radicals and prevent oxidation, compared to control films, was quantified utilizing the TEAC Assay. Trolox is a water-soluble analog to the natural antioxidant Vitamin E used to quantify radical quenching produced by the ABTS radical mixture. Accordingly, control and antioxidant functionalized film samples were incubated in ABTS radical mixture for 30 minutes and analyzed for their capacity to sequester preformed radicals from solution (FIG. 16A-B).

As expected, control film samples did not exhibit significant (p>0.05) antioxidant capacity with mean Trolox equivalence for gPLA, PLA.PBO3.5, and PLA.PBO7 samples comparable to blank samples (no film). Unlike previously prepared cross-linked samples, incomplete ring opening of bisoxazoline with PLA resulted in blocked carboxylic acid groups and lack of antioxidant capacity. Interestingly, antioxidant capacity did not correlate directly with carboxylic acid density with PLA.PBO3.5.NTA3 (TE=0.36±0.02 Trolox$_{(eq)}$/cm$^2$) displaying greater than double the antioxidant capacity of PLA.PBO7.NTA3 (TE=0.63±0.08 Trolox$_{(eq)}$/cm$^2$) despite demonstrating half as many carboxylic acid groups according to the TBO assay (FIG. 15); while similar carboxylic acid densities for PLA.PBO3.5.NTA3 and PLA.PBO3.5.NTA5 (TE=0.66 t 0.05 Trolox$_{(eq)}$/cm$^2$) did not result in significant differences in antioxidant capacities. 10 wt % NTA samples displayed similar antioxidant capacities (TE$_{3.5\%}$=0.89±0.07 eq/cm$^2$ and TE$_{7\%}$=0.84±0.02 Trolox$_{(eq)}$/cm$^2$) regardless of carboxylic acid density or percent cross-linker. Nonetheless, all antioxidant functionalized PLA displayed significant radical scavenging compared to control films and comparable antioxidant capacity to previously reported samples as well as other prepared antioxidant film samples (Romani et al., "Radical Scavenging Polyethylene Films as Antioxidant Active Packaging Materials," *Food Control* 109:1-7 (2020), which is hereby incorporated by reference in its entirety).

Figures 17A, 17B:
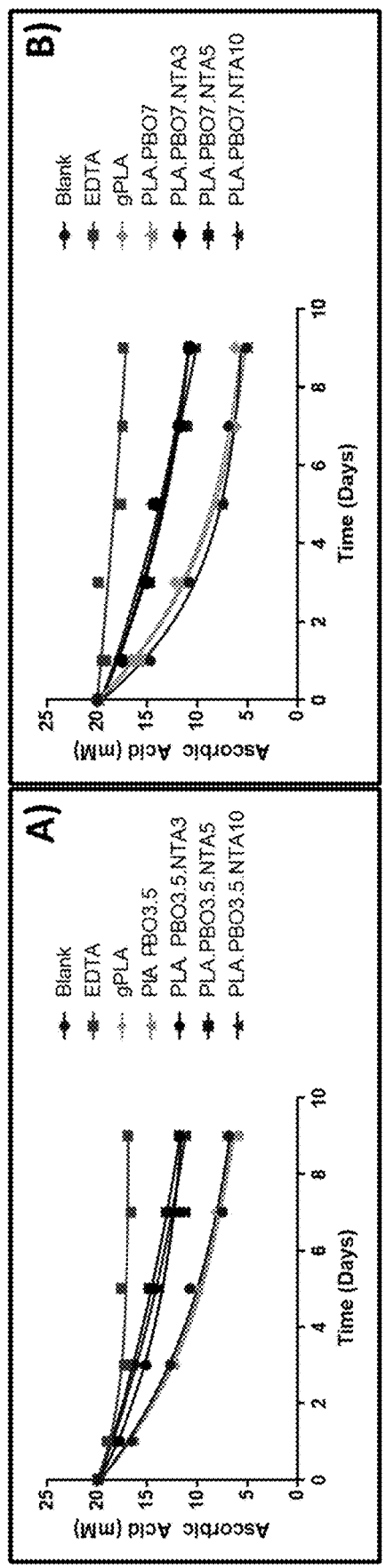
FIGS. 17A-B are graphs illustrating the results of an accelerated ascorbic acid degradation study at 37° C. of no film (blank), industrial standard (0.08 mM EDTA), granulated PLA (gPLA), 3.5% crosslinker with PLA (PLA.PBO3.5), 3%, 5%, and 10% NTA grafted PLA in 20 mM ascorbic acid in buffered pH 4 solution (FIG. 17A), and granulated PLA (gPLA), 7% crosslinker with PLA (PLA.PBO7), 3%, 5%, and 10% NTA grafted PLA (FIG. 17B) in 20 mM ascorbic acid in buffered pH 4 solution. Values are means of at least four measurements on independent films (n=4).

To evaluate the antioxidant functionalized PLA samples' capacity for limiting nutritive degradation, an accelerated ascorbic acid degradation study at 37° C. for 9 days at pH 4 was performed with gPLA, PLA.PBO3.5, PLA.PBO7, and 0.08 mM ethylenediaminetetraacetic acid (EDTA) acting as controls (FIG. 17A-B). Degradation rates were fit to a single-phase decay model as performed in Example 3 and reported previously (Lin et al., "Photo-Curable Metal-Chelating Coatings Offer a Scalable Approach to Production of Antioxidant Active Packaging," *J Food Sci* 83(2):367-376 (2018), which is hereby incorporated by reference in its entirety).

EDTA exhibited the highest protection of ascorbic acid content preserving greater than 87% (17.42±0.22 mM) of the 20 mM ascorbic acid concentration by the end of the study. Due to its high ascorbic acid retention rate, EDTA samples did not fit the single-phase decay model well with over 35% of the variation not explained by the model; all other sample treatments showed significant ascorbic acid decay and were well suited for single-phase decay modeling ($R^2 \geq 0.95$). Native and cross-linked PLA control samples showed similar ($p > 0.05$) degradation kinetics to blank (no film) samples and no antioxidant protection of ascorbic acid degradation over the course of the study. As demonstrated in previously reported studies, control films and blank samples presented a steep decline of greater than 25% after the first day and retained only 5.18±0.16 mM, 6.26±0.12 mM, 6.55±0.86 mM, and 5.16±0.39 mM for blank, gPLA, PLA.PBO3.5, and PLA.PBO7, respectively, after 9 days. Additionally, no film samples developed half its total decay (half-life) within only 2.1 days while gPLA, PLA.PBO3.5, and PLA.PBO7 persisted an additional 0.6 days, 1.1 days, and 0.7 days, respectively, according to single-phase decay modeling. Although not as effective as EDTA, antioxidant functionalized PLA significantly inhibited ascorbic acid degradation rates with all samples preserving around 11 mM ascorbic acid by the final day of the study. Antioxidant functionalized PLA films also had significantly lower rate constants (k), as predicted by single-phase decay, compared to control films and blank samples; this is indicative of lower decay rates. Similar antioxidant efficacy between functionalized samples is surprising as TEAC antioxidant capacity and carboxylic acid density significantly increased between different antioxidant functionalized PLA samples, which would have been presumed to afford greater protection of against ascorbic acid degradation. However, the lack of dose dependent antioxidant behavior may be due to the chelating mechanism and stability constant of NTA rather than the antioxidant capacity of the films. Unreacted NTA utilizes only 4 groups for coordination chemistry (one amine and three carboxylate groups) leading to lower stability constants (15.87 with $Fe^{3+}$) with transition metals compared to the strong binding of EDTA (25.10 to $Fe^{3+}$) which contains 6 groups for coordination (two amines and four carboxylate groups). See Example 3 above; see also Martell et al., *Critical Stability Constants*, Vol. 6, Plenum Press: New York, (1989), which is hereby incorporated by reference in its entirety. This lower stability indicates a lower efficiency in transition metal chelation leading to higher release equilibrium concentrations of NTA groups on antioxidant samples and higher oxidation rates of ascorbic acid, independent of NTA concentration. Neither antioxidant functionalized PLA nor control film showed significant metal chelation according to ICP-MS analysis. Nonetheless, materials prepared by the bisoxazoline synthesis route were more effective at preventing oxidation of ascorbic acid than radical grafting with 11.78±0.05 mM and 10.84±0.31 mM ascorbic acid retained for analogous PBO samples compared to only 8.77±0.362 mM ascorbic acid for radical grafted samples (see Example 3 above). Iron chelators such as deferoxamine, caffeic acid, benzohydroxamic acid, 2,3-dihydroxybenzoic acid, and iron chelating synthetic peptides are known to exhibit chelation independent antioxidant capacities associated to their ability to reduce free radicals through effective electron donation. See Shimoni et al., "Antioxidant Properties of Deferoxamine," *J American Oil Chemists' Society* 71(6):641-644 (1994); Holden et al., "Deferoxamine: An Angiogenic and Antioxidant Molecule for Tissue Regeneration," *Tissue Engineering Part B: Reviews* 25(6):461-470 (2019); Adjimani et al., "Antioxidant and Free Radical Scavenging Activity of Iron Chelators," *Toxicology Reports* 2:721-728 (2015); Csire et al., "Both Metal-chelating and Free Radical-scavenging Synthetic Pentapeptides as Efficient Inhibitors of Reactive Oxygen Species Generation," *Metallomics* doi: 10.1039/DOMT00103A (2020), each of which is hereby incorporated by reference in its entirety.

The antioxidant functionalized PLA exhibited successful antioxidant properties in both radical scavenging and oxidative degradation studies, which supports the use of bisoxazoline in the formation of green non-migratory active packaging as well as the potentiation of this technology to grafting a broad range of functional polymers.

Example 8—Synthesis and Characterization of Nisin-Linked Resins

Reactive extrusion will be utilized to synthesize a functionalized PLA polymer through reactive cross-linking of Nisin via 1,3-bis(4,5-dihydro-2-oxazolyl)benzene to the polymer using granulated commercial PLA resin by the mechanism illustrated in FIG. 18A. Nisin is a 34 amino acid, polycyclic antibacterial peptide produced by the bacterium *Lactococcus lactis* that is used as a food preservative. As in Example 6 above, where the NTA moiety was cross-linked to PLA using 1,3-bis(4,5-dihydro-2-oxazolyl)benzene (forming the functionalized "PLA.PBO.NTA"), in this example Nisin will be cross-linked to PLA using 1,3-bis(4, 5-dihydro-2-oxazolyl)benzene (forming the functionalized "PLA.PBO.Nis").

Briefly, gPLA will be mechanically mixed with either 3.5% or 7% w/w 1,3-bis(4,5-dihydro-2-oxazolyl)benzene and either 1%, 6%, or 12% w/w Nisin and extruded at 50 RPM through a Process 11 Parallel Twin Extruder (Thermo Fisher Scientific, Waltham, Mass.) equipped with a 1.5 mm die and eight heating zones set to 145° C., 190° C., 200° C., 200° C., 200° C., 200° C., 200° C., and 210° C. at the die. PLA.PBO.Nis will be pelletized using a Varicut Pelletizer (Thermo Fisher Scientific, Waltham, Mass.) to form 1 mm pellets. Samples of PLA.PBO.Nis pellets (2 g) will be placed between two 5 mil Kapton Films and allowed to melt in a Carver hot press (Wabash, Ind.) at 190° C. for one minute prior to pressing at 10,000 lbs to form films. Films will be cut to 1 cm×2 cm for further characterization. Control gPLA and PBO-cross-linked PLA ("PLA.PBO") films will be prepared in this same manner; the PLA.PBO film will serve as a process control to determine if any changes in activity were a result of the residual PBO linker (—$CH_2$—$CH_2$—N(H)—C(O)-Ph-C(O)—N(H)—$CH_2$—$CH_2$—). Film thickness of gPLA, PLA.PBO, and PLA.PBO.Nisin will be compared so that similarly dimensioned films will be used. Antimicrobial activity of the films will then be assessed.

Discussion of Examples 1-8

Consumer expectations for food products with "cleaner" labels, reduced direct additives, and retained quality, convergent with concerns over accumulation of fossil-fuel derived plastic in landfills provides an opportunity for alternative food packaging approaches. In the preceding examples, bio-based non-migratory metal chelating packaging was produced utilizing reactive extrusion to enhance industrial translatability. Commercial poly(lactic acid) was functionalized with the chelating ligand NTA through radical grafting to produce PLA-g-NTA, or through cross-linking with 1,3-bis(4,5-dihydro-2-oxazolyl)benzene to produce PLA.PBO.NTA.

Functionalized films showed significant radical scavenging and metal chelating efficacy in addition to an ability to delay ascorbic acid degradation, demonstrating their antioxidant capability. Based on the nature of NTA covalent attachment to the PLA, it is fully expected that the NTA moiety will exhibit non-migratory behavior. On-going studies demonstrating that chelating ligands and reactive extrusion adjuvants do not migrate during conditions of use, and further characterizing material properties (chemical, mechanical) will be useful to confirm the commercial viability of such chelating biomaterials. Radical grafting and cross-linking through reactive extrusion represents a new food manufacturing technology with potential for broad industrial application of bio-based, non-migratory active packaging materials. The breadth of this work was extended by evaluating the use of poly(lactic acid) functionalized with the antimicrobial Nisin through cross-linking with 1,3-bis (4,5-dihydro-2-oxazolyl)benzene to produce PLA.PBO.Nisin and the use of non-biodegradable polypropylene functionalized with the antimicrobial ε-poly-l-lysine through radical grafting to produce PP-g-PL. With the continued advancement and emphasis on the production of non-migratory active packaging technology produced through "greener methods", such as reactive extrusion, has the potential to be an economical alternative to direct additives, and when carried out with bio-based materials the resulting packaging materials afford the additional advantage of biodegradability not afforded by petroleum-based materials.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed:

1. A method of making an active, food-grade packaging resin, the method comprising:
providing a polymeric material;
reacting the polymeric material with a ligand and one of a cross-linking agent and a radical initiator in an extruder, under temperature and pressure conditions to cause covalent binding of the ligand to the polymeric material by a linker that is the reaction product of the cross-linking agent or by direct bond formation between the ligand and the polymeric material; and
extruding the active, food-grade packaging resin.

2. The method according to claim 1, wherein the polymeric material is selected from the group consisting of polylactic acid, polyethylene, polypropylene, polyethylene terephthalate, polystyrene, polyamide, polycaprolactone, polyurethane, polyhydroxy butyrate, cellulose, and copolymers thereof.

3. The method according to claim 1, wherein the reacting step is carried out using a cross-linking agent.

4. The method according to claim 3, wherein the cross-linking agent comprises an oxazoline, an epoxide, or a carbodiimide.

5. The method according to claim 3, wherein the reacting step is carried out using a radical initiator.

6. The method according to claim 5, wherein the radical initiator is a peroxide initiator.

7. The method according to claim 1, wherein the ligand is a chelating ligand, radical scavenger, oxygen scavenger, or antimicrobial ligand.

8. The method according to claim 1, wherein the ligand is a food-grade chelating ligand, food-grade radical scavenger, food-grade oxygen scavenger, or food-grade antimicrobial ligand.

9. The method according to claim 1, wherein the temperature and pressure conditions comprise: a temperature from about 100° C. to about 300° C., and a pressure from about 30 psi to about 1400 psi.

10. The method according to claim 1 wherein the polymeric material is polylactic acid or polypropylene, and the ligand is nitrolotriacetic acid, polylysine, or nisin.

11. The method according to claim 10, wherein the linker is —CH$_2$CH$_2$—N(H)—C(O)-phenyl-C(O)—N(H)—CH$_2$CH$_2$—.

12. The method according to claim 10, wherein a peroxide initiator causes direct bond formation between the ligand and the polymeric material.

13. The method according to claim 1, further comprising pelletizing the active packaging resin.

14. The method according to claim 1, wherein said reacting is carried out in the absence of a starch.

15. The method according to claim 1 further comprising:
mixing the polymeric material with the ligand and one of the cross-linking agent and the radical initiator to form a mixture before said reacting.

16. The method according to claim 15, wherein the mixture consists of the polymeric material, the ligand, and one of the cross-linking agent and the radical initiator.

17. The method according to claim 1, wherein said reacting further comprises reacting the provided polymeric material with the ligand, the cross-linking agent or the radical initiator, and a second polymeric material in the extruder to form the active, food-grade packaging resin.

18. The method according to claim 1, wherein said reacting further comprises reacting the provided polymeric material with the ligand, the cross-linking agent or the radical initiator, and one or more monomers that form the polymeric material in the extruder to form the active, food-grade packaging resin.

19. A method of forming a food packaging material, the method comprising:

melting the active, food-grade packaging resin prepared according to claim 1;

forming the melted active, food-grade packaging resin into a shaped, food packaging material.

20. The method according to claim 19, wherein said forming is carried out by extruding the melted resin through a slotted die and the shaped, food packaging material is a film.

21. The method according to claim 19, wherein said forming is carried out by cast extruding the melted resin through a slotted die and the shaped, food packaging material is a single-layer or multi-layer film.

22. The method according to claim 19, wherein said forming is carried out by blow extruding the melted resin through an annular die.

23. The method according to claim 19, wherein said forming is carried out by injection molding to form a container.

24. The method according to claim 19, wherein said forming is carried out by blow molding or expanded bead blowing to form a container.

* * * * *

SEQUENCE LISTING

```
<160> NUMBER OF SEQ ID NOS: 1

<210> SEQ ID NO 1
<211> LENGTH: 34
<212> TYPE: PRT
<213> ORGANISM: Lactococcus lactis
<220> FEATURE:
<221> NAME/KEY: MISC_FEATURE
<222> LOCATION: (2)..(2)
<223> OTHER INFORMATION: Xaa at position 2 is didehydroaminobutyric
<220> FEATURE:
<221> NAME/KEY: MISC_FEATURE
<222> LOCATION: (3)..(3)
<223> OTHER INFORMATION: Xaa at position 3 is alanine, linked by sulfide
      bridge to alanine at position 7 (forming lanthionine)
<220> FEATURE:
<221> NAME/KEY: MISC_FEATURE
<222> LOCATION: (5)..(5)
<223> OTHER INFORMATION: Xaa at position 5 is didehydroalanine
<220> FEATURE:
<221> NAME/KEY: MISC_FEATURE
<222> LOCATION: (7)..(7)
<223> OTHER INFORMATION: Xaa at position 7 is alanine, linked by sulfide
      bridge to alanine at position 3 (forming lanthionine)
<220> FEATURE:
<221> NAME/KEY: MISC_FEATURE
<222> LOCATION: (8)..(8)
<223> OTHER INFORMATION: Xaa at position 8 is aminobutyric acid, linked
      by sulfide bridge to alanine at position 11 (forming beta-
      methyllanthionine)
<220> FEATURE:
<221> NAME/KEY: MISC_FEATURE
<222> LOCATION: (11)..(11)
<223> OTHER INFORMATION: Xaa at position 11 is alanine, linked by
      sulfide bridge to aminobutyric acid at position 8 (forming beta-
      methyllanthionine)
<220> FEATURE:
<221> NAME/KEY: MISC_FEATURE
<222> LOCATION: (13)..(13)
<223> OTHER INFORMATION: Xaa at position 13 is aminobutyric acid, linked
      by sulfide bridge to alanine at position 19 (forming beta-
      methyllanthionine)
<220> FEATURE:
<221> NAME/KEY: MISC_FEATURE
```

```
<222> LOCATION: (19)..(19)
<223> OTHER INFORMATION: Xaa at position 19 is alanine, linked by
      sulfide bridge to aminobutyric acid at position 13 (forming beta-
      methyllanthionine)
<220> FEATURE:
<221> NAME/KEY: MISC_FEATURE
<222> LOCATION: (23)..(23)
<223> OTHER INFORMATION: Xaa at position 23 is aminobutyric acid, linked
      by sulfide bridge to alanine at position 26 (forming beta-
      methyllanthionine)
<220> FEATURE:
<221> NAME/KEY: MISC_FEATURE
<222> LOCATION: (25)..(25)
<223> OTHER INFORMATION: Xaa at position 25 is aminobutyric acid, linked
      by sulfide bridge to alanine at position 28 (forming beta-
      methyllanthionine)
<220> FEATURE:
<221> NAME/KEY: MISC_FEATURE
<222> LOCATION: (26)..(26)
<223> OTHER INFORMATION: Xaa at position 26 is alanine, linked by
      sulfide bridge to aminobutyric acid at position 23 (forming beta-
      methyllanthionine)
<220> FEATURE:
<221> NAME/KEY: MISC_FEATURE
<222> LOCATION: (28)..(28)
<223> OTHER INFORMATION: Xaa at position 28 is alanine, linked by
      sulfide bridge to aminobutyric acid at position 25 (forming beta-
      methyllanthionine)
<220> FEATURE:
<221> NAME/KEY: MISC_FEATURE
<222> LOCATION: (33)..(33)
<223> OTHER INFORMATION: Xaa at position 33 is didehydroalanine

<400> SEQUENCE: 1

Ile Xaa Xaa Ile Xaa Leu Xaa Xaa Pro Gly Xaa Lys Xaa Gly Ala Leu
1               5                   10                  15

Met Gly Xaa Asn Met Lys Xaa Ala Xaa Xaa His Xaa Ser Ile His Val
            20                  25                  30

Xaa Lys
```